US007117193B1

(12) United States Patent
Basko et al.

(10) Patent No.: US 7,117,193 B1
(45) Date of Patent: *Oct. 3, 2006

(54) PARSING NAVIGATION INFORMATION TO IDENTIFY OCCURRENCES OF EVENTS OF INTEREST

(75) Inventors: Roman Basko, Newcastle, WA (US); Jay Sauls, Woodinville, WA (US); Radha Krishna Uppala, Redmond, WA (US)

(73) Assignee: Revenue Science, Inc., Bellevue, WA (US)

( * ) Notice: Subject to any disclaimer, the term of this patent is extended or adjusted under 35 U.S.C. 154(b) by 743 days.

This patent is subject to a terminal disclaimer.

(21) Appl. No.: 10/005,224

(22) Filed: Dec. 5, 2001

Related U.S. Application Data

(63) Continuation-in-part of application No. 09/613,847, filed on Jul. 11, 2000.

(51) Int. Cl.
*G06F 17/30* (2006.01)
(52) U.S. Cl. ............................ 707/1; 709/223; 709/224
(58) Field of Classification Search .............. 707/1–10, 707/203; 709/223, 224
See application file for complete search history.

(56) References Cited

U.S. PATENT DOCUMENTS 5,809,235 A * 9/1998 Sharma et al. .............. 709/230
6,006,225 A * 12/1999 Bowman et al. ............... 707/5
6,233,618 B1 * 5/2001 Shannon .................... 709/229
6,532,023 B1 * 3/2003 Schumacher et al. ....... 715/704
6,728,769 B1 * 4/2004 Hoffmann .................. 709/225
2002/0038388 A1 * 3/2002 Netter ........................ 709/318

FOREIGN PATENT DOCUMENTS

EP   1246069 A2 *  8/2000

OTHER PUBLICATIONS

Microsoft Site Server, Nov. 17, 2000 (2 pages) www.microsoft.com/siteserver/site/ProductInfo/Datasheet.htm.
Microsoft Site Server, Nov. 17, 2000 (3 pages) www.microsoft.com/siteserver/site/30/downloads/ssdata.doc.
Microsoft Site Server, Nov. 17, 2000 (2 pages) www.microsoft.com/siteserver/site/ProductInfo/EvalGuide.htm.
Microsoft Site Server, Site Server Evaluation Guide, Nov. 17, 2000 (48 pages) www.microsoft.com/siteserver/site/30/downloads/sseval.exe.

(Continued)

*Primary Examiner*—Don Wong
*Assistant Examiner*—Hanh Thai
(74) *Attorney, Agent, or Firm*—Perkins Coie LLP

(57) ABSTRACT

A method, system and computer-readable medium for analyzing interaction or usage data, such as for customers, is described. The interaction or usage data may be stored in log files and supplemented with data from other sources. Various data parsing information may be defined and used as part of the analysis, such as by using customer-specific information to identify various occurrences of interest. For example, when analyzing a customer's web site interaction data, the parser component can use data defining customer-specific types of web site events of interest. Such high-level types of occurrences can be specified in a variety of ways, such as by using a combination of a logical web site, one or more URIs corresponding to web pages, and/or one or more query strings. The data parsing information may also specify a mapping of actual web sites to one or more logical sites.

73 Claims, 60 Drawing Sheets

OTHER PUBLICATIONS

E.piphany E.5 System, "An Integrated System Built on Internet Technology," Oct. 19, 2000 (1 page) www.epiphany.com/products/index.html.

E.piphany E.5 System, "Technology Overview," Dec. 7, 2000 (2 pages) www.epiphany.com/products/technology.html.

E.piphany E.5 System, "FAQ," Oct. 19, 2000 (3 pages) www.epiphany.com/products/faq.html.

E.piphany E.5 System, "Campaign Management for E-Commerce," Oct. 19, 2000 (1 page) www.epiphany.com/products/ecommerce.html.

Webtrends, "Log Analyzer," Sep. 2, 2000 (1 page) http://www.webtrends.com/products/log.

Webtrends, "Log File Analysis Cartridge," Sep. 2, 2000 (8 pages) www.webtrends.com/products/cartridge/log.htm?print=yes.

Webtrends, "Log File Analysis vs. Packet Sniffing Comparative Analysis of Internet Traffic Data Collection Models White Paper," Apr. 18, 2001 (7 pages) www.webtrends.com/solution/whitepapers/packet.htm.

* cited by examiner digiMine Services Overview

| MAIN | SERVICES | COMPANY | MEDIA CENTER | CUSTOMER LOG IN |

1901 — 1903 — 1905 — 1907 — 1909 overview — 1922
service benefits — 1924
take the quiz — 1926
how digimine works — 1928
※ request info digiMine℠ SERVICES

Overview

Powerful, affordable and easy to use.

digiMine is setting new standards in the delivery of advanced analytics, data warehousing and data mining for eBusinesses. As an application service provider (ASP), we deliver a comprehensive and affordable solution that is quick to deploy and easy to use.

What truly sets digiMine apart from the competition is our ability to go far beyond today's web reporting services by using the most powerful data mining and personalization tools. By applying high-end data mining algorithms to the full range of click stream, user registration, product catalog, campaign and transaction data, we provide you with the most relevant business intelligence. And we enable you to take action with precision and speed.

digiMine(SM) Services include:

1. digiMine Warehousing Services — 1912
2. digiMine Analytic Services — 1914
3. digiMine Data Mining Services — 1916
4. digiMine Data Enhancement Services — 1918

1915

※ Data Sheet
Download the digiMine(SM) Services Data Sheet
(91 KB, Requires Adobe Acrobat Reader)

1928 http://www.digimine.com/services/

*Fig. 19B* digiMine℠ SERVICES

Overview digiMine℠ Data Mining Services digiMine applies advanced data mining algorithms to provide you with the most powerful analytics available. Our algorithms identify patterns in the data that can deliver new insight into your customers. These analytics, coupled with our interactive reporting interface, give you the intelligence you need to make timely decisions with confidence.

- Personalization
- Cross-sell and Upsell
- Churn management
- Affinity Analysis - Product, Content, Event
- Customer Segmentation { 1. digiMine Warehousing Services
{ 2. digiMine Analytic Services
{ 3. digiMine Data Mining Services
{ 4. digiMine Data Enhancement Services  ~ 1918

◆ We go beyond today's typical web reporting services by using the most powerful data mining and personalization tools.

*Fig. 19E*

Affordable
Our web-based ASP model allows us to deliver a powerful, high-end service that is efficient and affordable. Set-up costs are minimal and do not require additional IT resources. Fixed monthly fees cover all expenses related to hardware, software, operations and reporting.

Easy-to-use
digiMine℠ Reporting Services are intuitive and organized to deliver relevant insight instantly. Our interactive reports allow you to customize your view of your analytics. And you don't have to be a statistician to understand your data.

Quick to deploy
digiMine offers the fastest time to deployment. In fact, a typical installation allows us to setup and begin daily reporting within a few days. In many cases, our customers have full analytics in less than 24 hours.

How digiMine Works digiMine℠ Services do not require you to invest in additional IT resources, nor do we require you to deploy data tags. We simply install a digiMine Slurper™ at your data center that encrypts and compresses your data for transmission at pre-determined times. digiMine's Slurper™ is a simple piece of software that has the ability to pull web server logs and gather data from any OLE-DB-compliant database - from Oracle, SQL, DB2 and others. This process does not compromise your network security or require you to open your firewall.

Once your data is transferred to digiMine's data center, it is parsed, cleaned and loaded into a secure data warehouse.

digiMine then produces detailed and accurate reports that are delivered 24 hours a day, 7 days a week, 365 days a year. You can access your reports through a dedicated https connection using a standard browser. The reports are completely secure and require user authentication. In fact, as an administrator, you have the ability to set various levels of access permission for different business users in your company. Your data is also made available for export.

digiMine provides data mining services for predictive applications. These predictive components give you the ability to personalize web content and cross-sell or up-sell products. Data mining components run in real-time on your web site or in batch applications, such as targeted e-mail.

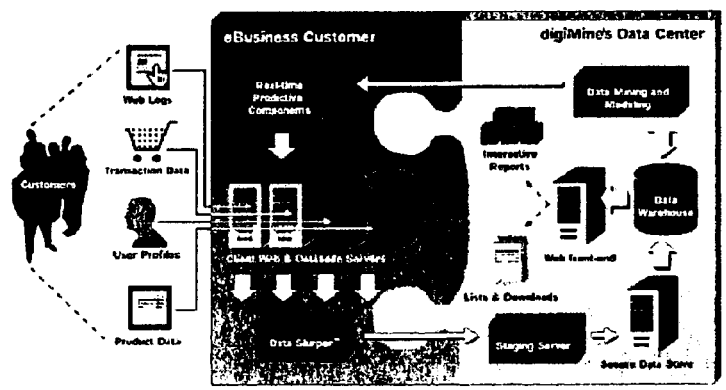

digiMine, Inc.
11250 Kirkland Way
Kirkland, WA 98033
Tel: 425 896 1700
Fax: 425 896 1777
www.digiMine.com

*Fig. 191*

Fig. 19J digiMine Company Information Management digiMine

| MAIN | SERVICES | COMPANY | MEDIA CENTER | CUSTOMER LOG IN | our mission | management | customers | careers | contact us

COMPANY

Management digiMine's executive team brings unparalleled expertise in commerce site development, data warehousing, data mining and web/database marketing.

Executive Team

Usama Fayyad ~ 1941
President & CEO, co-founder

Nick Besbeas ~ 1943
Executive VP Sales and Marketing, co-founder

Bassel Ojjeh ~ 1945
COO, co-founder

Martin F. Vowels ~ 1947
Chief Financial Officer

Bob Bulan, Esq. ~ 1949
Vice President of Legal Affairs

Investors

Mayfield Fund
Second Avenue Fund
Cedar Grove Investments (Amazon.com, LoudEye, PhotoDisc)
Kellett Investments (InfoSpace.com, MCI WorldCom, eVite.com, CoinStar, meals.com, gear.com, Virtual Bank)
Sam Jadallah (Managing Director, Internet Capital Group; former Microsoft Vice President)
Robert Pallan (Managing Director, Internet Capital Group)
James Voelker (former Nextlink CEO)
Deutsche Bank Technology Fund (internet, financials, and telecom funder)
Silicon Valley Angels (involved in hottest early-stage companies today)

http://www.digimine.com/company/management.htm

*Fig. 19M*

Fig. 19N digiMine Careers digiMine℠

| MAIN | SERVICES | COMPANY | MEDIA CENTER | CUSTOMER LOG IN | our mission   management   customers   careers   contact us

1907

COMPANY

Careers

Welcome to a Brave New Workplace

Welcome to digiMine. We're a young, well-funded company with huge potential. Our founders are industry visionaries with a wealth of marketing, product development and research experience. They have held leadership positions at Microsoft and NASA where they have built and managed dynamic, successful organizations. We also have an equally impressive roster of investors backing us.

At digiMine, you'll have the chance to spread your entrepreneurial wings and soar. Along the way, you'll use your skills and knowledge to help digiMine reach new heights. In return for your hard work, you'll enjoy an industry-leading compensation package that includes stock options. So you can tie your financial success to your achievements at the company.

digiMine is a passionate group of people. We're passionate about creating revolutionary data mining and data warehousing technologies. We're passionate about delivering great customer service. We're passionate about winning. And we're passionate about building a workplace where you'll have many opportunities to contribute to our success and receive generous rewards for your hard work.

Check out our career opportunities and see why one Silicon Valley angel investor called us "the hottest startup ever to come out of Seattle."

career opportunities »

✦ Check out our career opportunities and see why one Silicon Valley angel investor called us "the hottest startup ever to come out of Seattle." ⟵ 1953

Life at digiMine
About Seattle/Kirkland
digiMine in the news

⟵ 1950 http://www.digimine.com/company/careers/  ⟵ 1920

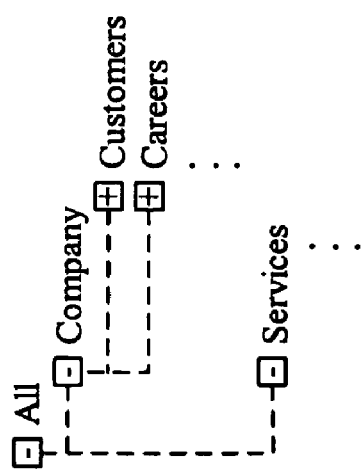

*Fig. 19AD*

Content Set A
Category Hierarchy Table 2250

| Category 2251 | ID 2252 | Category Parent 2253 |
|---|---|---|
| Services | 1 | — |
| Company | 2 | — |
| Media Center | 3 | — |
| Analysis | 4 | — |
| Service Benefits | 5 | 1 |
| Take the Quiz | 6 | 1 |
| ⋮ | | |
| Careers | 20 | 2 |
| ⋮ | | |
| R&D | 30 | 20 |
| QA | 31 | 20 |
| ⋮ | | |

Content Set A Content Category Table 2260

| Content 2261 | Category Page Type Definition ID 2262 |
|---|---|
| overviewA.htm | — |
| overviewAs.htm | 1 |
| servicebenefits.htm | 1 |
| ⋮ | |
| rd.htm | 30 |
| ⋮ | |

*Fig. 22B*

PARSING NAVIGATION INFORMATION TO IDENTIFY OCCURRENCES OF EVENTS OF INTEREST

CROSS REFERENCE TO RELATED APPLICATIONS

This application is a continuation-in-part of U.S. patent application Ser. No. 09/613,847, filed Jul. 11, 2000, which is hereby incorporated by reference in its entirety.

TECHNICAL FIELD

The described technology relates to analyzing computer interaction or usage data, such as web site navigation information, to identify occurrences of events of interest.

BACKGROUND

Today's computer networking environments, such as the Internet, offer mechanisms for delivering documents and other information between heterogeneous computer systems. However, in order for a computer to communicate with another computer, the computer must be able to identify and contact that other computer. Computers that are part of the Internet each have a unique numeric identifier, called an "Internet Protocol address," that other computers can use for communication. Thus, when a communication is sent from a client computer to a destination computer over the Internet, the client computer typically specifies the Internet Protocol ("IP") address of the destination computer in order to facilitate the routing of the communication to the destination computer. For example, when a request for a World Wide Web page document ("web page") is sent from a client computer to a web server computer ("web server" or "web site server") from which that web page can be obtained, the client computer typically includes the IP address of the web server.

In order to make the identification of destination computers more mnemonic, a Domain Name System (DNS) is used to translate a unique alphanumeric name for a destination computer, called a "domain name," into the IP address for that computer. For example, the domain name for a hypothetical computer operated by digiMine Corporation ("digiMine") may be "comp23.digimine.com". Using domain names, a user attempting to communicate with this computer could specify a destination of "comp23.digimine.com" rather than the IP address of the computer (e.g., 198.81.209.25).

The subset of Internet sites that comprise the World Wide Web network also supports a standard protocol for requesting and receiving web page documents. This protocol, known as the Hypertext Transfer Protocol (or "HTTP"), defines a message passing protocol for sending and receiving packets of information between diverse applications. Details of HTTP can be found in various documents, including T. Berners-Lee et al., *Hypertext Transfer Protocol—HTTP 1.0*, Request for Comments (RFC) 1945, MIT/LCS, May 1996. Each HTTP message follows a specific layout, which includes among other information, a header which contains information specific to the request or response. Further, each HTTP request message contains a Universal Resource Identifier (or "URI"), which specifies to which network resource the request is to be applied.

Thus, a user can request a particular resource (e.g., a web page or a file) that is available from a web server by specifying a unique URI for that resource. A URI can be a Uniform Resource Locator ("URL"), Uniform Resource Name ("URN"), or any other formatted string that identifies a network resource. URLs include a protocol to be used in accessing the resource (e.g., "http:" for HTTP), the domain name or IP address of the server providing the resource (e.g., "comp23.digimine.com"), and optionally a server-specific path to the resource (e.g., "/help/HelpPage.html"), thus resulting in the URL "http://comp23.digimine.com/help/HelpPage.html" in this example. In response to a user specifying such a URL, the comp23.digimine.com server would typically return a copy of the "HelpPage.html" file to the user. In addition, in situations where the identified resource corresponds to an executable program on the web server (e.g., a CGI script, Active Server Page (ASP) file, or Java Server Page (JSP) file), the URL can be followed by a query string that will be provided as input to the executable program. Each such query string includes one or more query string parameter names accompanied by a corresponding value (e.g., the parameter names "name1" and "name2" and corresponding values "3" and "ab" in "http://www.digimine.com/search.asp?name1=3&name2=ab"). URLs are discussed in detail in T. Berners-Lee, et al., *Uniform Resource Locators (URL)*, RFC 1738, CERN, Xerox PARC, Univ. of Minn., December 1994.

FIG. 1 illustrates how a browser application enables users to navigate among nodes on the web network by requesting and receiving web pages. For the purposes of this discussion, a web page is any type of document that abides by the HTML format. That is, the document includes an "<HTML>" statement. Thus, a web page is also referred to as an HTML document. The HTML format is a document mark-up language, defined by the Hypertext Markup Language ("HTML") specification. HTML defines tags for specifying how to interpret the text and images stored in an HTML document. For example, there are HTML tags for defining paragraph formats and for emboldening and underlining text. In addition, the HTML format defines tags for adding images to documents and for formatting and aligning text with respect to images. HTML tags appear between angle brackets, for example, <HTML>. Further details of HTML are discussed in T. Berners-Lee and D. Connolly, *Hypertext Markup Language-2.0*, RFC 1866, MIT/W3C, November 1995.

In FIG. 1, a web browser application 101 is shown executing on a client computer 102, which communicates with a server computer 103 by sending and receiving HTTP packets (messages). HTTP messages may also be generated by other types of computer programs, such as spiders and crawlers. The web browser "navigates" to new locations on the network to browse (display) what is available at these locations. In particular, when the web browser "navigates" to a new location, it requests a new document from the new location (e.g., the server computer) by sending an HTTP-request message 104 using any well-known underlying communications wire protocol. The HTTP-request message follows the specific layout discussed above, which includes a header 105 and a URI field 106, which specifies the network location to which to apply the request. When the server computer specified by URI receives the HTTP-request message, it interprets the message packet and sends a return message packet to the source location that originated the message in the form of an HTTP-response message 107. It also stores a copy of the request and basic information about the requesting computer in a log file. In addition to the standard features of an HTTP message, such as the header 108, the HTTP-response message contains the requested HTML document 109. When the HTTP-response message reaches the client computer, the web browser application extracts the HTML document from the message, and parses and interprets (executes) the HTML code in the document and displays the document on a display screen of the client computer as specified by the HTML tags. HTTP can also be used to transfer other media types, such as the Extensible Markup Language ("XML") and graphics interchange format ("GIF") formats.

The World Wide Web is especially conducive to conducting electronic commerce ("e-commerce"). E-commerce generally refers to commercial transactions that are at least partially conducted using the World Wide Web. For example, numerous web sites are available through which a user using a web browser can purchase items, such as books, groceries, and software. A user of these web sites can browse through an electronic catalog of available items to select the items to be purchased. To purchase the items, a user typically adds the items to an electronic shopping cart and then electronically pays for the items that are in the shopping cart. The purchased items can then be delivered to the user via conventional distribution channels (e.g., an overnight courier) or via electronic delivery when, for example, software is being purchased. Many web sites are also informational in nature, rather than commercial in nature. For example, many standards organizations and governmental organizations have web sites with a primary purpose of distributing information. Also, some web sites (e.g., a search engine) provide information and derive revenue from advertisements that are displayed.

The success of any web-based business depends in large part on the number of users who visit the business's web site and that number depends in large part on the usefulness and ease-of-use of the web site. Web sites typically collect extensive information on how its users use the site's web pages. This information may include a complete history of each HTTP request received by and each HTTP response sent by the web site. The web site may store this information in a navigation file, also referred to as a log file or click stream file. By analyzing this navigation information, a web site operator may be able to identify trends in the access of the web pages and modify the web site to make it easier to use and more useful. Because the information is presented as a series of events that are not sorted in a useful way, many software tools are available to assist in this analysis. A web site operator would typically purchase such a tool and install it on one of the computers of the web site. There are several drawbacks with the use of such an approach of analyzing navigation information. First, the analysis often is given a low priority because the programmers are typically busy with the high priority task of maintaining the web site. Second, the tools that are available provide little more than standard reports relating to low-level navigation through a web site. Such reports are not very useful in helping a web site operator to visualize and discover high-level access trends. Recognition of these high-level access trends can help a web site operator to design the web site. Third, web sites are typically resource intensive, that is they use a lot of computing resources and may not have available resources to effectively analyze the navigation information.

It would also be useful to analyze the execution of computer programs other than web server programs. In particular, many types of computer programs generate events that are logged by the computer programs themselves or by other programs that receive the events. If a computer program does not generate explicit events, another program may be able to monitor the execution and generate events on behalf of that computer program. Regardless of how event data is collected, it may be important to analyze that data. For example, the developer of an operating system may want to track and analyze how the operating system is used so that the developer can focus resources on problems that are detected, optimize services that are frequently accessed, and so on. The operating system may generate a log file that contains entries for various types of events (e.g., invocation of a certain system call).

Thus, as noted above, interaction or usage data (e.g., web site navigation information or computer program event information) can contain important low-level information about interactions and usage that have occurred, but current techniques for extracting high-level summaries or analyzing such interactions or usage are limited. For example, it would be useful in many situations to know the number of occurrences of interactions or uses of a specified category or type during a specified time period, or to know how such occurrences relate to other occurrences of interest. Similarly, when a sequence of interactions or uses is of interest, it would be useful to know the number of occurrences of each interaction or usage in the sequence. In addition, analysis of interaction or usage data is further complicated when the format or content types of such data changes over time, such as to reflect changes in a corresponding web site or computer program. It would therefore be useful to have techniques for effectively identifying and extracting useful high-level information from interaction or usage data, and for tracking changes in the format or content type of the interaction or usage data. Accordingly, techniques for analyzing interaction and usage data to obtain such information would have significant utility.

BRIEF DESCRIPTION OF THE DRAWINGS

FIGS. 22A and 22B illustrate example hierarchical category information for customer web pages.

DETAILED DESCRIPTION

Figure 1:
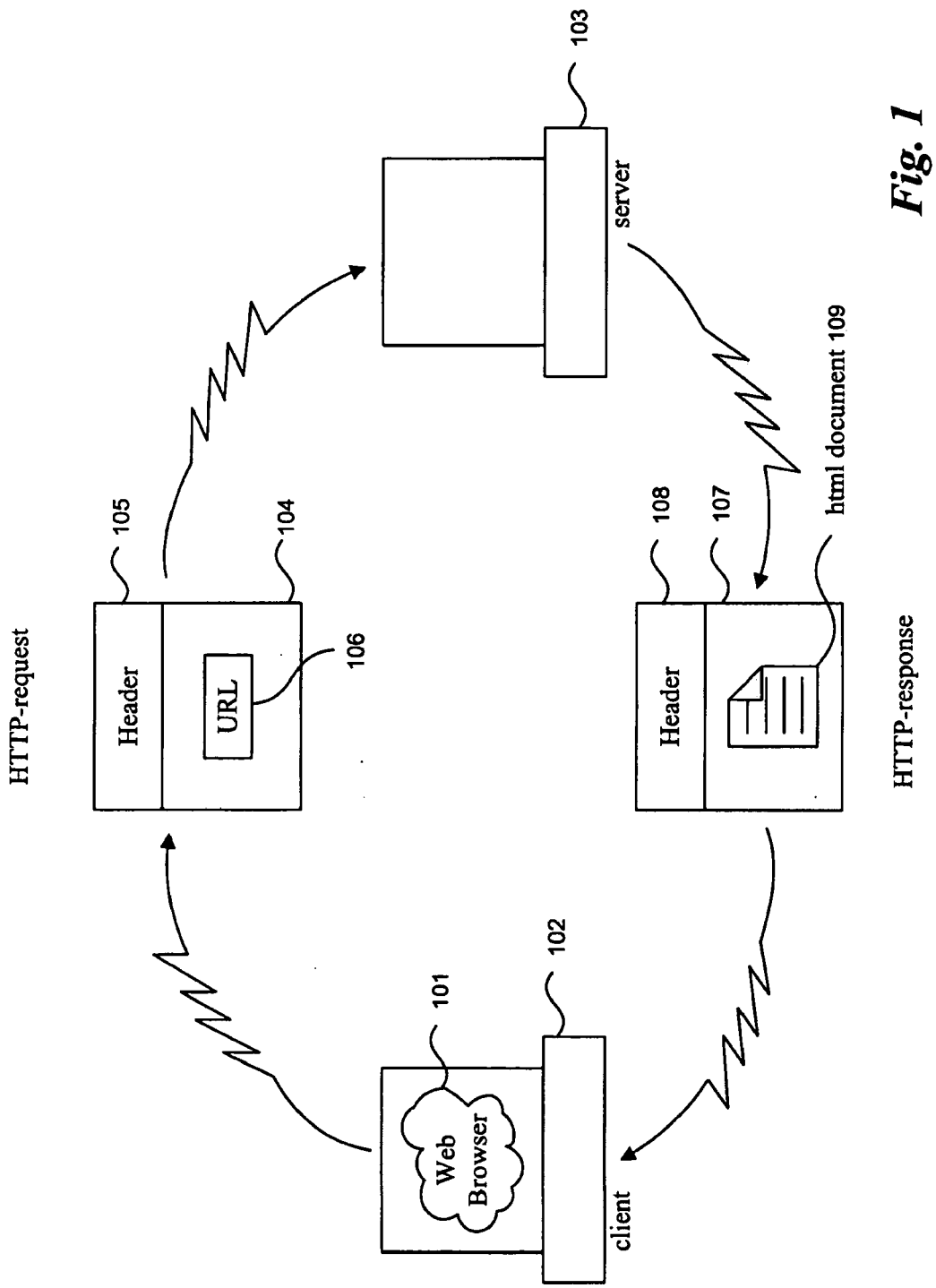
FIG. 1 illustrates how a browser application enables users to navigate among nodes on the web network by requesting and receiving web pages.

A method and system for providing customers with access to and analysis of interaction or usage data (e.g., navigation data collected at customer web sites or computer program event information) is provided. The interaction or usage data, hereinafter "interaction data" or "event data," may be stored in log files and supplemented with data from other sources, such as product databases and customer invoices. In one embodiment, a data warehouse system collects customer data from the customer web sites and stores the data at a data warehouse server. The customer data may include application event data (e.g., click stream log files), user attribute data of users of the customer web site (e.g., name, age, and gender), product data (e.g., catalog of products offered for sale by the customer), shopping cart data (i.e., identification of the products currently in a user's shopping cart), and so on. The data warehouse server interacts with the customer servers to collect the customer data on a periodic basis. The data warehouse server may provide instructions to the customer servers identifying the customer data that is to be uploaded to the data warehouse server. These instructions may include the names of the files that contains the customer data and the name of the web servers on which the files reside. These instructions may also indicate the time of the day when the customer data is to be uploaded to the data warehouse server.

When the data warehouse server receives customer data, it converts the customer data into a format that is more conducive to processing by decision support system applications used to analyze customer data. For example, the data warehouse server may analyze low-level navigation events (e.g., each HTTP request that is received by the customer web site) to identify high-level events (e.g., a user session). The data warehouse server then stores the converted data into a data warehouse. The data warehouse server functions as an application service provider that provides various decision support system applications for the customers. For example, the data warehouse server provides decision support system applications to analyze and graphically display the results of the analysis for a customer. The decision support system applications may be accessed through a web browser. In one embodiment, the customer servers are connected to the data warehouse server via the Internet and the data warehouse server provides data warehousing services to multiple customers.

The data warehouse system may provide a data processor component that converts the log files into a format that is more conducive to processing by the decision support system applications. In one embodiment, the converted data is stored in a data warehouse that includes fact and dimension tables. Each fact table contains entries corresponding to a type of fact derived from the log files. For example, a web page access fact table may contain an entry for each web page access identified in the log files. Each entry may reference attributes of the web page access, such as the identity of the web page and identity of the accessing user. The values for each attribute are stored in a dimension table for that attribute. For example, a user dimension table may include an entry for each user and the entries of the web access fact table may include a user field that contains an index (or some other reference) to the entry of the user dimension table for the accessing user. The user dimension table may contain the names of the users and other user-specific information. Alternatively, the user dimension table may itself also be a fact table that includes references to dimension tables for the attributes of users. The data warehouse may also include fact tables and dimension tables that represent high-level facts and attributes derived from the low-level facts and attributes of the log files. For example, high-level facts and attributes may not be derivable from only the data in a single log entry. For example, the higher level category (e.g., shoes or shirts) of a web page may be identified using a mapping of web page URIs to categories. These categories may be stored in a category dimension table. Also, certain facts, such as the collection of log entries that comprise a single user web access session or visit, may only be derivable by analyzing a series of log entries.

The data processor component may have a parser component and a loader component. The parser of the data processor parses and analyzes a log file and stores the resulting data in a local data warehouse that contains information for only that log file. The local data warehouse may be similar in structure (e.g., similar fact and dimension tables) to the main data warehouse used by decision support system applications. The local data warehouse may be adapted to allow efficient processing by the parser. For example, the local data warehouse may be stored in primary storage (e.g., main memory) for speed of access, rather than in secondary storage (e.g., disks). The parser may use parser configuration data that defines, on a customer-by-customer basis, the high-level data to be derived from the log entries. For example, the parser configuration data may specify the mapping of URIs to web page categories. The loader of the data processor transfers the data from the local data warehouse to the main data warehouse. The loader may create separate partitions for the main data warehouse. These separate partitions may hold the customer data for a certain time period (e.g., a month's worth of data). The loader adds entries to the main fact tables (i.e., fact tables of the main data warehouse) for each fact in a local fact table (i.e., fact table of the local data warehouse). The loader also adds new entries to the main dimension tables to represent attribute values of the local dimension tables that are not already in the main dimension tables. The loader also maps the local indices (or other references) of the local dimension tables to the main indices used by the main dimension tables.

Figure 2A:
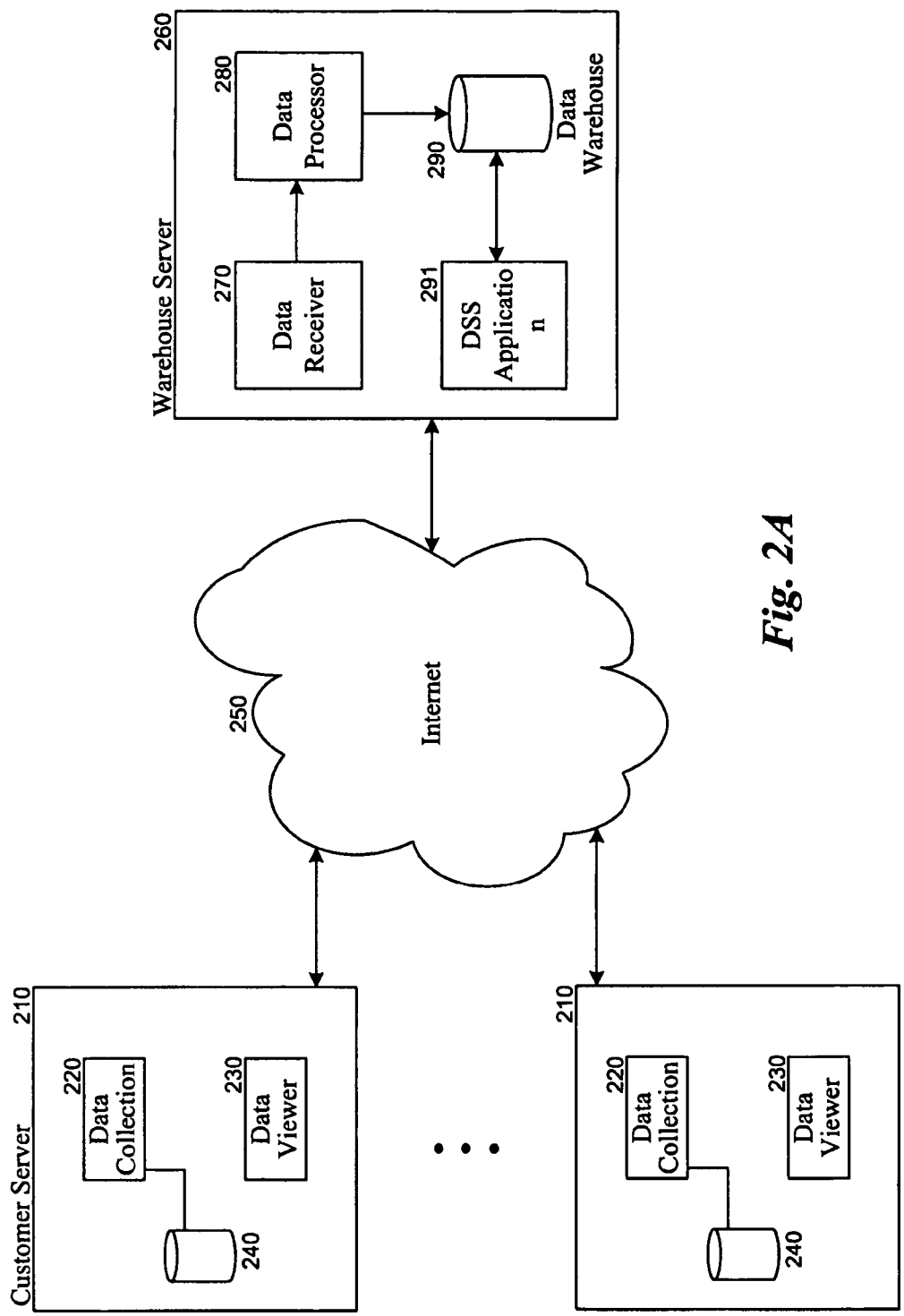
FIG. 2A is a block diagram illustrating components of the data warehouse system in one embodiment.

FIG. 2A is a block diagram illustrating components of the data warehouse system in one embodiment. The data warehouse system includes customer components that execute on the customer servers and data warehouse components that execute on the data warehouse server. The customer servers 210 and the data warehouse server 260 are interconnected via the Internet 250. Customer components executing on a customer server includes a data collection component 220 and a data viewer 230. The data viewer may reside on a client computer of the customer, rather than a server. The data collection component collects the customer data from the storage devices 240 of the customer servers. The data viewer provides access for viewing of data generated by the decision support system applications of the data warehouse server. In one embodiment, the data viewer may be a web browser. The data warehouse server includes a data receiver component 270, the data processor component 280, the data warehouse 290, and decision support system applications 291. The data receiver component receives customer data sent by the data collection components executing at the various customer web sites. The data processor component processes the customer data and stores it in the data warehouse. The decision support system application provides the customer with tools for analyzing and reviewing the customer data that is stored in the main data warehouse. Analysis performed on and reports generated from customer data are described in U.S. patent application Ser. No. 09/638,836, entitled "Identifying and Reporting on Combinations of Events in Usage Data" and filed Aug. 14, 2000; U.S. patent application Ser. No. 09/742,685, entitled "Report Depicting Extent Of Completion Of A Process" and filed Dec. 20, 2000; and U.S. patent application Ser. No. 09/613,846, entitled "Web-Based Extraction and Display of Information for Graphical Structures" and filed Jul. 11, 2000, each of which are hereby incorporated by reference. In one embodiment, each customer has its own dimension and fact tables so that multiple customers' information is not intermingled.

Figure 2B:
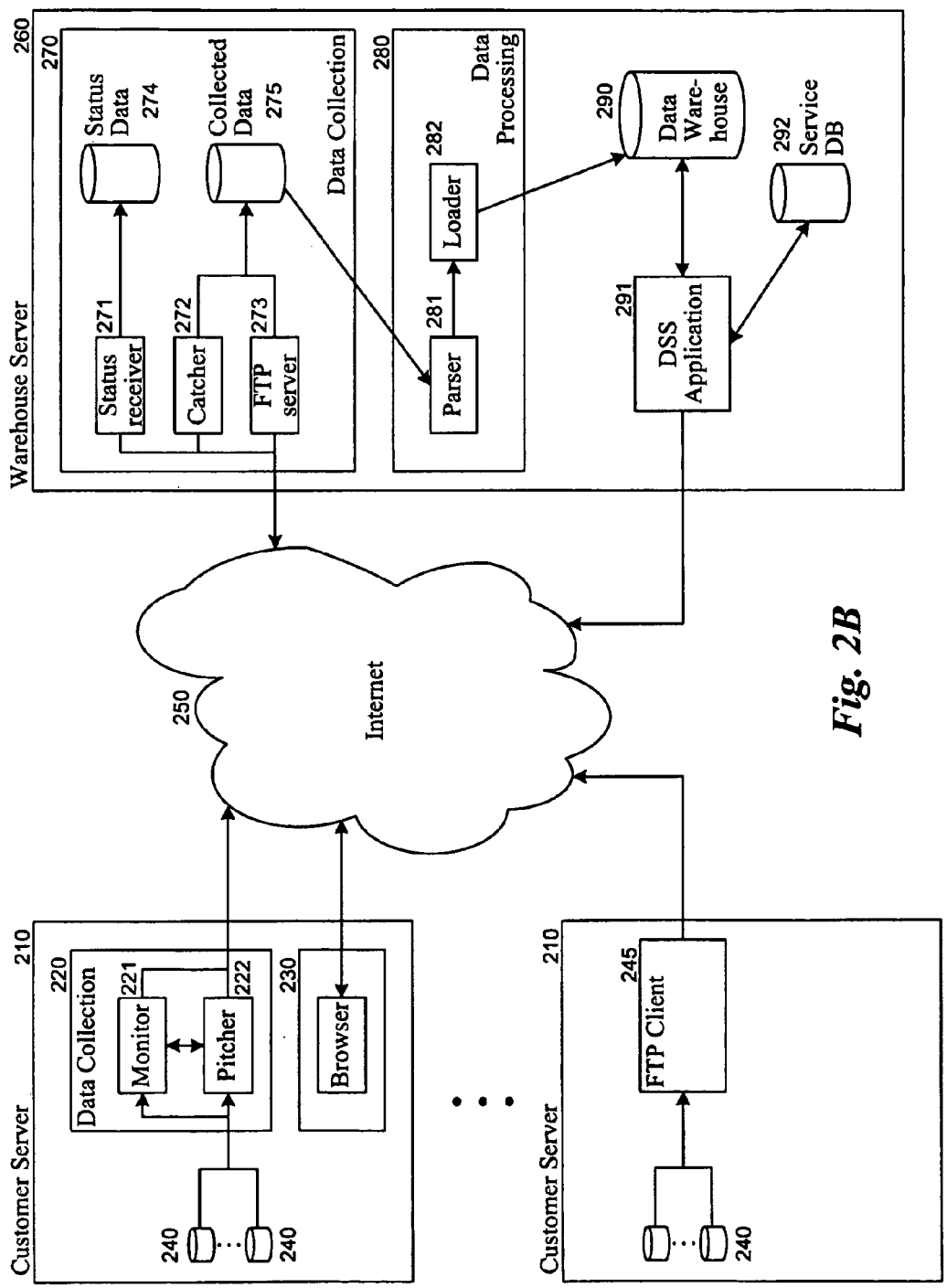
FIG. 2B is a block diagram illustrating details of the components of the data warehouse system in one embodiment.

FIG. 2B is a block diagram illustrating details of the components of the data warehouse system in one embodiment. The data collection component 220 includes a monitor sub-component 221 and a pitcher sub-component 222. The data collection component is described in more detail in U.S. patent application Ser. No. 09/613,845, entitled "Method and System for Monitoring a Resource via the Web" and filed Jul. 11, 2000, which is hereby incorporated by reference. The pitcher is responsible for retrieving instructions from the data warehouse server, collecting the customer data in accordance with the retrieved instructions, and uploading the customer data to the data warehouse server. The monitor is responsible for monitoring the operation of the pitcher and detecting when the pitcher may have problems in collecting and uploading the customer data. When the monitor detects that a problem may occur, it notifies the data warehouse server so that corrective action may be taken in advance of the collecting and uploading of the customer data. For example, the pitcher may use certain log on information (e.g., user ID and password) to access a customer web server that contains customer data to be uploaded. The monitor may use that log on information to verify that the log on information will permit access to the customer data. Access may be denied if, for example, a customer administrator inadvertently deleted from the customer web server the user ID used by the pitcher. When the monitor provides advance notification of a problem, the problem might be corrected before the pitcher attempts to access the customer data. The monitor also periodically checks the pitcher to ensure that the pitcher is executing and, if executing, executing correctly.

The data receiver component of the data warehouse server includes a status receiver sub-component 271, a catcher sub-component 272, an FTP server 273, a status database 274, and a collected data database 275. The status receiver receives status reports from the customer servers and stores the status information in the status database. The catcher receives and processes the customer data that is uploaded from the customer web sites and stores the data in the collected data database.

The data processor component includes a parser sub-component 281 and a loader sub-component 282. The parser analyzes the low-level events of the customer data and identifies high-level events and converts the customer data into a format that facilitates processing by the decision support system applications. The loader is responsible for storing the identified high-level events in the data warehouse 290. In one embodiment, a customer may decide not to have the data collection component executing on its computer systems. In such a case, the customer server may include an FTP client 245 that is responsible for periodically transferring the customer data to the FTP server 273 of the data warehouse server. The data receiver may process this customer data at the data warehouse server in the same way as the pitcher processes the data at the customer servers. The processed data is then stored in the collected data database.

Figure 3:
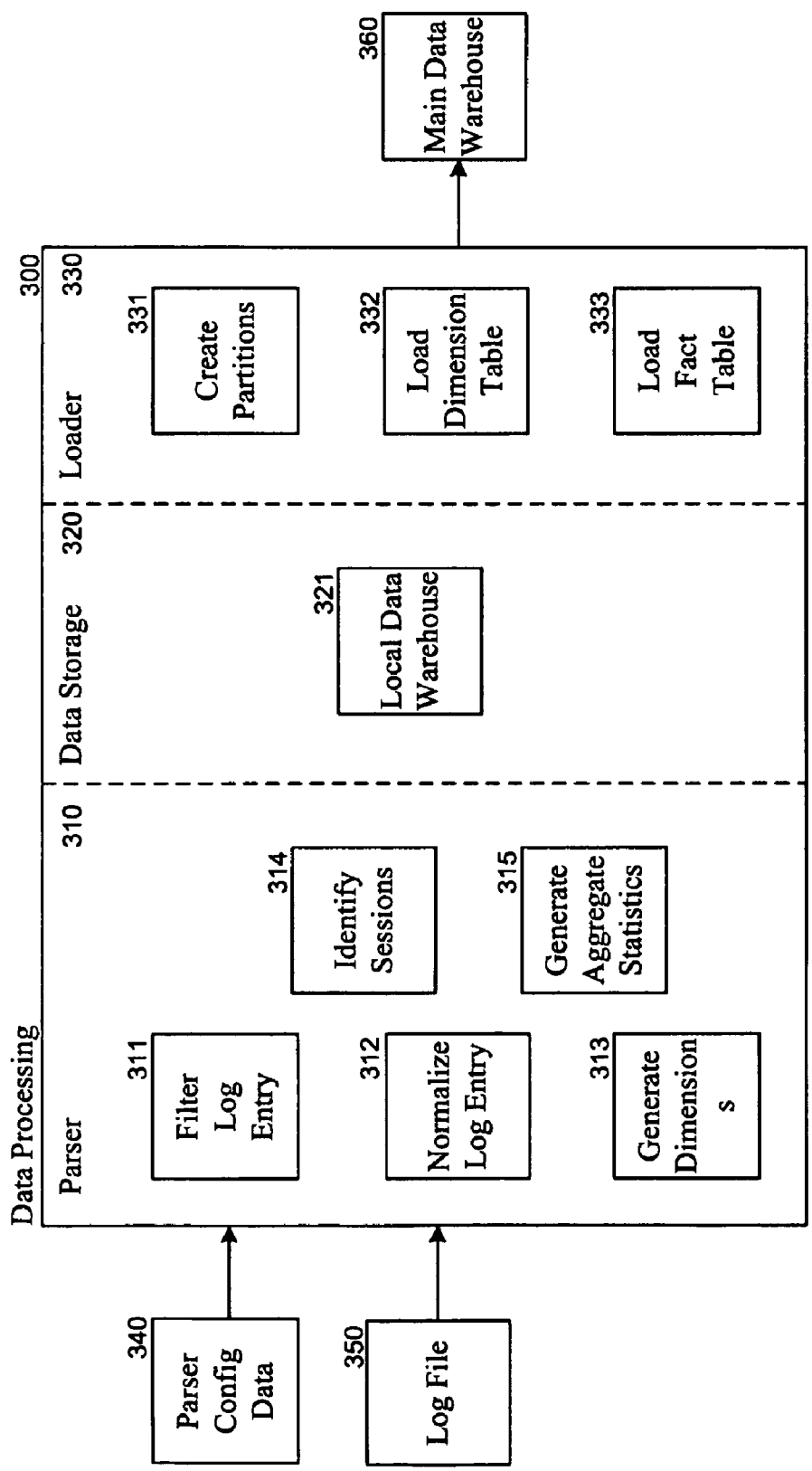
FIG. 3 is a block diagram illustrating the sub-components of the data processor component in one embodiment.

FIG. 3 is a block diagram illustrating the sub-components of the data processor component in one embodiment. The data processor component 300 includes a parser 310, data storage area 320, and a loader 330. The data processor component inputs parser configuration data 340 and a log file 350 and updates the main data warehouse 360. The parser configuration data may include a mapping of actual web sites to logical sites and a mapping of a combination of Uniform Resource Identifiers ("URIs") and query strings of the log entries to page definitions (e.g., categories) and event definitions. The parser processes the entries of the log file to generate facts and dimensions to eventually be stored in the main data warehouse. The parser identifies events in accordance with the parser configuration data. The parser includes a filter log entry component 311, a normalize log entry component 312, a generate dimensions component 313, an identify sessions component 314, and a generate aggregate statistics component 315. The filter log entry component identifies which log entries should not be included in the main data warehouse. For example, a log entry that has an invalid format should not be included. The normalize log entry component normalizes the data in a log entry. For example, the component may convert all times to Greenwich Mean Time ("GMT"). The generate dimensions component identifies the various dimensions related to a log entry. For example, a dimension may be the Uniform Resource Identifier of the entry or the logical site identifier. The identify sessions component processes the parsed log file data stored in the local data warehouse to identify user sessions. A user session generally refers to the concept of a series of web page accesses that may be related in some way, such as by temporal proximity. The generate aggregate statistics component aggregates data for the log file being processed as each log entry is processed or after the log file is parsed. The data storage area 320 includes a local data warehouse 321. In one embodiment, the local data warehouse is stored non-persistently (or temporarily) in main memory of the computer system. The local data warehouse may contain fact tables and dimension tables that correspond generally to the tables of the main data warehouse 360. The loader retrieves the information from the local data warehouse and stores the information in the main data warehouse. The loader includes a create partitions component 331, a load dimension table component 332, and a load fact table component 333. The create partitions components creates new partitions for the main data warehouse. A partition may correspond to a collection of information within a certain time range. For example, the main data warehouse may have a partition for each month, which contains all the data for that month. The load dimension table component and the load fact table component are responsible for loading the main data warehouse with the dimensions and facts that are stored in the local data warehouse.

In one embodiment, the log file is a web server log file of a customer. The log file may be in the "Extended Log File Format" as described in the document "http://www.w3.org/TR/WD-logfile-960323" provided by the World Wide Web Consortium, which is hereby incorporated by reference. According to that description, the log file contains lines that are either directives or entries. An entry corresponds to a single HTTP transaction (e.g., HTTP request and an HTTP response) and consists of a sequence of fields (e.g., integer, fixed, URI, date, time, and string). The meaning of the fields in an entry is specified by a field directive specified in the log file. For example, a field directive may specify that a log entry contains the fields date, time, client IP address, server IP address, and success code. Each entry in the log file would contain these five fields.

The parser configuration data defines logical sites, page definitions, and event definitions. A logical site is a collection of one or more IP addresses and ports that should be treated as a single web site. For example, a web site may actually have five web servers with different IP addresses that handle HTTP requests for the same domain. These five IP addresses may be mapped to the same logical site to be treated as a single web site. The page definitions define the format of the URIs of log entries that are certain page types. For example, a URI with a query string of "category=shoes" may indicate a page type of "shoes." Each event definition defines an event type and a value for that event type. For example, a log entry with a query string that includes "search=shoes" represents an event type of "search" with an event value of "shoes." Another log entry with a query string of "add=99ABC" may represent an event type of "add" an item to the shopping cart with an event value of item number "99ABC."

Figure 4:
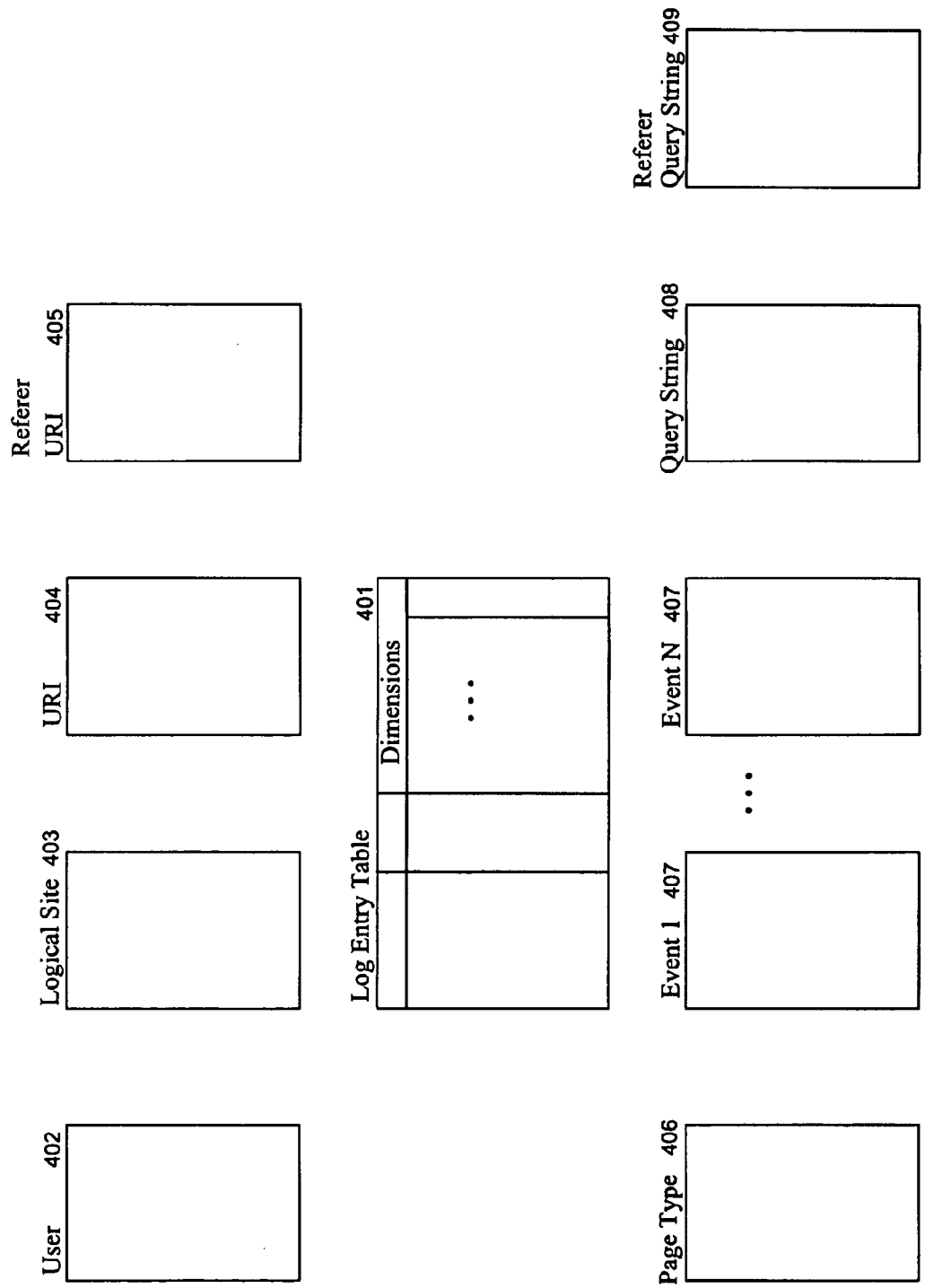
FIG. 4 is a block diagram illustrating some of the tables of the local data warehouse and the main data warehouse in one embodiment.

FIG. 4 is a block diagram illustrating some of the tables of the local data warehouse and the main data warehouse in one embodiment. These data warehouses are databases that include fact tables and dimension tables. A fact table contains an entry for each instance of fact (e.g., web page access). A dimension table contains an entry for each possible attribute value of an attribute (e.g., user). The entries of a fact table contain dimension fields that refer to the entries into the dimension tables for their attribute values. A table may be both a fact table and a dimension table. For example, a user dimension table with an entry for each unique user may also be a fact table that refers to attributes of the users that are stored in other dimension tables. The data warehouses contain a log entry table 401, a user table 402, a logical site table 403, a URI table 404, a referrer URI table 405, a page type table 406, event type tables 407, a query string table 408, and a referrer query string table 409. The log entry table is a fact table that contains an entry for each log entry that is not filtered out by the parser. The other tables are dimension tables for the log entry table. The user table contains an entry for each unique user identified by the parser. The logical site table contains an entry for each logical site as defined in the parser configuration data. The URI table contains an entry for each unique URI of an entry in the log entry table. The referrer URI table contains an entry for each referrer URI of the log entry table. The page type table contains an entry for each page type identified by the parser as defined in the parser configuration data. The data warehouse contains an event table for each type of event defined in the parser configuration data. Each event table contains an entry for each event value of that event type specified in an entry of the log entry table. The query string table contains an entry for each unique query string identified in an entry of the log entry table. The referrer query string contains an entry for each unique referrer query string identified in an entry of the log entry table.

Table 1 is an example portion of a log file. The "#fields" directive specifies the meaning of the fields in the log entries. Each field in a log entry is separated by a space and an empty field is represented by a hyphen. The #fields directive in this example indicates that each entry includes the date and time when the transaction was completed (i.e., "date" and "time"), the client IP address (i.e., "c-ip"), and so on. For example, the first log entry has a data and time of "2000-06-01 07:00:04" and a client IP address of "165.21.83.161."

TABLE 1

Software' Microsoft Internet Information Server 4.0
Version. 1.0
Date: 2000-06-01 07:00:04
Fields: date time c-ip cs-username s-sitename s-computername s-ip cs-method cs-uri-stem cs-uri-query sc-status sc-win32-status sc-bytes cs-bytes time-taken s-port cs-version cs(User-Agent) cs(Cookie) cs(Referrer)
2000-06-01 07:00:04 165.21.83.161 – W3SVC2 COOK__002 206.191.163.41 GET /directory/28.ASP – 200 0 148428 369 9714 80 HTTP/1.0 Mozilla/3.04+(Win95;+I) ASPSESSIONIDQQGGQGPG=JBCCFIPBBHHDANBAFFIGLGPH http://ecommerce.com/Default.asp
2000-06-01 07:00:20 4.20.197.70 – W3SVC2 COOK__002 206.191.163.41 GET /Default.asp – 302 0 408 259 30 80 HTTP/1.0 Mozilla/4.0+(compatible;+Keynote–Perspective+4.0) – –
2000-06-01 07:00:20 4.20.197.70 – W3SVC2 COOK__002 206.191.163.41 GET /Default.asp – 200 0 41245 266 200 80 HTTP/1.0 Mozilla/4.0+(compatible;+Keynote–Perspective+4.0) – –
2000-06-01 07:00:27 204.182.65.192 – W3SVC2 COOK__002 206.191.163.41 HEAD /Default.asp – 302 0 254 66 40 80 HTTP/1.0 Ipswitch__WhatsUp/3.0 – –
2000-06-01 07.00.32 24.10.69.137 – W3SVC2 COOK__002 206.191.163.41 GET /directory/541.asp – 200 0 22427 459 421 80 HTTP/1.0 Mozilla/4.7+[en]+(Win98;+U) ASPSESSIONIDQQGGQGPG=BHBCFIPBEJPNOMDPKCGLKNGC;
+ARSiteUser=1%2DC2B25364%2D3775%2D11D4%2DBAC1%2D0050049BD2E4;+ARSites=ALR=1
http://ecommerce.com/directory/34.asp TABLE 1-continued

```
2000-06-01 07:00:34 192.102.216.101 - W3SVC2 COOK_002 206.191.163.41 GET /encyc/terms/L/7276.asp -
200      0    20385    471    290    80    HTTP/1.0    Mozilla/4.7+[en]+(X11;+I;+SunOS+5.5.1+sun4u)
ASPSESSIONIDQQGGQGPG=                                    PKBCFIPBIKONBPDHKDMMEHCE
http://search.ecommerce.com/gsearchresults.asp?site=ecommerce&ecommerce=ecommerce& allsites=1&q1=loin
2000-06-01 07:00:34 216.88.216.227 - W3SVC2 COOK_002 206.191.163.41 GET /default.asp - 200 0 41253 258
180 80 HTTP/1.1 Mozilla/4.0+(compatible;+MSIE+4.01;+MSN+2.5,+MSN+2.5;+Windows-98) - -
2000-06-01 07:00:36 199.203.4.10 - W3SVC2 COOK_002 206.191.163.41 GET /Default.asp - 302 0 408 485 30
80       HTTP/1.0            Mozilla/4.0+(compatible;+MSIE+5.01;+Windows+98;+TUCOWS)
SITESERVER=ID=22fl17fb3708b2278f3c 426796a78e2a -
2000-06-01 07:00:37 199.203.4.10 - W3SVC2 COOK_002 206.191.163.41 GET /Default.asp - 200 0 41277 492
421     80     HTTP/1.0              Mozilla/4.0+(compatible;MSIE+5.01;+Windows+98;+TUCOWS)
SITESERVER=ID=22fl17fb3708b2278f3c 426796a78e2a -
2000-06-01 07:00:43 24.10.69.137 - W3SVC2 COOK_002 206.191.163.41 GET /directory/34.asp - 200 0 17835
458                        320                          80                           HTTP/1.0
Mozilla/4.7+[en]+(Win98;+U)ASPSESSIONIDQQGGQGPG=BHBCFIPBEJPNOMDPKCGLKNGC;
+ARSiteUser=1%2DC2B25364%2D3775%2D11D4%2DBAC1%2D0050049BD2E4;+ARSites=ALR=1
http://ecommerce. com/directory/25.asp
2000-06-01 07:00:47 199.203.4.10 - W3SVC2 COOK_002 206.191.163.41 GET /jumpsite.asp
jumpsite=5&Go.x=16&Go.y=14    302    0    341    611    40    80    HTTP/1.0
Mozilla/4.0+(compatible;+MSIE+5.01;+Windows+98;+                                   TUCOWS)
SITESERVER=ID=22fl17fb3708b2278f3c426796a78e2a;+ASPSESSIONIDQQGGQGPG=FCCCFIPBKJM
BDJJHBNCOEDGH http://ecommerce.com/Default.asp
2000-06-01 07:00:47 24.10.69.137 - W3SVC2 COOK_002 206.191.163.41 GET /directory/538.asp - 200 0 27471
459         881         80         HTTP/1.0              Mozilla/4.7+[en]+(Win98;+U)
ASPSESSIONIDQQGGQGPG=BHBCFIPBEJPNOMDPKCGLKNGC;
+ARSiteUser=1%2DC2B25364%2D3775%2D11D4%2DBAC1%2D0050049BD2E4;+ARSites=ALR=1
http://ecommerce.com/directory/34.asp
2000-06-01 07:00:47 207.136.48.117 - W3SVC2 COOK_002 206.191.163.41 GET /directory/511.asp - 200 0
77593 369 12538 80 HTTP/1.0 Mozilla/3.01Gold+(Win95;+I) ASPSESSIONIDQQGGQGPG=MFACFIPBDBN
PBFPBOENJKHJN;
+ARSiteUser=1%2DC2B251E5%2D3775%2D11D4%2DBAC1%2D0050049BD2E4;+ARSites=ALR=1
http://ecommerce.com/directory/506.asp
2000-06-01 07:00:49 192.102.216.101 - W3SVC2 COOK_002 206.191.163.41 GET /encyc/A1.asp ARRefSite=
15&ARRefCookie=1-C2B253B8-3775-11D4-BAC1-0050049BD2E4 200 0 47193 457 260 80 HTTP/1.0
Mozilla/4.7+[en]+(X11;+I;+SunOS+5.5.1+sun4u)
ASPSESSIONIDQQGGQGPG=PKBCFIPBIKONBPDHKDMMEHCE http://ecommerce.com/hints/tips.asp
```

Table 2 is an example portion of parser configuration data. The logical site definitions map a server IP address, port, and root URI to a logical site. For example, the entry "LOGICALSITEURIDEFINITION=209.114.94.26,80,/,1" maps all the accesses to port 80 of IP address 209.114.94.26 at URIs with a prefix "/" to logical site 1. The page type definitions map a logical site identifier, URI pattern, and query string pattern to a page type. For example, the entry "PAGEKEYDEFINITION=news item, news item, 1, {prefix}=homepage_include/industrynews_detail.asp, <NewsItemID>#{Uri}" indicates that a page type of "news item" is specified for logical site 1 by a URI pattern of "/homepage_include/industrynews_detail.asp." The definition also indicates that the event value is "<NewsItemID>#{Uri}," where the URI of the log entry is substituted for "{Uri}" and the value of NewsItemID in the query string is substituted for "<NewsItemID>." The event type definitions map a site identifier, URI pattern, and query string pattern to an event type and value. The definitions also specify the name of the event type and the name of the dimension table for that event type. For example, the entry "EVENTDEFINITION=View News Article, View News Article, 1, {prefix}=/homepage_include/industrynews_detail.asp, <NewsItemId>=*, <NewsItemId>" indicates that View News Article event types are stored in the View News Article dimension table. That event type is indicated by a URI with "/homepage_include/industrynews_detail.asp," and the event value is the string that follows "<NewsItemId>=" in the query string.

TABLE 2

```
LOGICALSITEURIDEFINITION= 209.114.94.26, 80, /, 1
PAGEKEYDEFINITION= news item, news item, 1, {prefix}=/homepage_include/industrynews_detail.asp,,
   <NewsItemId>#{Uri}
PAGEKEYDEFINITION= page, page, 1,,, {Uri}
EVENTDEFINITION= Login, Login, 1, {prefix}=/registration/login.asp,,
EVENTDEFINITION= Logout, Logout, 1, {prefix}=/registration/logout.asp,,
EVENTDEFINITION= Register Page 1, Register Page 1, 1, {prefix}=/registration/register.asp,,
EVENTDEFINITION= Register Page 2, Register Page 2, 1, {prefix}=/registration/register2.asp, <UserID>=*,
EVENTDEFINITION= Registration Confirmation, Registration Confirmation, 1,
   {prefix}=/registration/register3.asp,,
EVENTDEFINITION= Abort Registration, Abort Registration, 1, {prefix}=/registration/registrationabort.asp,,
EVENTDEFINITION= Member Services, Member Services, 1, {prefix}=/registration/memberservices.asp,,
EVENTDEFINITION= Change Password, Change Password, 1, {prefix}=/registration/changepassword.asp,,
EVENTDEFINITION= Profile Edit, Profile Edit, 1, {prefix}=/registration/profile.asp,,
EVENTDEFINITION= Change Affiliation, Change Affiliation, 1, {prefix}=/registration/changeaffiliation.asp,
   <UserID>=*,
EVENTDEFINITION= Change Secret Question, Change Secret Question, 1,
```

TABLE 2-continued

{prefix}=/registration/changesecretquestion.asp,,
EVENTDEFINITION= Forgot Information, Forgot Information, 1, {prefix}=/registration/forgotinfo.asp,,
EVENTDEFINITION= Forgot Password, Forgot Password, 1, {prefix}=/registration/forgotpassword.asp,,
EVENTDEFINITION= Forgot Signin, Forgot Signin, 1, {prefix}=/registration/forgotsignin.asp,,
EVENTDEFINITION= View News Article, View News Article, 1,
{prefix}=/homepage_include/industrynews_detail.asp, <NewsItemId>=*, <NewsItemId>

Figure 5:
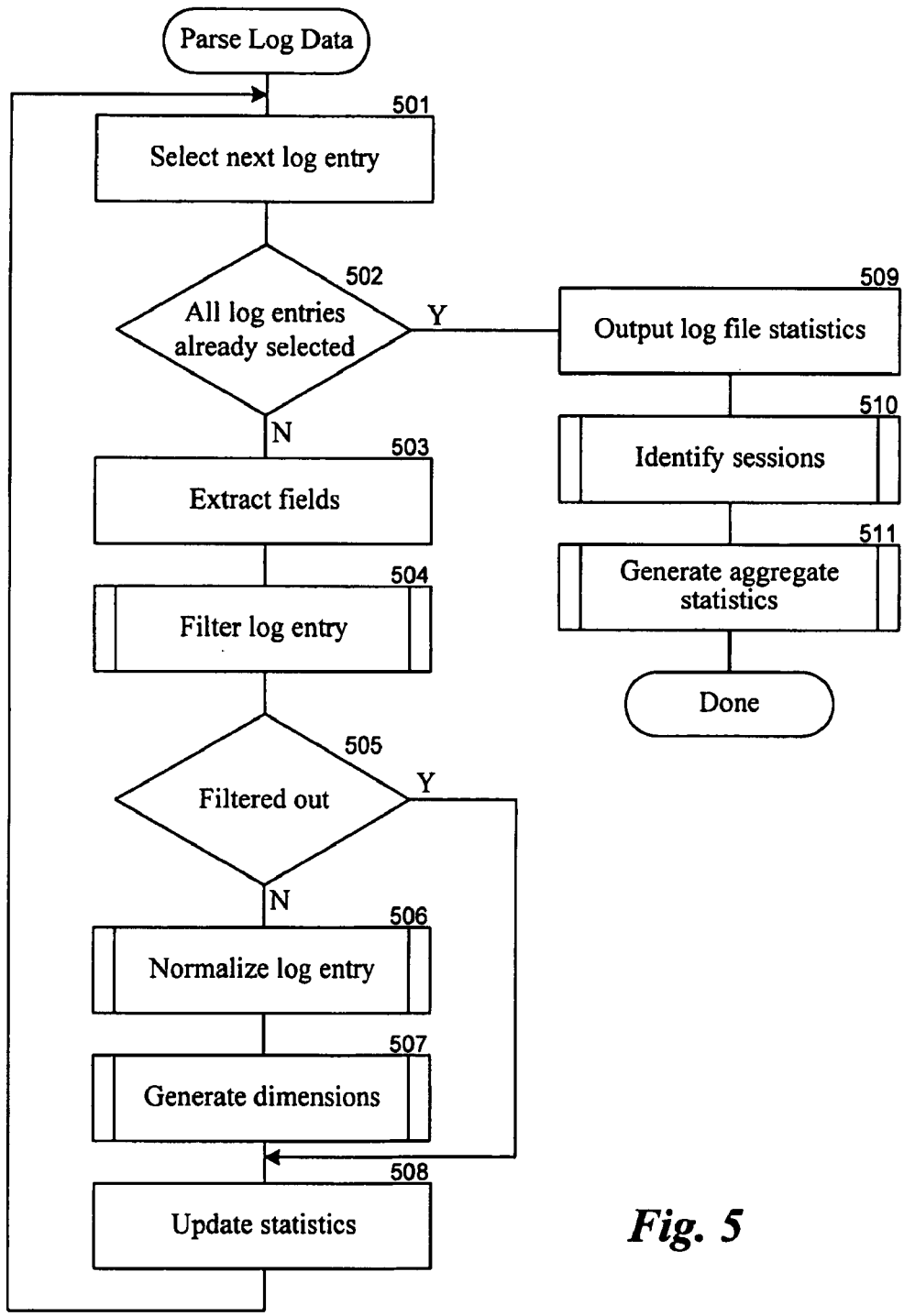
FIG. 5 is a flow diagram illustrating the parse log data routine that implements the parser in one embodiment.

FIGS. 5–14 are flow diagrams of components of the parser in one embodiment. FIG. 5 is a flow diagram illustrating the parse log data routine that implements the main routine of parser in one embodiment. The routine processes each entry in the log file based on the parser configuration data. The routine filters out certain log entries, normalizes the attribute values of the log entries, and generates entries in the dimension tables for the attributes of the log entries. After processing all the log entries, the parser identifies user sessions and generates various statistics. In blocks 501–508, the routine loops selecting and processing each log entry. In block 501, the routine selects the next log entry of the log file starting with the first log entry. The routine may also pre-process the header information of the log file to identify the fields of the log entries. In decision block 1502, if all the log entries have already been selected, then the routine continues at block 509, else the routine continues at block 503. In block 503, the routine extracts the values for the fields of the selected log entry. In block 504, the routine invokes the filter log entry routine, which returns an indication as to whether the selected log entry should be filtered out. In decision block 505, if the filter log entry routine indicates that the selected log entry should be filtered out, then the routine skips to block 508, else the routine continues at block 506. In block 506, the routine invokes the normalize log entry routine to normalize the values of the fields of the selected log entry. In block 507, the routine invokes the generate dimensions routine to update the dimension tables based on the selected log entry and to add an entry into the log entry fact table. In block 508, the routine updates the statistics for the log file. For example, the routine may track the number of log entries that have been filtered out. The routine then loops to block 501 to select the next log entry. In block 509, the routine outputs the log file statistics. In block 510, the routine invokes the identify sessions routine that scans the log entry table to identify the user sessions and updates a session dimension table. In block 511, the routine invokes the generate aggregate statistics routine to generate various statistics and then completes.

Figure 6:
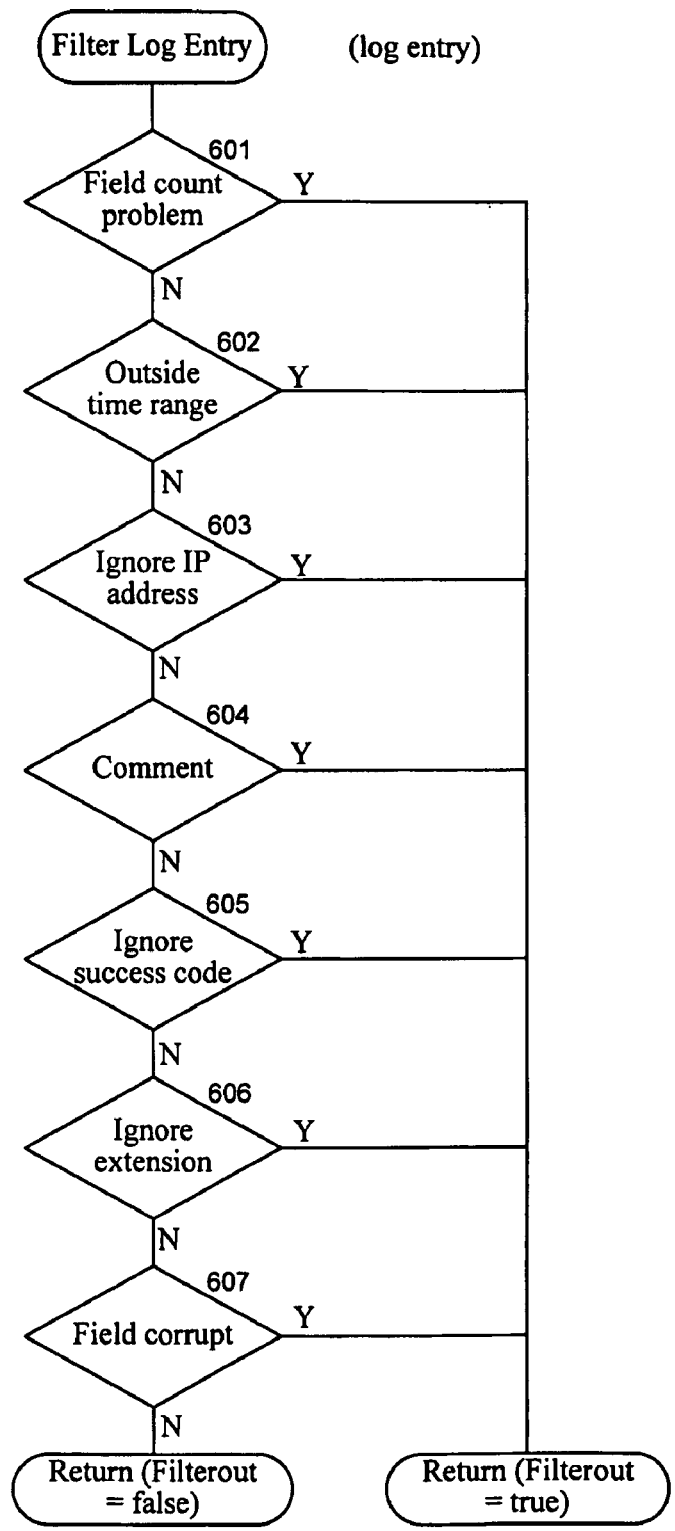
FIG. 6 is a flow diagram of the filter log entry routine in one embodiment.

FIG. 6 is a flow diagram of the filter log entry routine in one embodiment. The filter log entry routine is passed a log entry and determines whether the log entry should be filtered out. In blocks 601–607, the routine determines whether the filter out conditions have been satisfied. In decision block 601, the routine determines whether the log entry has a field count problem. A field count problem arises when the number of fields in the log entry does not correspond to the number of expected fields for that log entry. The number and types of fields may be defined in a "fields" directive line of the log file. In decision block 602, the routine determines whether the log entry is outside of a specified time range. The routine compares the time field of the log entry to the time range. The time range may be specified so that only those log entries within that time range are processed. In decision block 603, the routine determines whether the IP address of the log entry should be ignored. For example, a log entry may be ignored if the entry originated from a server whose function is to ping the customer's web server at periodic intervals. In decision block 604, the routine determines whether the log entry corresponds to a comment (e.g., a "#remarks" directive). In decision block 605, the routine determines whether the success code associated with the log entry indicates that log entry should be ignored. For example, if the success code indicates a failure, then the log entry may be ignored. In decision block 606, the routine determines whether the log entry is requesting a resource whose extension indicates that the log entry should be ignored. For example, the routine may ignore log entries requesting graphic files, such as those in the ".gif" format. In decision block 607, the routine determines whether the values within the fields of the log entry are corrupt. For example, a value in the date field that indicates a date of February 30th is corrupt. One skilled in the art would appreciate that the various filtering conditions may be specified in a configuration file. For example, the time range, IP addresses, and so on may be specified in the configuration file. These configuration files may be specified on a customer-by-customer basis.

Figure 7:
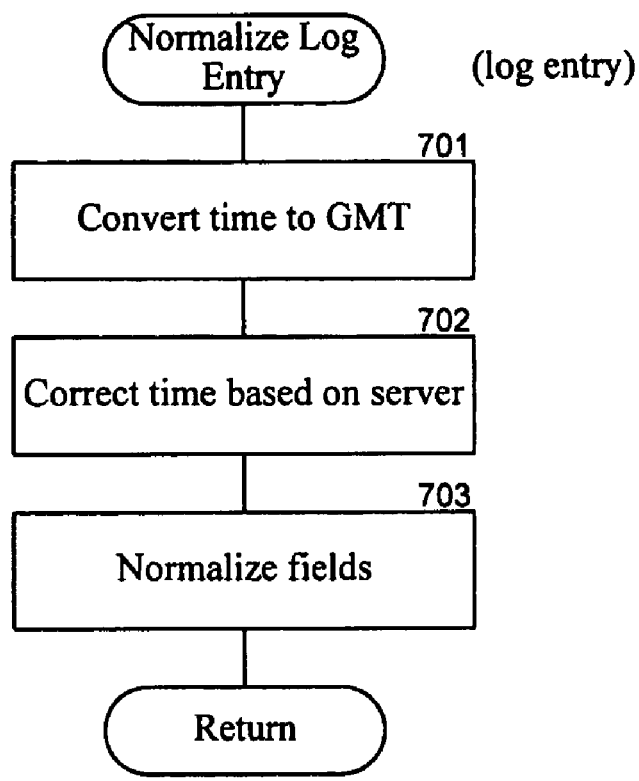
FIG. 7 is a flow diagram illustrating the normalize log entry routine.

FIG. 7 is a flow diagram illustrating the normalize log entry routine. The routine normalizes the values of the fields in the passed log entry. In block 701, the routine converts the time of the log entry into a standard time such as Greenwich Mean Time. In block 702, the routine corrects the time based on the variation between the times of the customer web servers. For example, the time of one web server may be five minutes ahead of the time of another web server. This correction may be based on current time information collected from computer systems that generated the events and then correlated to base current time information. In block 703, the routine normalizes the values of the fields of the log entry. This normalization may include processing search strings to place them in a canonical form. For example, a search string of "back pack" may have a canonical form of "backpack." Other normalization of search strings may include stemming of words (e.g., changing "clothes" and "clothing" to "cloth"), synonym matching, and first and last word grouping. The first word grouping for the search strings of "winter clothing" and "winter shoes" results in the string of "winter."

Figure 8:
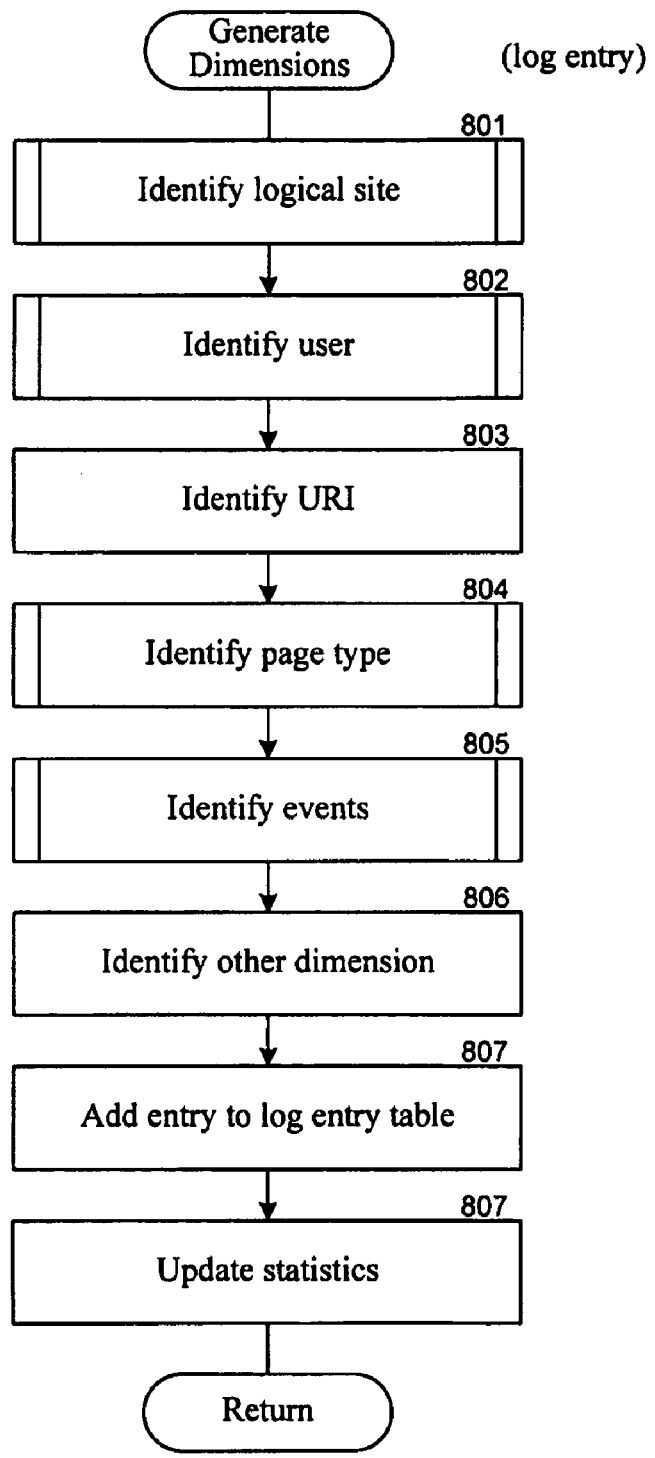
FIG. 8 is a flow diagram of the generate dimensions routine in one embodiment.

FIG. 8 is a flow diagram of the generate dimensions routine in one embodiment. This routine identifies a value for each dimension associated with the passed log entry and ensures that the dimension tables contains entries corresponding to those values. In one embodiment, each entry in a dimension table includes the attribute value (e.g., user identifier) and a hash value. The hash value may be used by the loader when transferring information to the main data warehouse. Also, each entry has a local identifier, which may be an index into the local dimension table. The loader maps these local identifiers to their corresponding main identifiers that are used in the main data warehouse. In block 801, the routine invokes a routine that identifies the logical site associated with the log entry and ensures that an entry for the logical site is in the logical site dimension table. In block

802, the routine invokes a routine that identifies the user associated with the log entry and ensures that an entry for the user is in the user dimension table. In block 803, the routine invokes a routine that identifies the URI associated with log entry and ensures that an entry for that URI is in the URI dimension table. In block 804, the routine invokes a routine that identifies the page type based on the parser configuration data and ensures that an entry for that page type is in the page type dimension table. In block 805, the routine invokes a routine that identifies the various events associated with the log entry based on the parser configuration data and ensures that an entry for each event type is in the corresponding event table. In block 806, the routine identifies other dimensions (e.g., referrer URI) as appropriate. In block 807, the routine adds an entry to the log entry table that is linked to each of the identified dimensions using the local identifiers. In block 808, the routine updates the statistics information based on the log entry and then returns.

Figure 9:
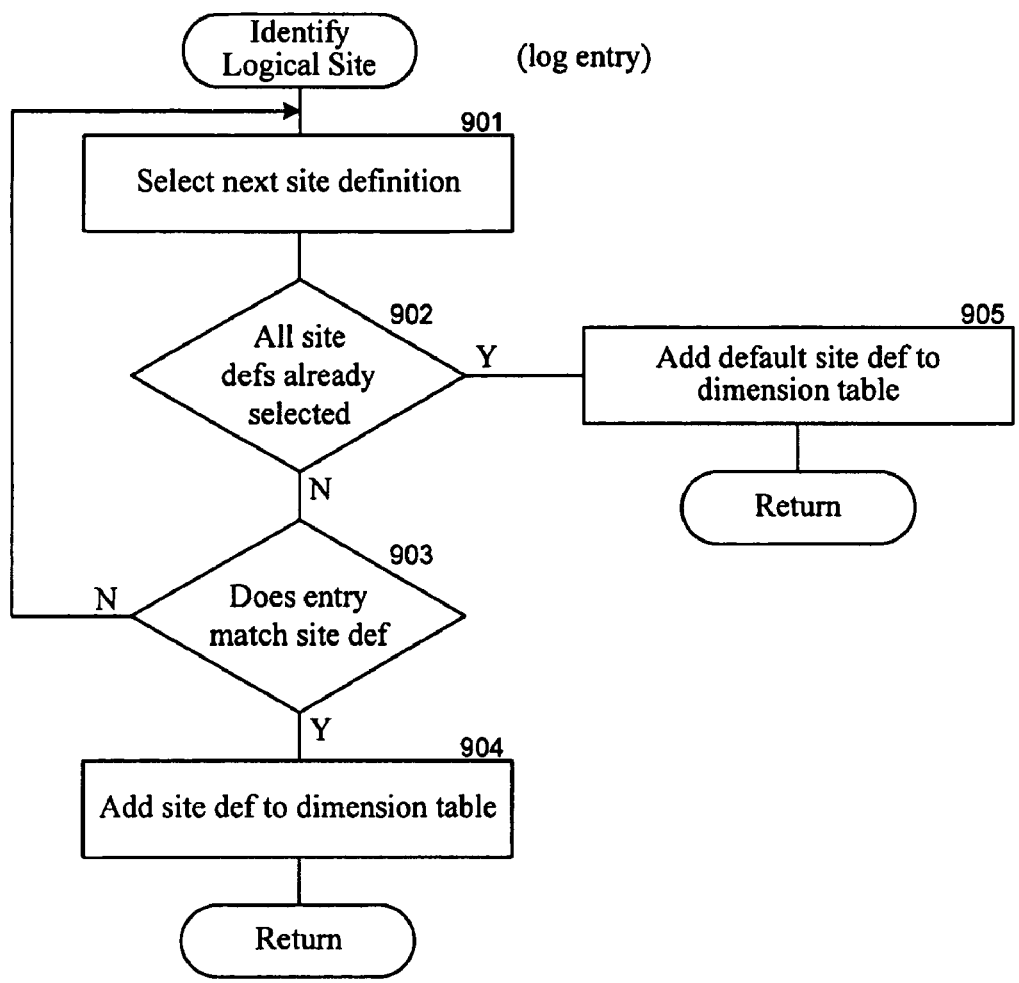
FIG. 9 is a flow diagram of the identify logical site routine in one embodiment.

FIG. 9 is a flow diagram of the identify logical site routine in one embodiment. This routine compares the site information of the passed log entry with the logical site definitions in the parser configuration data. In block 901, the routine selects the next logical site definition from the parser configuration data. In decision block 902, if all the logical site definitions have already been selected, then the routine continues the block 905, else the routine continues at block 903. In decision block 903, if the URI of the log entry matches the selected logical site definition, then the routine continues at block 904, else the routine loops to block 901 to select the next logical site definition. In block 904, the routine updates the logical site dimension table to ensure that it contains an entry for the logical site defined by the selected logical site definition. The routine then returns. In block 905, the routine updates the logical site dimension table to ensure that it contains a default logical site definition and then returns. The log entries that do not map to a logical site definition are mapped to a default logical site.

Figure 10:
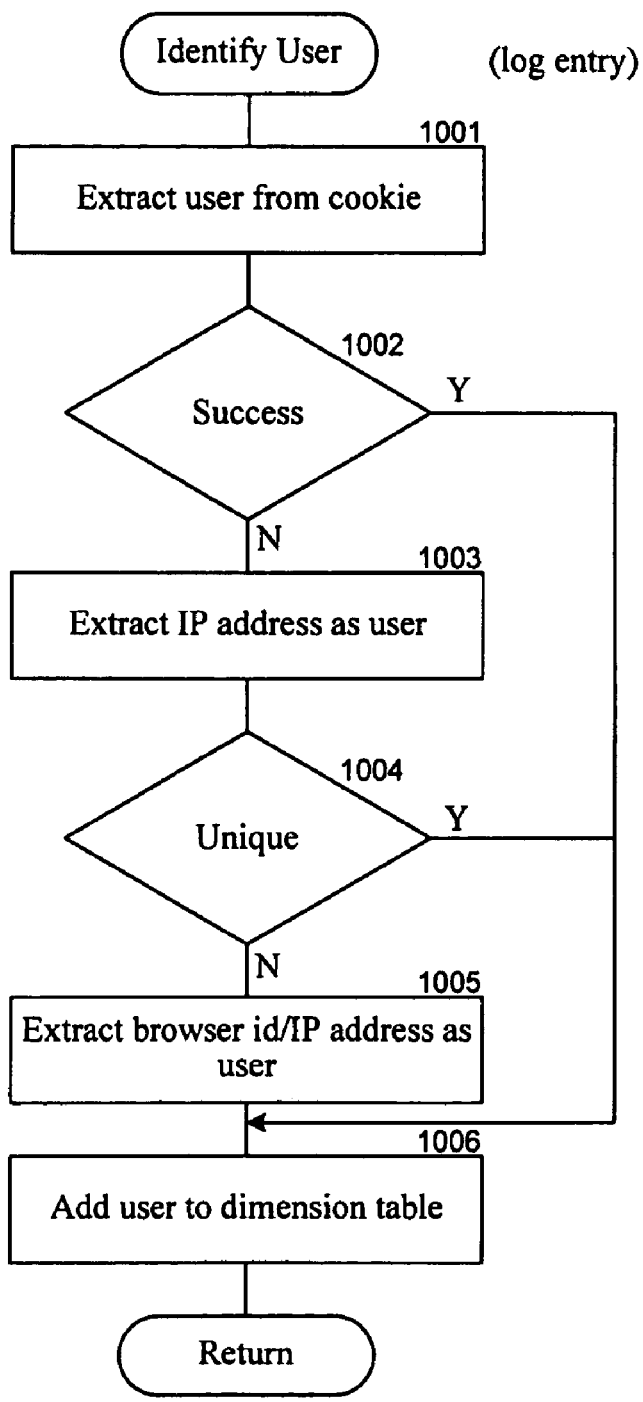
FIG. 10 is a flow diagram of the identify user routine in one embodiment.

FIG. 10 is a flow diagram of the identify user routine in one embodiment. This routine may use various techniques to identify the user associated with the passed log entry. In one embodiment, the selection of the technique is configured based on the customer web site. For example, one customer may specify to use a cookie to identify users. In absence of a user identifier in the cookie, the industry norm is to identify users based on their IP addresses. This routine illustrates a technique in which a combination of cookies and IP addresses are used to identify a user. In block 1001, the routine extracts the user identifier from the cookie associated with the log entry. The format of a cookie may be specified on a customer-by-customer basis. In decision block 1002, if the extraction from the cookie was successful, then the routine continues at block 1006, else the routine continues at block 1003. The extraction may not be successful if, for example, the log entry did not include a cookie. In block 1003, the routine extracts the IP address from the log entry. In decision block 1004, if the IP address is determined to be unique, then routine continues at block 1006, else the routine continues at block 1005. Certain IP addresses may not be unique. For example, an Internet service provider may use one IP address for many of its users. The Internet service provider performs the mapping of the one IP address to the various users. In block 1005, the routine extracts the browser identifier from the log entry. The combination of IP address and browser identifier may uniquely identify a user. In block 1006, the routine updates the user dimension table to ensure that it has an entry for this user and then returns.

Figure 11:
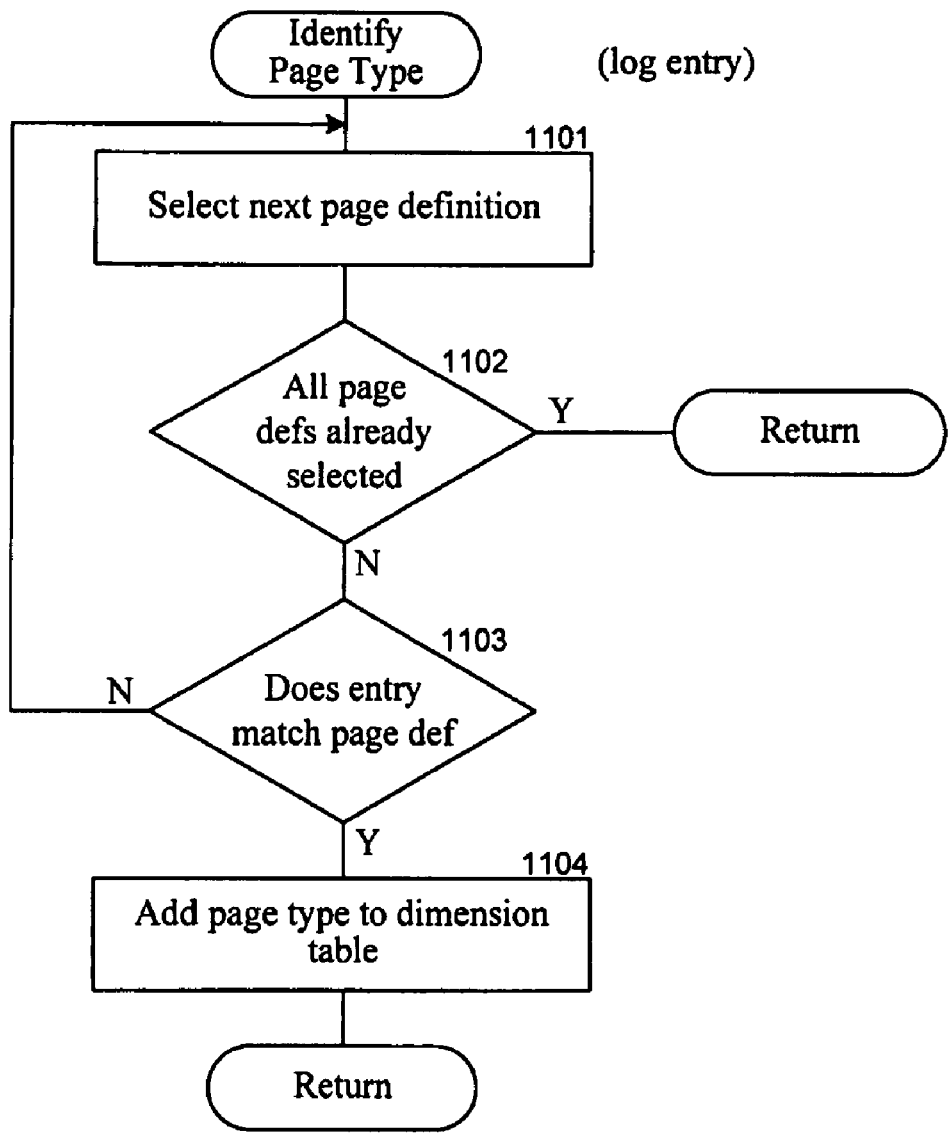
FIG. 11 is a flow diagram of the identify page type routine in one embodiment.

FIG. 11 is a flow diagram of the identify page type routine in one embodiment. This routine uses the page type definitions of the parser configuration data to identify the page type associated with the log entry. In block 1101, the routine selects the next page type definition from the parser configuration data. In decision block 1102, if all the page type definitions have already been selected, then no matching page type has been found and the routine returns, else the routine continues at block 1103. In decision block 1103, if the log entry matches the selected page type definition, then the routine continues at block 1104, else the routine loops to block 1101 to select the next page type definition. In block 1104, the routine updates the page type dimension table to ensure that it contains an entry for the page type represented by the selected page type definition. The routine then returns.

Figure 12:
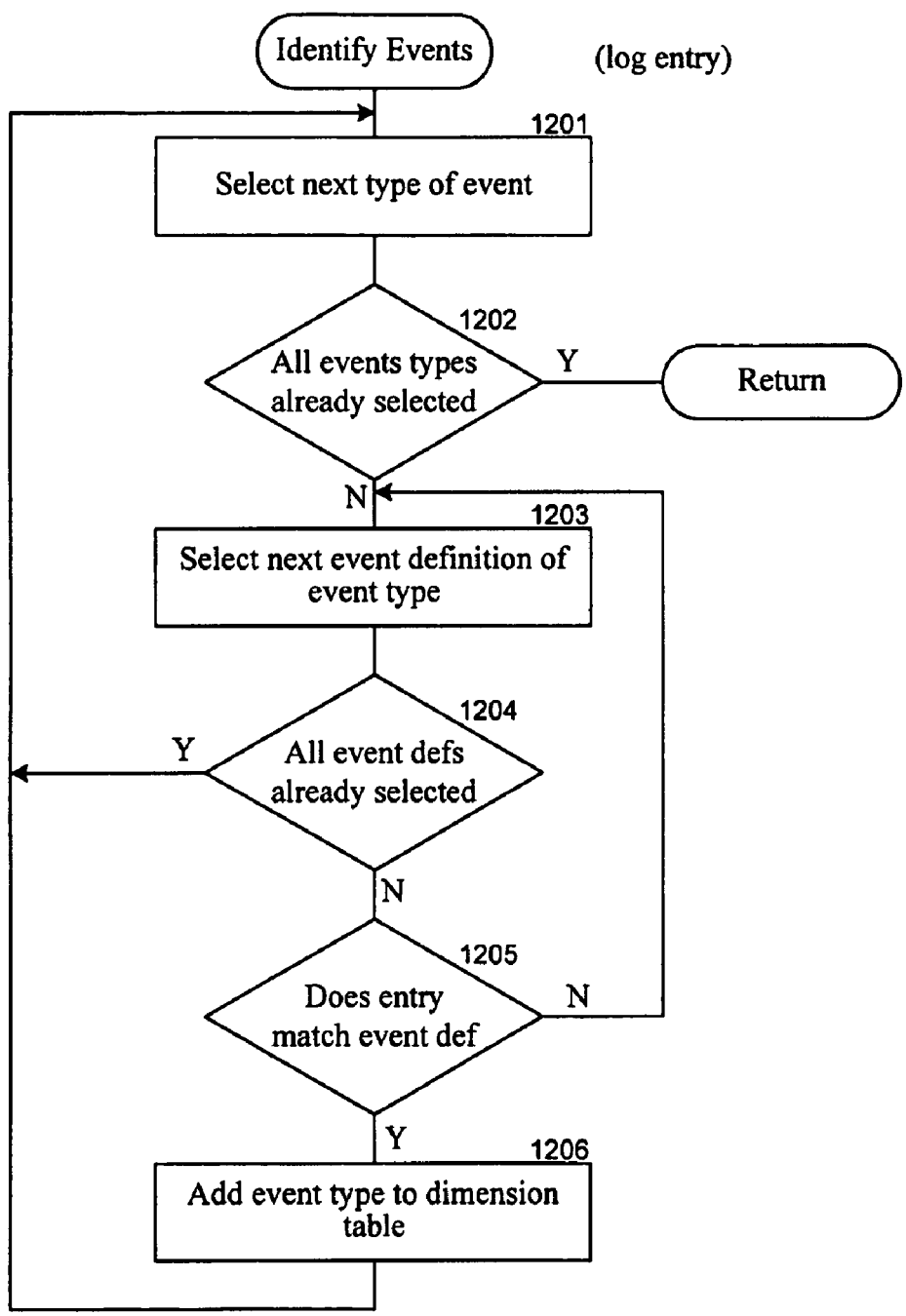
FIG. 12 is a flow diagram illustrating the identify events routine in one embodiment.

FIG. 12 is a flow diagram illustrating the identify events routine in one embodiment. This routine determines whether the log entry corresponds to any of the events specified in the parser configuration data. In block 1201, the routine selects the next type of event from the parser configuration data. In decision block 1202, if all the event types have already been selected, then the routine returns, else the routine continues at block 1203. In block 1203, the routine selects the next event definition of the selected event type. In decision block 1204, if all the event definitions of the selected event type have already been selected, then the log entry does not correspond to this type of event and the routine loops to block 1201 to select the next type of event, else the routine continues at block 1205. In block 1205, if the log entry matches the selected event definition, then the routine continues at block 1206, else the routine loops to block 1203 to select the next event definition of the selected event type. In block 1206, the routine updates the dimension table for the selected type of the event to ensure that it contains an entry for the selected event definition. The routine then loops to block 1201 to select the next type of event. In this way, the routine matches no more than one event definition for a given event type. For example, if there are two event definitions for the event type "Keyword Search," then if the first one processed matches, then the second one is ignored. Those skilled in the art will appreciate that in other embodiments each event definition could be checked for a match. Similarly, in other embodiments only a single event may be matched for each log entry, or multiple page type definitions may be matched for each log entry.

Figure 13:
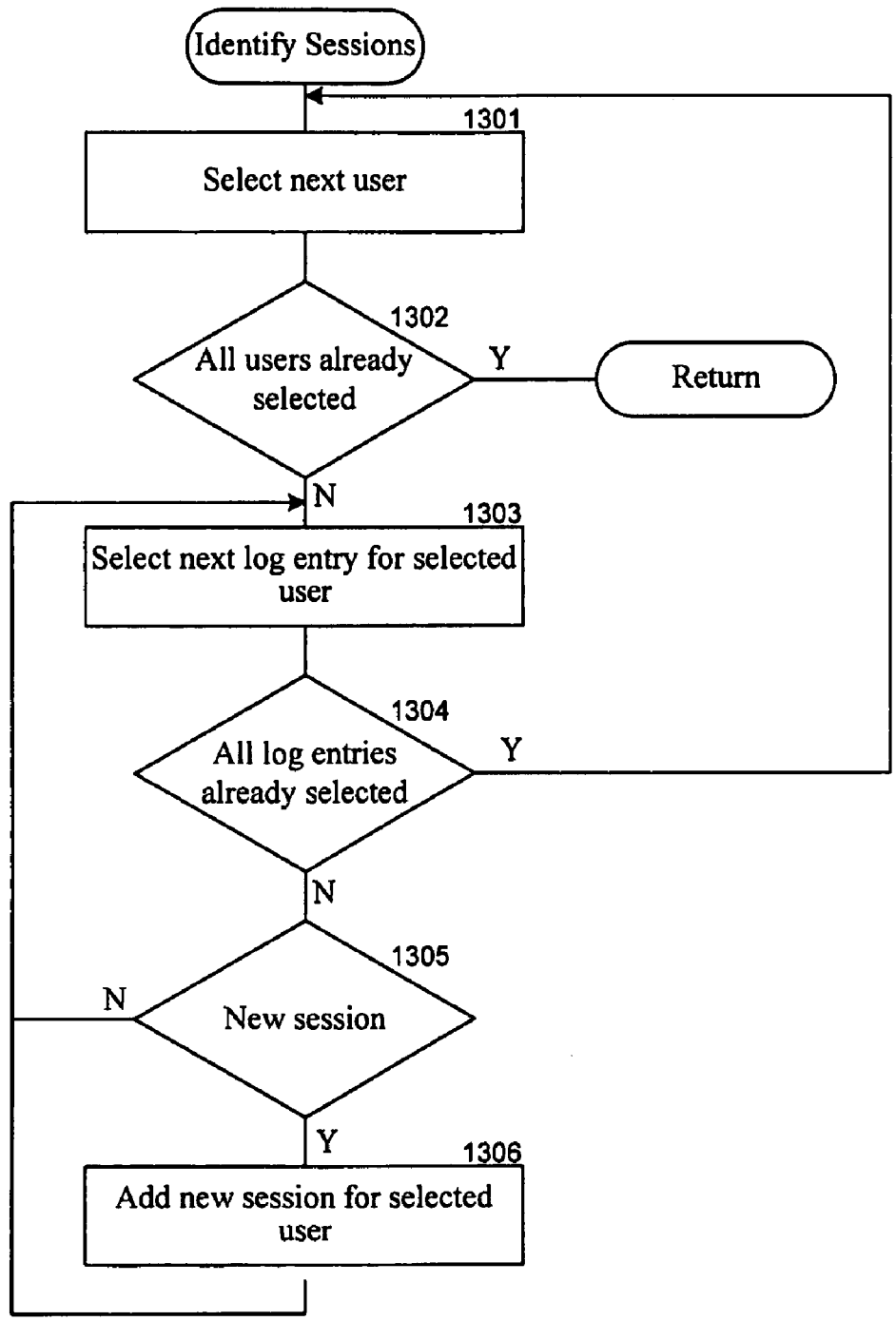
FIG. 13 is a flow diagram illustrating the identify sessions routine in one embodiment.

FIG. 13 is a flow diagram illustrating the identify sessions routine in one embodiment. This routine scans the log entry table of the local data warehouse to identify user sessions. In one embodiment, a user session may be delimited by a certain period of inactivity (e.g., thirty minutes). The criteria for identifying a session may be configurable on a customer-by-customer basis. In block 1301, the routine selects the next user from the user dimension table. In decision block 1302, if all the users have already been selected, then the routine returns, else the routine continues at block 1303. In block 1303, the routine selects the next log entry for the selected user in time order. In decision block 1304, if all log entries for the selected user have already been selected, then the routine loops to block 1301 to select the next user, else the routine continues at block 1305. In decision block 1305, if the selected log entry indicates that a new session is starting (e.g., its time is more than 30 minutes greater than that of the last log entry processed), then the routine continues at block 1306, else the routine loops to block 1303 to select the next log entry for the selected user. In block 1306, the routine updates a session fact table to add an indication of the new session. The routine then loops to block 1303 to select the next log entry for the selected user. The routine may also update the log entries to reference their sessions.

Figure 14:
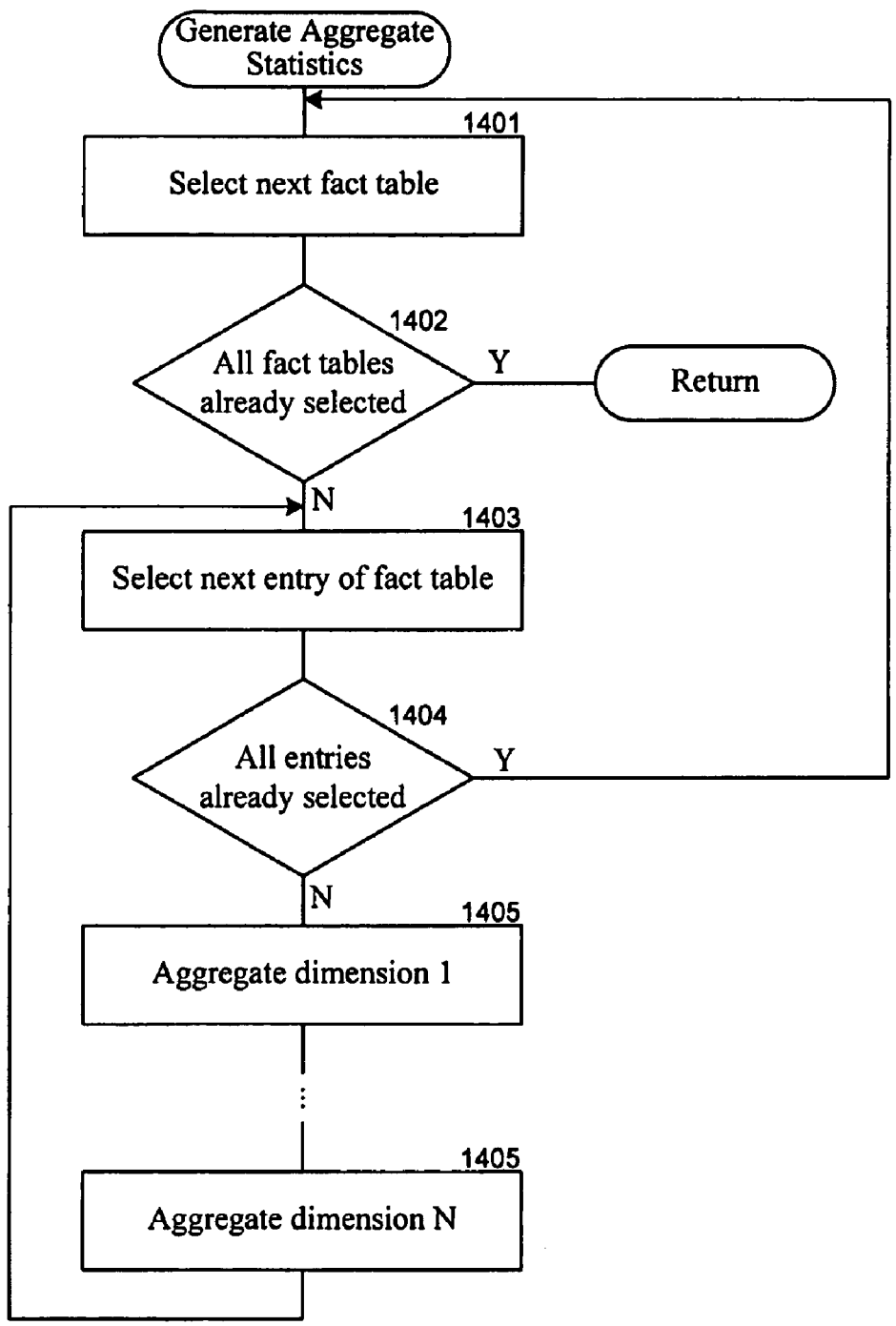
FIG. 14 is a flow diagram of the generate aggregate statistics routine in one embodiment.

FIG. 14 is a flow diagram of the generate aggregate statistics routine in one embodiment. This routine generate statistics based on analysis of the fact and dimension tables used by the parser. In block 1401, the routine selects the next fact table of intent. In decision block 1402, if all the fact tables have already been selected, then the routine returns, else the routine continues at block 1403. In block 1403, the routine selects the next entry of the selected fact table. In decision block 1404, if all the entries of the selected fact table have already been selected, then the routine loops to block 1401 to select the next fact table, else the routine continues at block 1405. In block 1405, the routine aggregates various statistics about the selected fact table. The routine then loops to block 1404 to select the next entry of the fact table.

Figure 15:
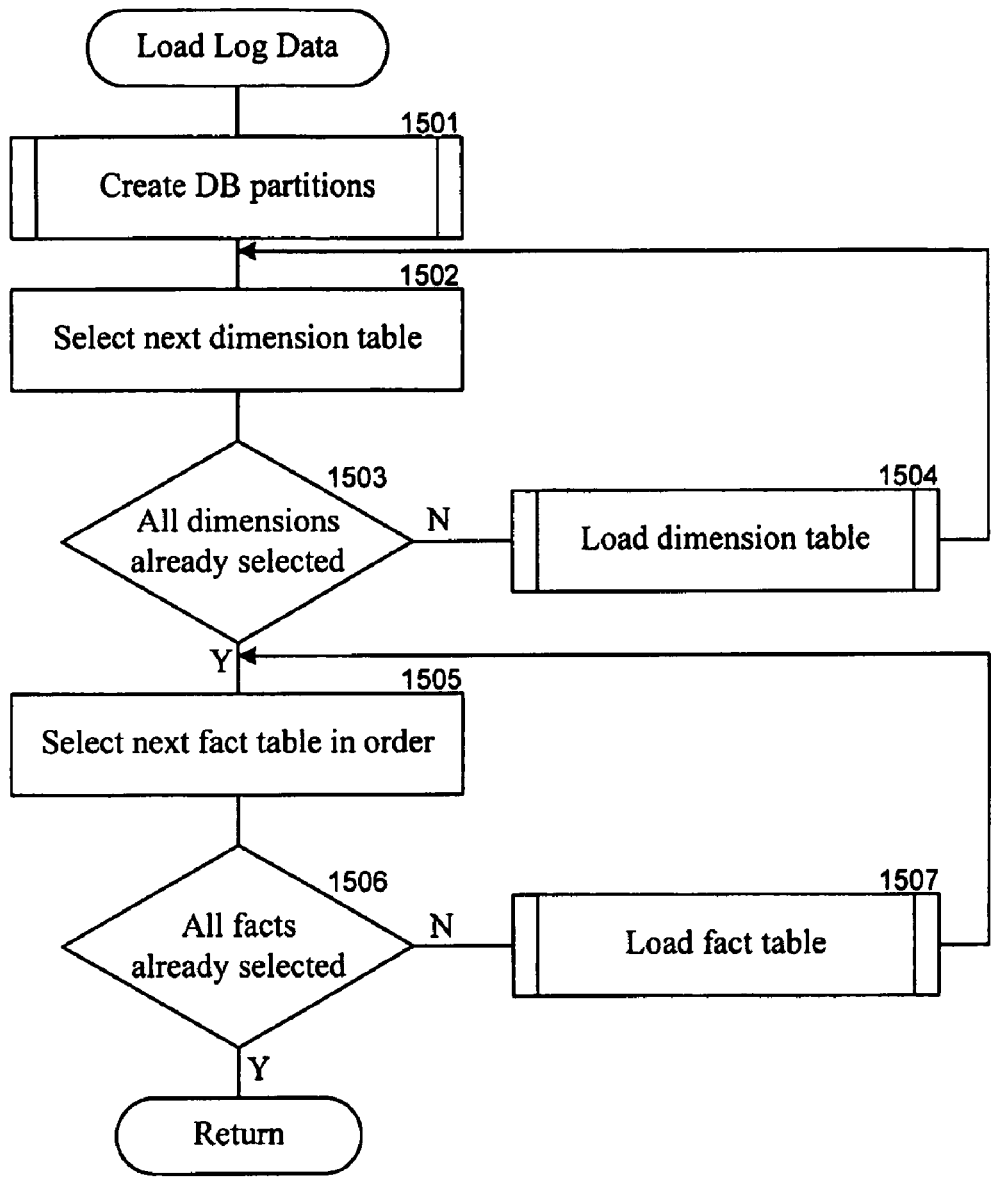
FIG. 15 is a flow diagram of the import log data routine implementing the importer in one embodiment.
Figure 16:
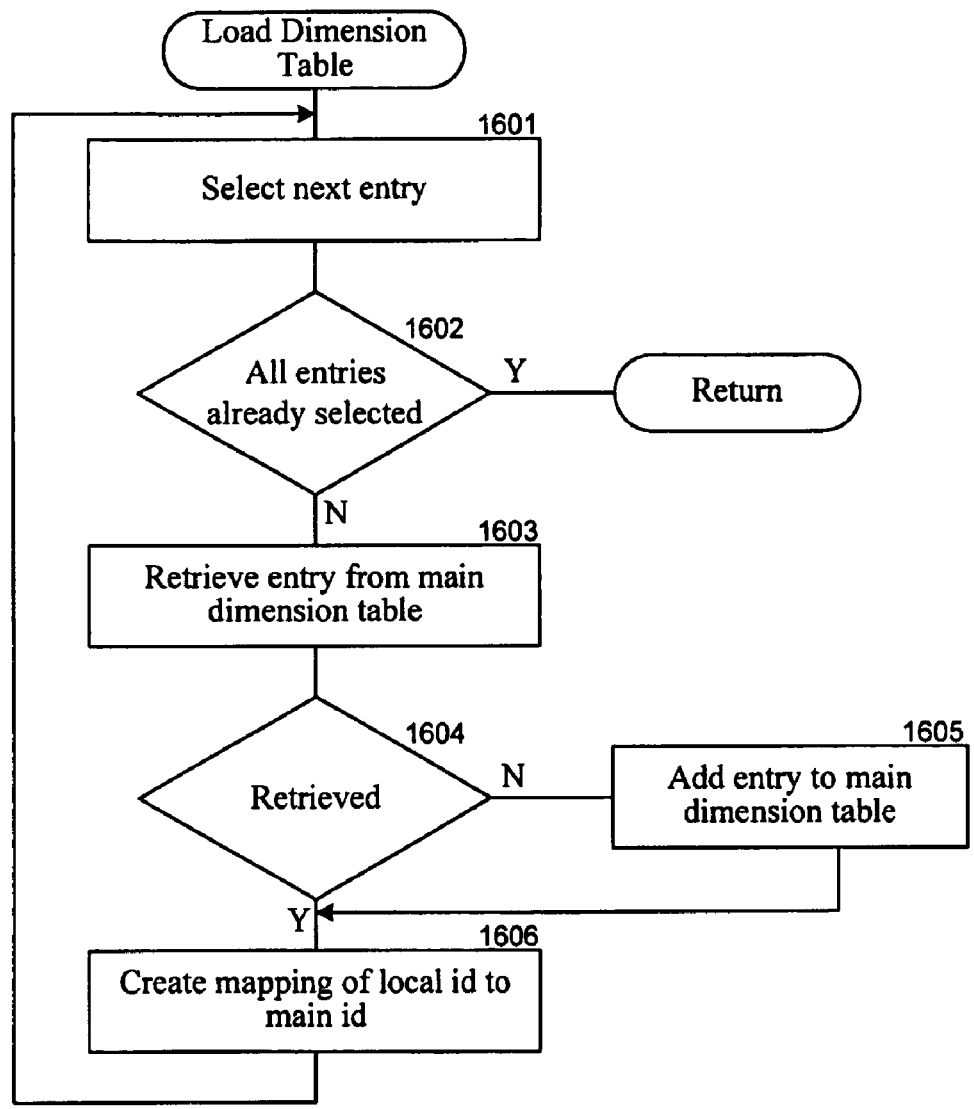
FIG. 16 is a flow diagram of the load dimension table routine and one embodiment.
Figure 17:
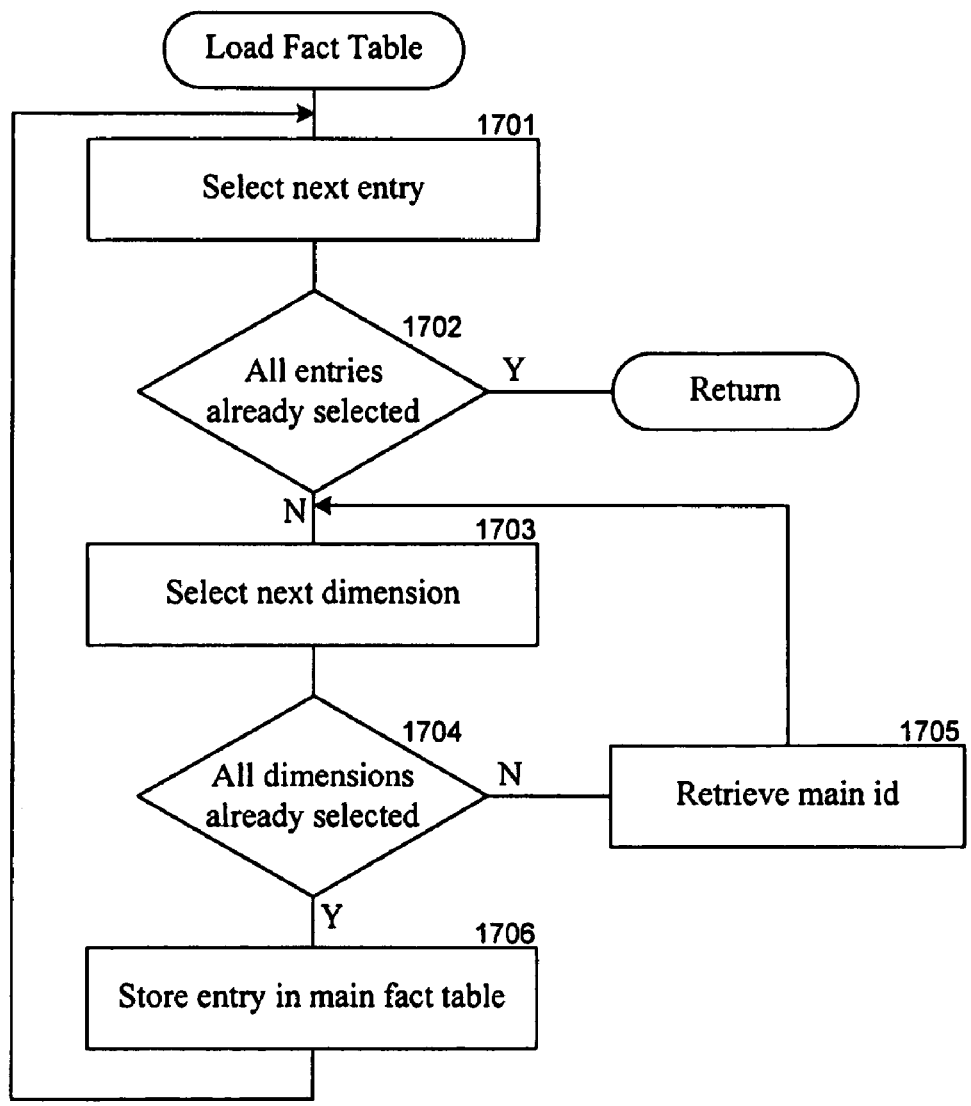
FIG. 17 is a flow diagram of the load fact table routine in one embodiment.

FIGS. 15–17 are flow diagrams illustrating components of the loader in one embodiment. FIG. 15 is a flow diagram of the load log data routine implementing the main routine of the loader in one embodiment. This routine controls the moving of the data from the local data warehouse (created and used by the parser) into the main data warehouse. In block 1501, the routine invokes the create partitions routine to create partitions for the main data warehouse as appropriate. In blocks 1502–1504, the routine loops loading the dimension tables into the main data warehouse. In block 1502, the routine selects the next dimension table. In decision block 1503, if all the dimension tables have already been selected, then the routine continues at block 1505, else the routine continues at block 1504. In block 1504, the routine invokes the load dimension table routine for the selected dimension table. The routine then loops to block 1502 to select the next dimension table. In blocks 1505–1507, the routine loops adding the entries to the fact tables of the main data warehouse. In block 1505, the routine selects the next fact table in order. The order in which the fact tables are to be loaded may be specified by configuration information. The fact tables may be loaded in order based on their various dependencies. For example, a log entry fact table may be dependent on a user dimension table that is itself a fact table. In decision block 1506, if all the fact tables have already been loaded, then the routine returns, else the routine continues at block 1507. In block 1507, the routine invokes the load fact table routine for the selected fact table. The routine then loops to block 1505 to select the next fact table.

FIG. 16 is a flow diagram of the load dimension table routine in one embodiment. This routine maps the local identifiers used in the local data warehouse to the main identifiers used in the main data warehouse. In block 1601, the routine selects the next entry from the dimension table. In decision block 1602, if all the entries of the dimension table have already been selected, then the routine returns, else the routine continues at block 1603. In block 1603, the routine retrieves an entry from the dimension table of the main data warehouse corresponding to the selected entry. In decision block 1604, if the entry is retrieved, then the routine continues at block 1606, else the dimension table does not contain an entry and the routine continues at block 1605. In block 1605, the routine adds an entry to the dimension table of the main data warehouse corresponding to the selected entry from the dimension table of the local data warehouse. In block 1606, the routine creates a mapping of the local identifier (e.g., index into the local dimension table) of the selected entry to the main identifier (e.g., index into the main dimension table) for that selected entry. The routine then loops to block 1601 to select the next entry of the dimension table.

FIG. 17 is a flow diagram of the load fact table routine in one embodiment. This routine adds the facts of the local data warehouse to the main data warehouse. The routine maps the local identifiers for the dimensions used in the local warehouse to the main identifiers of dimensions used in the main data warehouse. In block 1701, the routine selects the next entry in the fact table. In decision block 1702, if all the entries of the fact table have already been selected, then the routine returns, else the routine continues at block 1703. In block 1703, the routine selects the next dimension for the selected entry. In decision block 1704, if all the dimensions for the selected entry have already been selected, then the routine continues at block 1706, else the routine continues at block 1705. In block 1705, the routine retrieves the main identifier for the selected dimension and then loops to block 1703 to select the next dimension. In block 1706, the routine stores an entry in the fact table of the main data warehouse. The routine then loops to block 1701 to select the next entry in the fact table.

Figure 18:
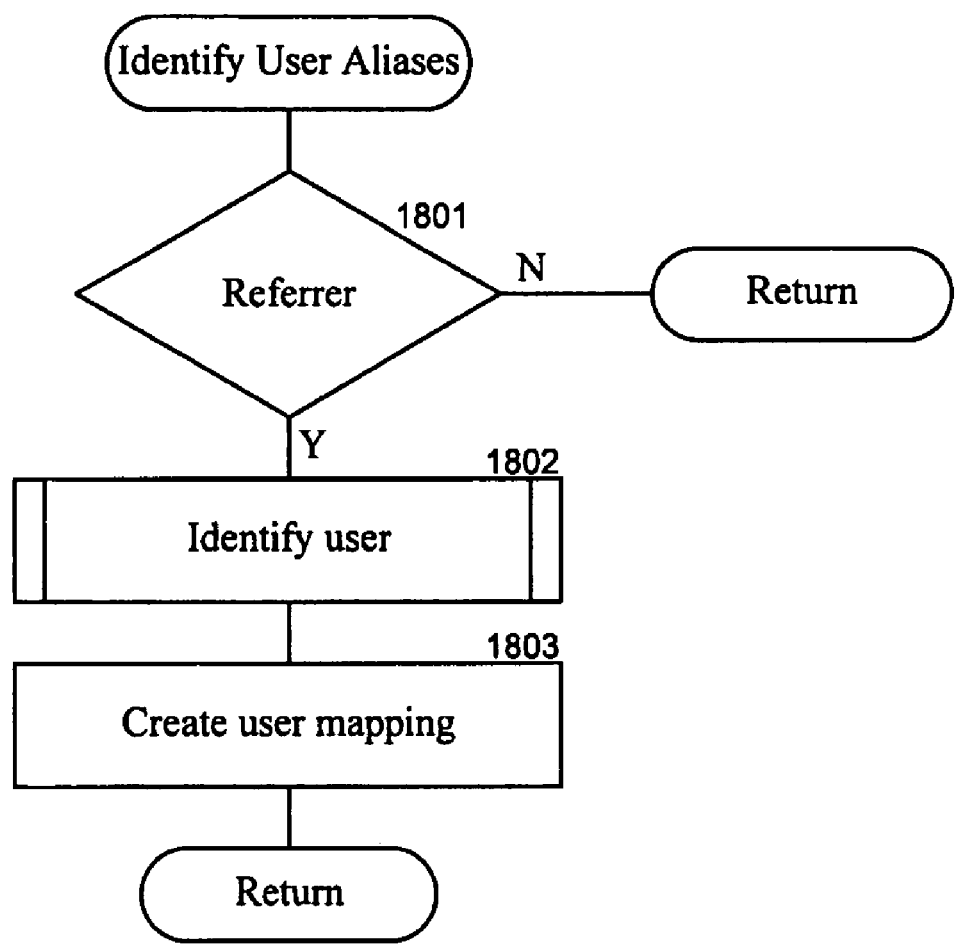
FIG. 18 is a flow diagram illustrating the identify user aliases routine in one embodiment.

FIG. 18 is a flow diagram illustrating the identify user aliases routine in one embodiment. This routine tracks the different user identifiers as a user switches from one web site to another. In particular, the routine maps the user identifiers used by a referrer web site to the user identifiers used by the referred-to web site. In this way, the same user can be tracked even though different web sites use different identifiers for that user. This routine may be invoked as part of the parsing of the log files. In decision block 1801, if the log entry indicates a referrer web site, then the routine continues at block 1802, else the routine returns. In block 1802, the routine identifies the user identifier for the referrer web site. In block 1803, the routine creates a mapping between the referrer user identifier and the referred-to user identifier. The routine then returns.

As noted above, interaction data (e.g., navigation data from interactions by users with a customer's web site) can be analyzed by the parser component to identify various occurrences of interest. In particular, the parser component uses parser configuration data (also referred to as "data parsing information") that defines various types of occurrences so that any such occurrences in the interaction data can be identified. For example, when analyzing a customer's web site interaction data, the parser component can use data defining customer-specific categories of web pages (e.g., web pages with shoe product information) and customer-specific web site events of interest (e.g., when users of the customer's web site search for product information or add an item to their shopping cart). Such high-level types of occurrences can be specified in a variety of ways, such as by using a combination of a logical web site, one or more URIs corresponding to web pages, and/or one or more query strings. The parser configuration data may also specify a mapping of actual web sites to one or more logical sites, as well as event-specific information to be extracted from the interaction data and stored in the data warehouse.

Figure 19A:
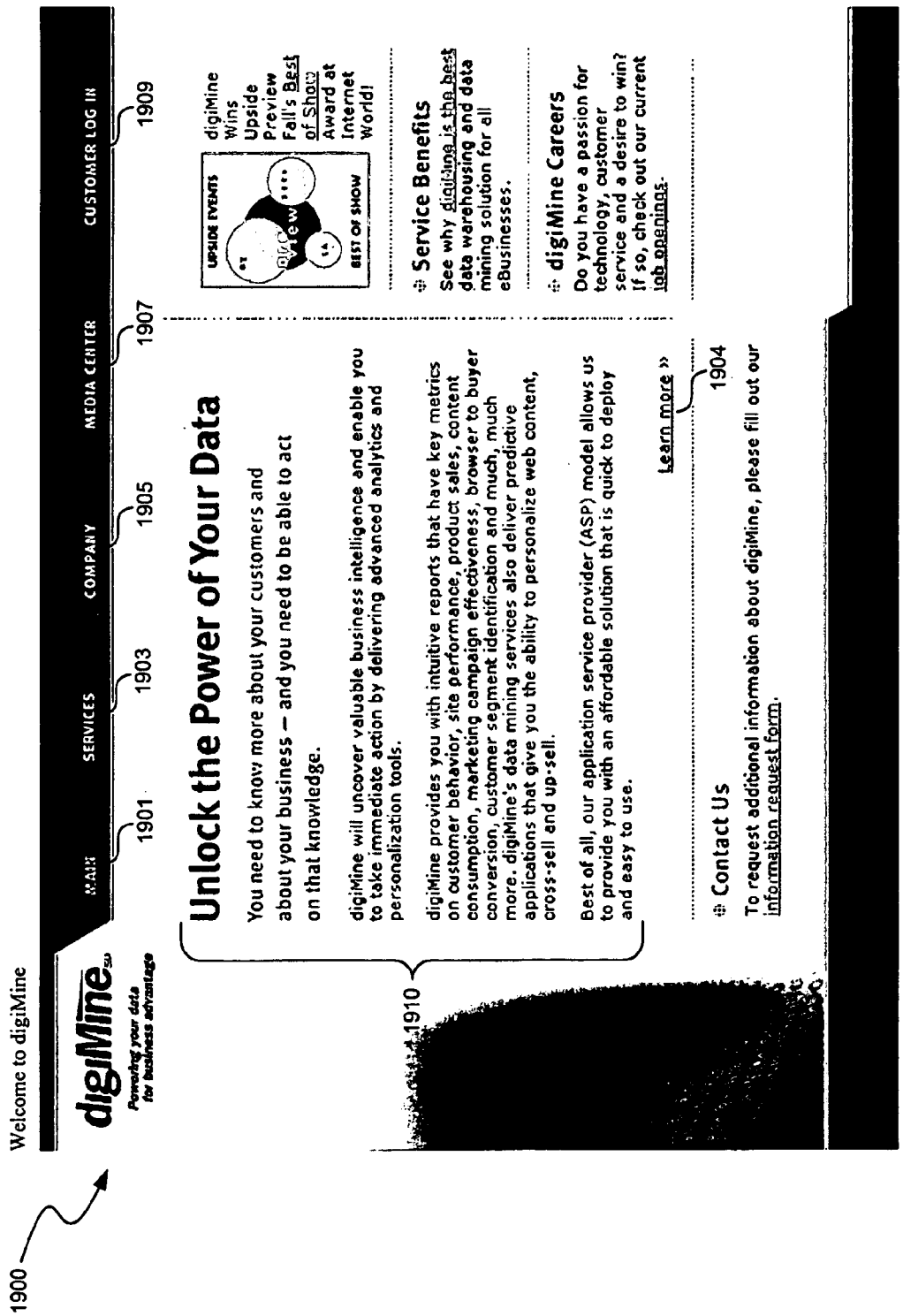
FIGS. 19A–19AE illustrate example customer web pages for which parser configuration data can be specified.

FIGS. 19A–19AE illustrate various example user interactions with an example web site www.digimine.com for digiMine that has various web pages, and Tables 3–6 illustrate various examples of data parsing information that corresponds to the web site. Those skilled in the art will appreciate that these web pages and types of interactions are merely examples, and that in other embodiments various types of interaction or usage data related to a wide variety of types of content sets (e.g., interactions with or use of a web-based or telecommunications-based service, interactions with or use of an executing computer program or a device, etc.) can instead have data parsing information that is used for analysis of the data.

In particular, FIG. 19A illustrates an example web page 1900 that is displayed at a client computer after a user specifies the URI www.digimine.com for the digiMine web site to an executing web browser program on the client. The web page includes various informational content 1910, and various user-selectable controls including controls 1901–1909. As is discussed in greater detail below, the web site has several sections that each contain distinct related types of information, and controls 1903, 1905, 1907, and 1909 can be used to obtain an overview web page for each of four different sections. Control 1904 is an alternate method by which the user can obtain the overview web page for the "Services" section of the web site (also accessible via control 1903), and control 1901 causes the currently displayed web page 1900 to be displayed. Those skilled in the art will appreciate that this web page is sent to the client computer by a web server for the digiMine web site, and that an entry corresponding to this interaction (i.e., a request for the web page corresponding to the specified URI) will typically be added to a log file for that web server.

If the user interacts with the web site to select control 1903 (or control 1904), the web page illustrated in FIG. 19B will be sent to the client computer and displayed to the user. As previously noted, this web page is an overview for the Services section of the web site, and it includes various informational content 1915 related to services provided by digiMine to its customers. The web page also includes the same controls 1901, 1903, 1905, 1907, and 1909 as did web page 1900. In addition, the currently displayed web page also includes other controls 1912, 1914, and 1916–1928. Control 1922 causes the currently displayed web page to be displayed, and the other newly displayed controls cause other web pages to be displayed that contain additional detailed information within the Services section of the web site.

Figure 19C:

If the user interacts with the web site to select control 1912 (labeled "digiMine Warehousing Services"), the web page illustrated in FIG. 19C will be displayed to the user. As with the previously displayed web pages, this web page includes various informational content as well as many of the same controls as the web page illustrated in FIG. 19B. As is shown by indication 1920, this web page has a corresponding URL of "www.digimine.com/services/warehousing.htm." As would be expected based on the label for control 1912 and the text portions of the URL path for the page, this web page includes informational content related to data warehousing services that digiMine provides to customers.

Figure 19D:
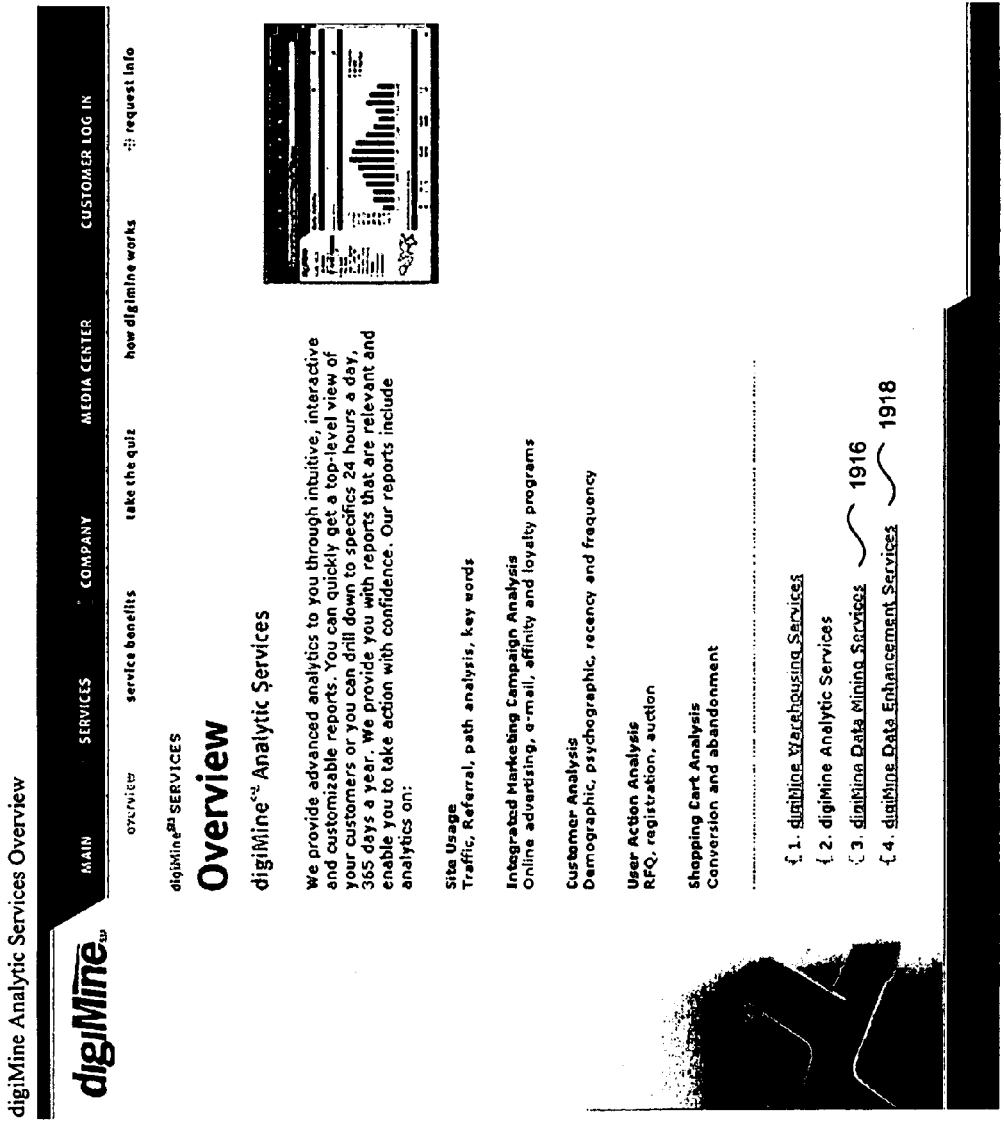
Figure 19F:
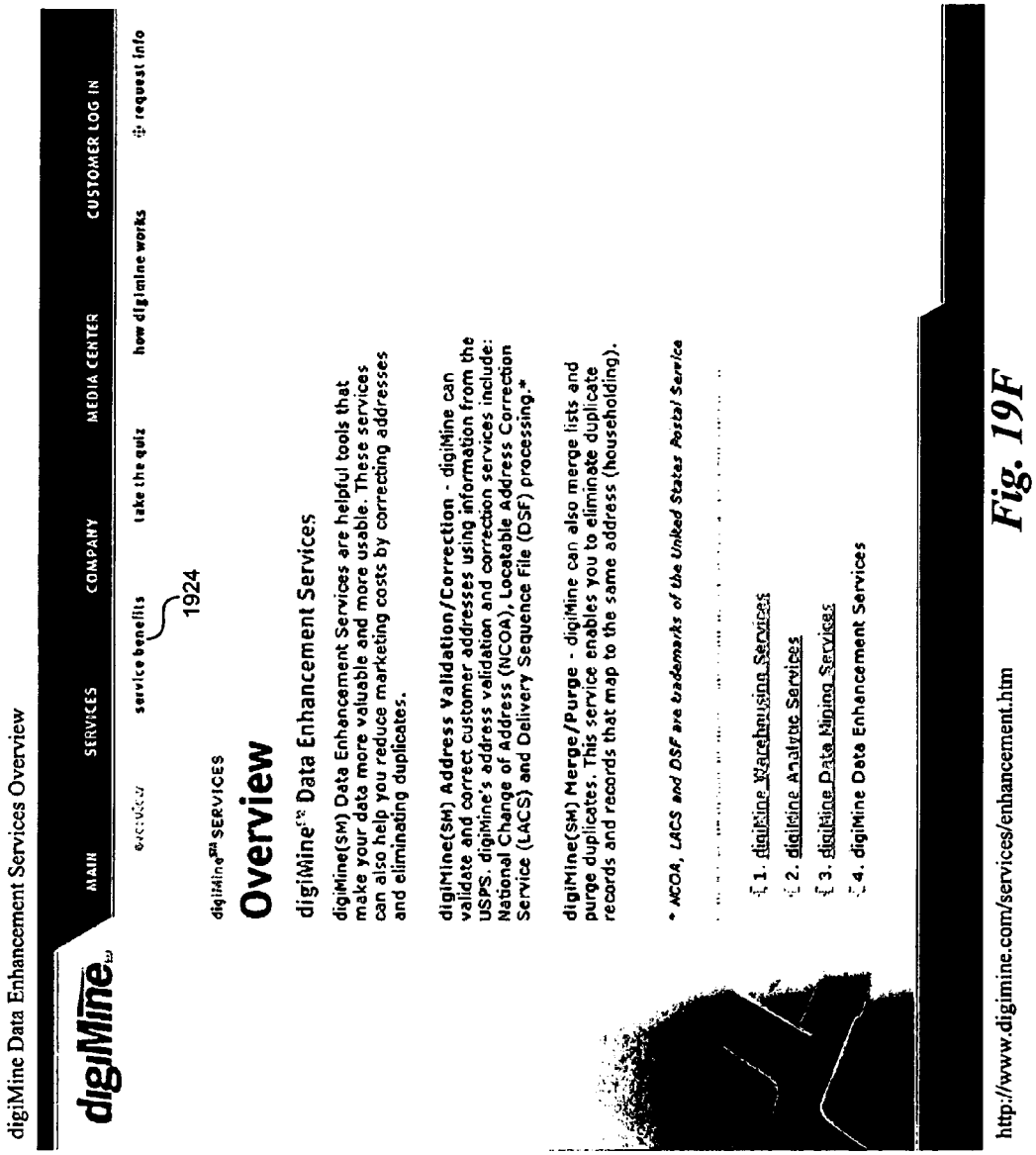

In a similar manner, if the user interacts with the web site to select control 1914 displayed on the web page illustrated in FIG. 19C (or on the web page illustrated in FIG. 19B), the web page illustrated in FIG. 19D will be displayed to the user. As would be expected, the displayed web page includes informational content related to data analysis services provided by digiMine, and also includes various controls. When the control 1916 is selected, the web page illustrated in FIG. 19E is displayed, and selection of the control 1918 causes the web page illustrated in FIG. 19F to be displayed.

Figure 19G:

Rather than corresponding to web pages containing detailed information about specific types of provided services, controls 1924, 1926 and 1928 instead correspond to web pages containing other higher-level information about provided services. In particular, selection of control 1924 causes the web page illustrated in FIG. 19G to be displayed, with the web page discussing various benefits to a customer from the various provided services. Similarly, selection of control 1926 causes the web page illustrated in FIG. 19J to be displayed, and selection of control 1928 causes the web page illustrated in FIG. 19K to be displayed.

Figure 19H:
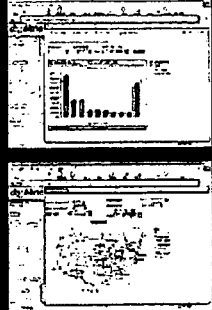
Figure 19J:
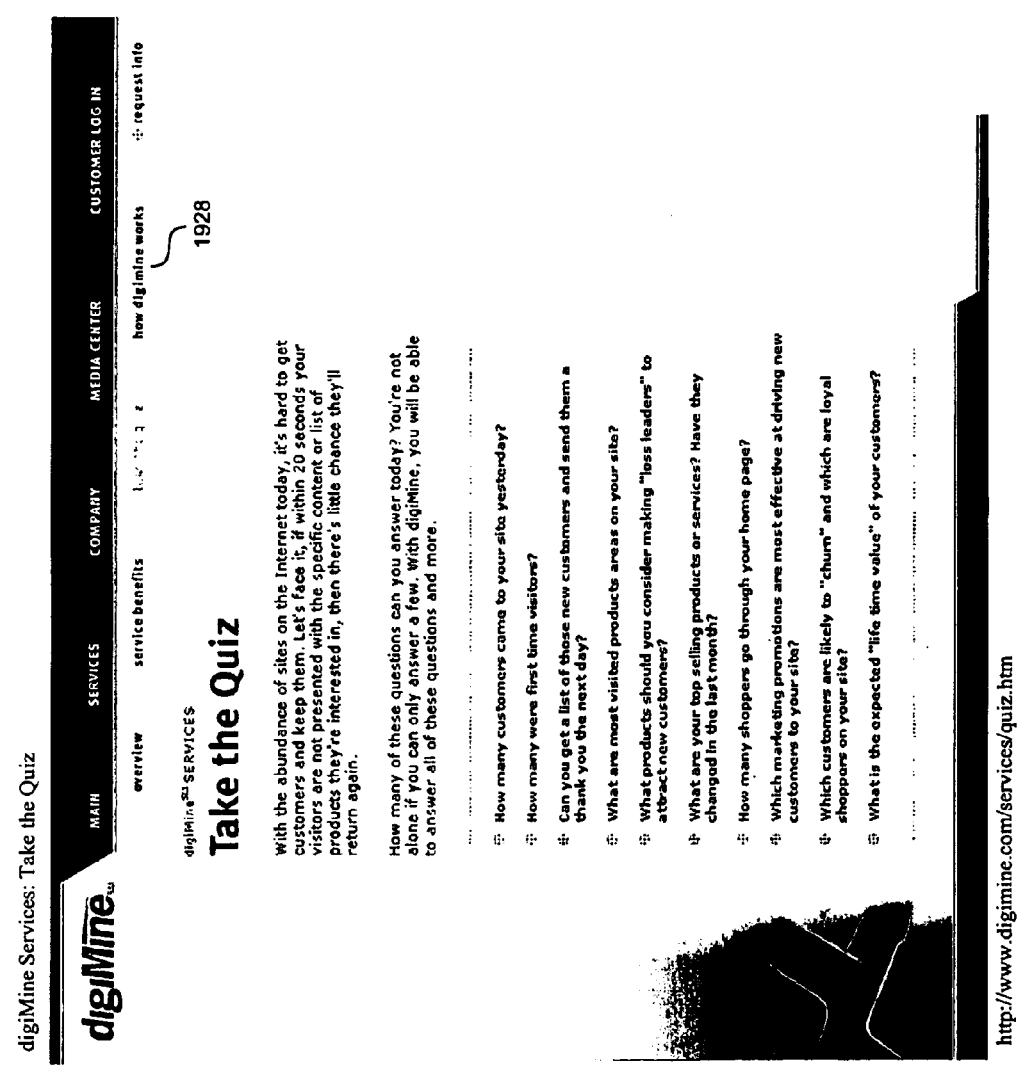
Figure 19K:

Several of the web pages from the Services section of the web site also include a control 1930 that corresponds to a detailed Data Sheet related to the digiMine services. While the previously displayed web pages have been specified in HTML format, the Data Sheet is a PDF document that is illustrated in FIGS. 19H and 19I. The web pages and PDF document illustrated in FIGS. 19B–19K are the web pages that are part of the Services section of the digiMine web site in this example embodiment.

Figure 19L:
Figure 19N:
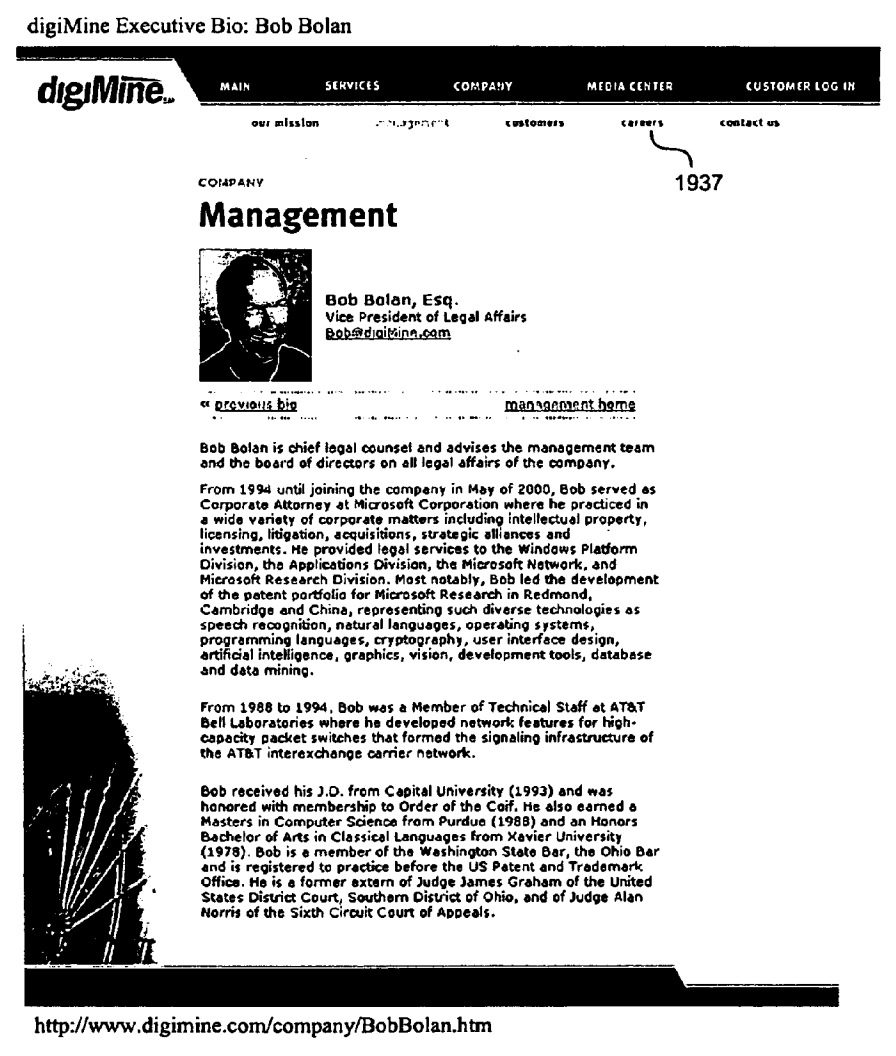
Figure 19P:
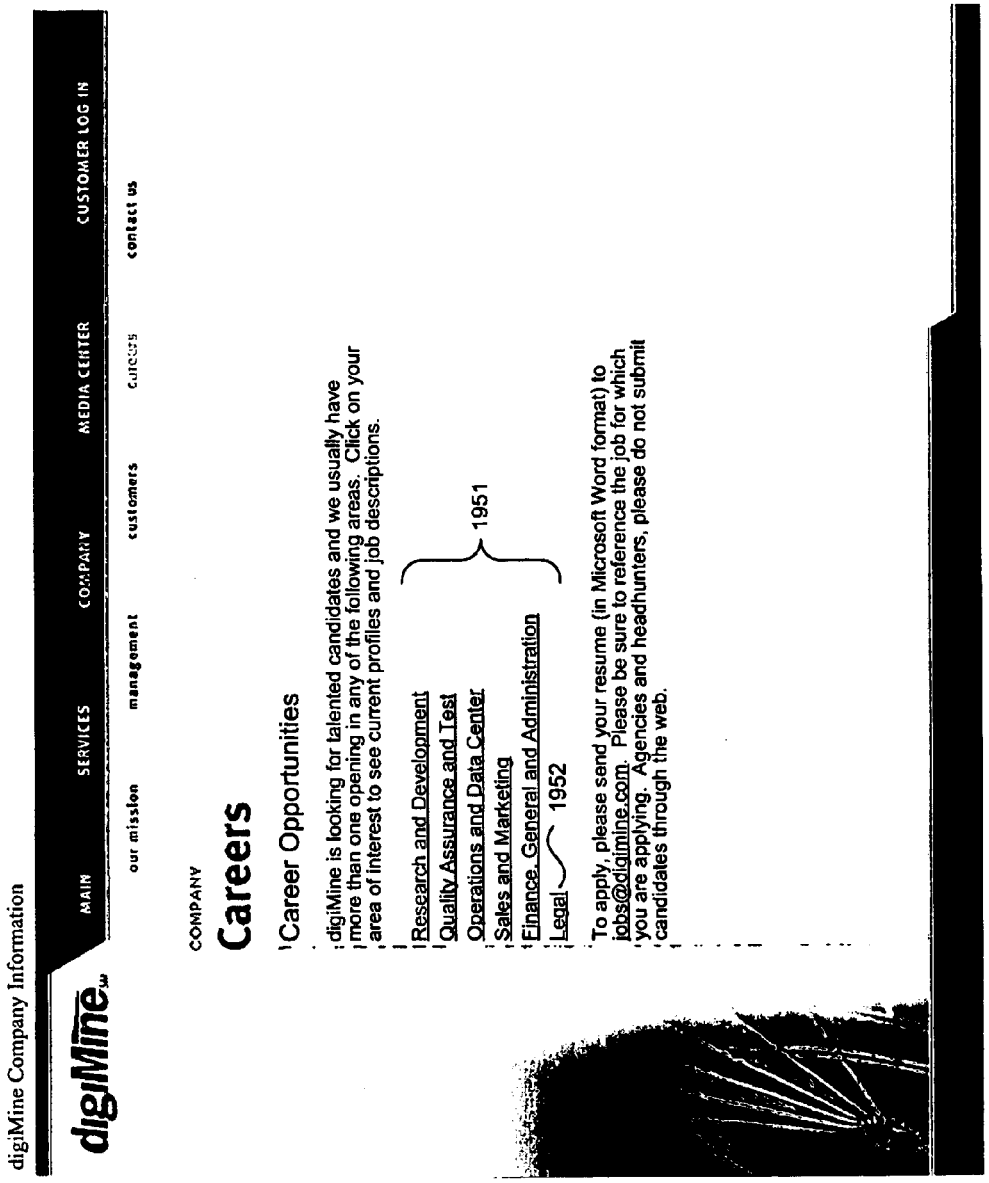
Figure 19Q:

If the "Company" section control 1905 is instead selected from any of the previously displayed web pages, an overview of the company will be presented to the user in the web page illustrated in FIG. 19L. FIGS. 19L–19Q illustrate some of the web pages that are part of the Company section of the digiMine web site in this illustrated embodiment. In addition to the top-level controls 1901, 1903, 1905, 1907, and 1909, the illustrated web page also includes Company section-specific controls 1931–1939. For example, if control 1933 is selected, the web page illustrated in FIG. 19M will be displayed containing information about the management team for the company. This web page includes controls 1941–1949 corresponding to different members of the management team, and selection of control 1949, for example, displays the web page illustrated in FIG. 19N related to the Vice President of Legal Affairs, Bob Bolan.

The various sections of the web site can include various subsections in a hierarchical manner, and any such subsection can similarly contain its own hierarchical subsections. For example, the "Careers" subsection of the Company section of the web site can be accessed by selecting control 1937. In response, the web page illustrated in FIG. 19O will be displayed in which various overview information about working at digiMine is presented. Various controls are available to obtain additional web pages from the Careers subsection of the Company section, such as controls 1950 and 1953. Selection of the control 1950 causes the web page illustrated in FIG. 19P to be displayed, in which the Careers subsection is separated into additional subsections based on the types of available jobs as is shown by controls 1951. Selection of the "Legal" control 1952 causes the web page illustrated in FIG. 19Q to be displayed. In the illustrated embodiment, the URL indications 1920 for the various displayed web pages contain information that reflects the hierarchical nature of the sections and subsections of the web site. For example, the URL 1920 illustrated in FIG. 19O shows that the file structure for the web page includes a "careers" hierarchy member that is one hierarchy level below a "company" hierarchy member, which is at a first hierarchy level for the digiMine web site. Those skilled in the art will appreciate that in some embodiments each hierarchy member may reflect a hierarchical manner of storing the associated web pages or other information, such as by having a "careers" directory that is a subdirectory of a "company" subdirectory, which is itself a subdirectory of the digiMine web site.

Figure 19R:
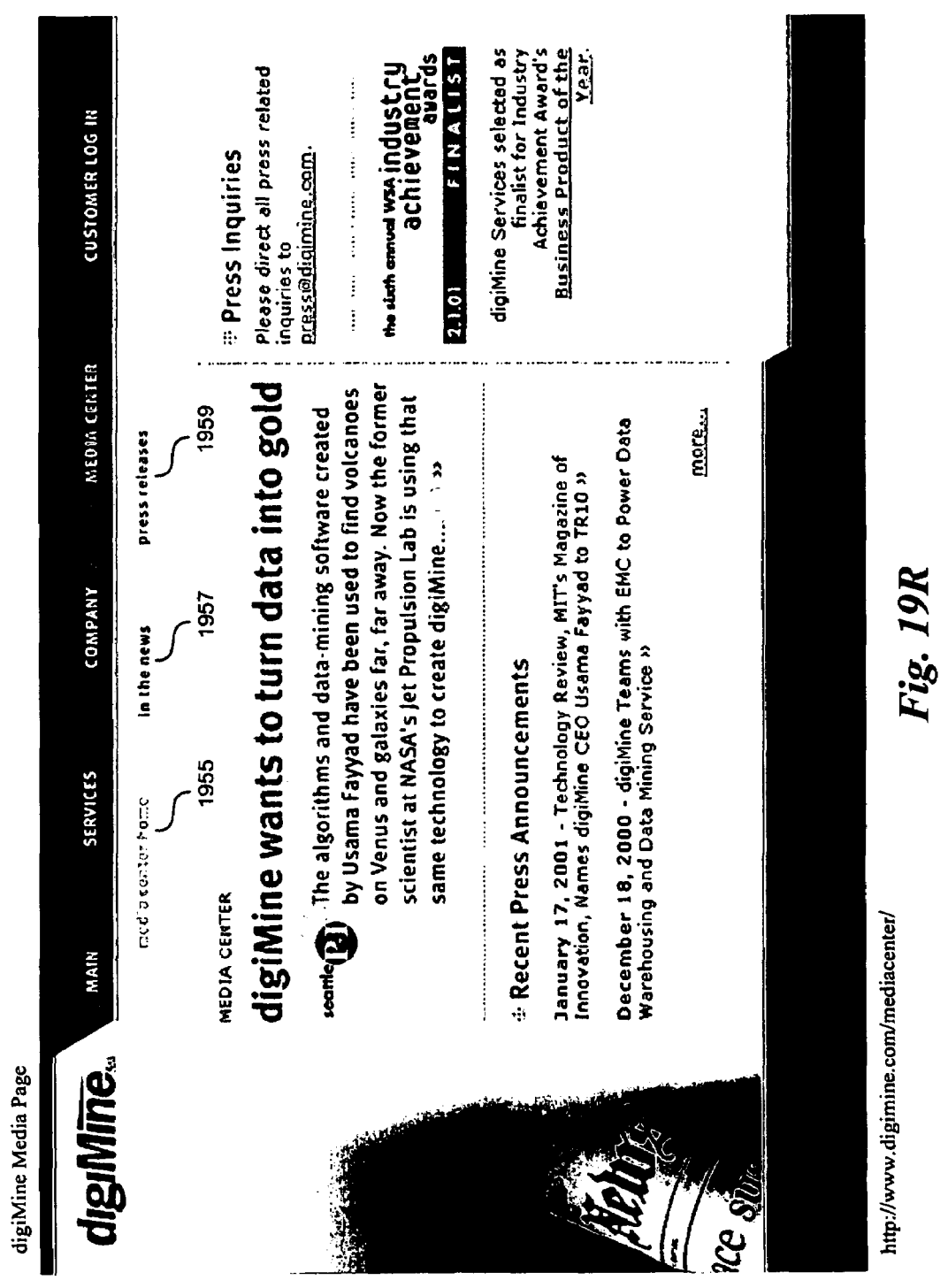

If the control 1907 is selected on any of the previously displayed web pages, an overview web page for the "Media Center" section of the web site will be displayed, as is illustrated in FIG. 19R. As is shown, subsections of the web site corresponding to press releases or to news articles can be accessed by selecting the displayed controls 1959 and

Figure 19S:

1957 respectively. After the "press releases" control 1959 is selected, the web page illustrated in FIG. 19S is displayed, with controls 1956 indicating various press releases that are available from this subsection of the web site.

Figure 19T:
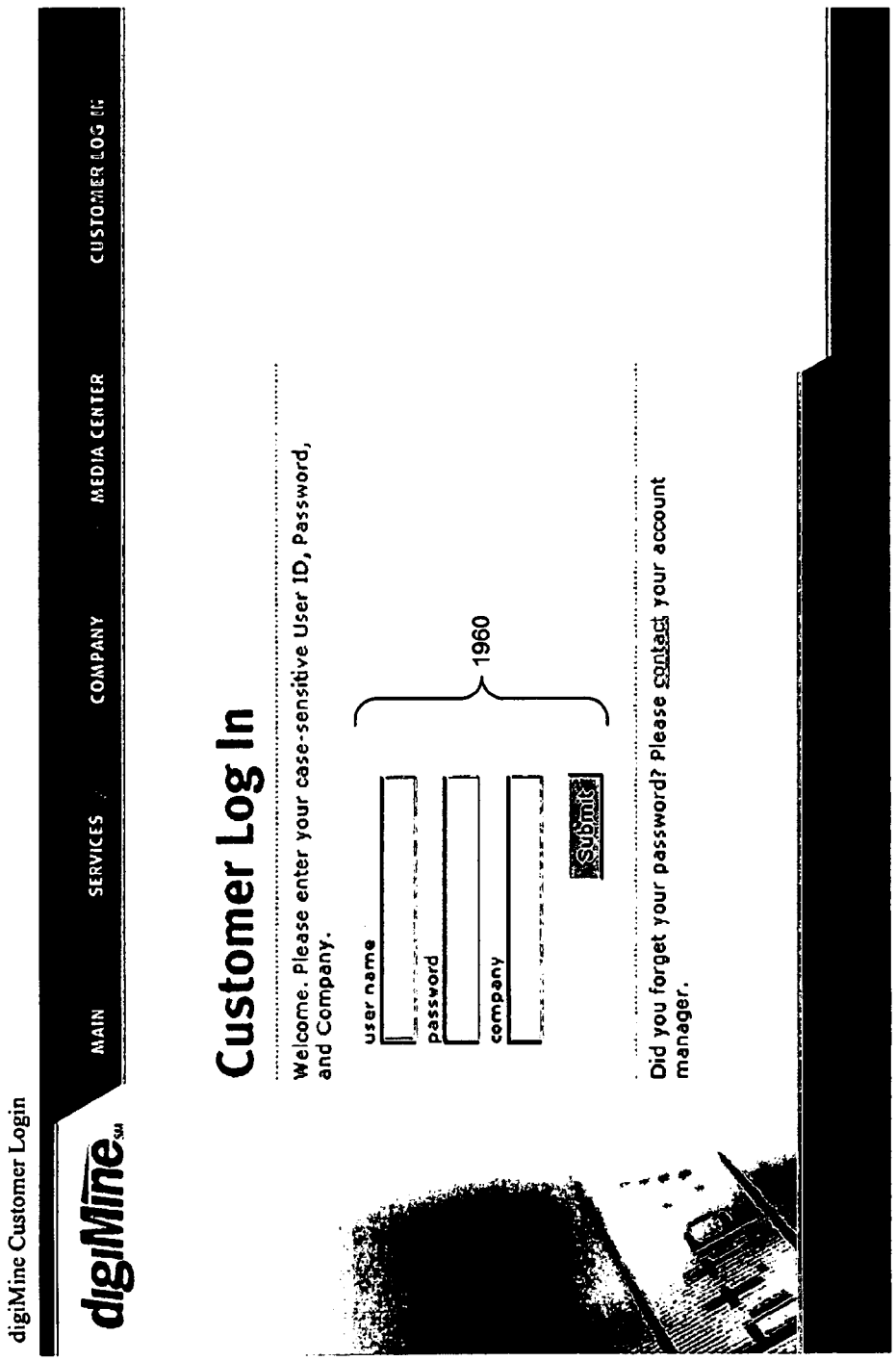

If the control 1909 is selected on one of the previously displayed web pages, the "Customer Log In" web page illustrated in FIG. 19T is displayed in response. As is shown, this web page includes a user-editable portion 1960 in which customers can interact with the web site in a manner other than merely selecting controls, such as by specify appropriate customer-specific access information in the appropriate form fields in order to obtain access to data for their own web site. In addition, as is shown by URL 1920, the customer-specific section of the digiMine web site is provided by a server using a different third-level domain name (i.e., insight.digimine.com) than the previously discussed sections of the web site (that use the third-level domain name www.digimine.com). Those skilled in the art will appreciate that this distinct third-level domain name may correspond to one or more web server machines that are distinct from the one or more web servers that support the www.digimine.com domain name, or that there may instead be partial or complete overlap in the respective web server machines. In addition, in the illustrated embodiment the web pages for the Customer Log In section of the web site are transmitted in a secure manner to protect confidential customer data (e.g., by using secure HTTP ("HTTPS") and a different port number than the standard port number 80 for unsecure HTTP).

Figure 19U:
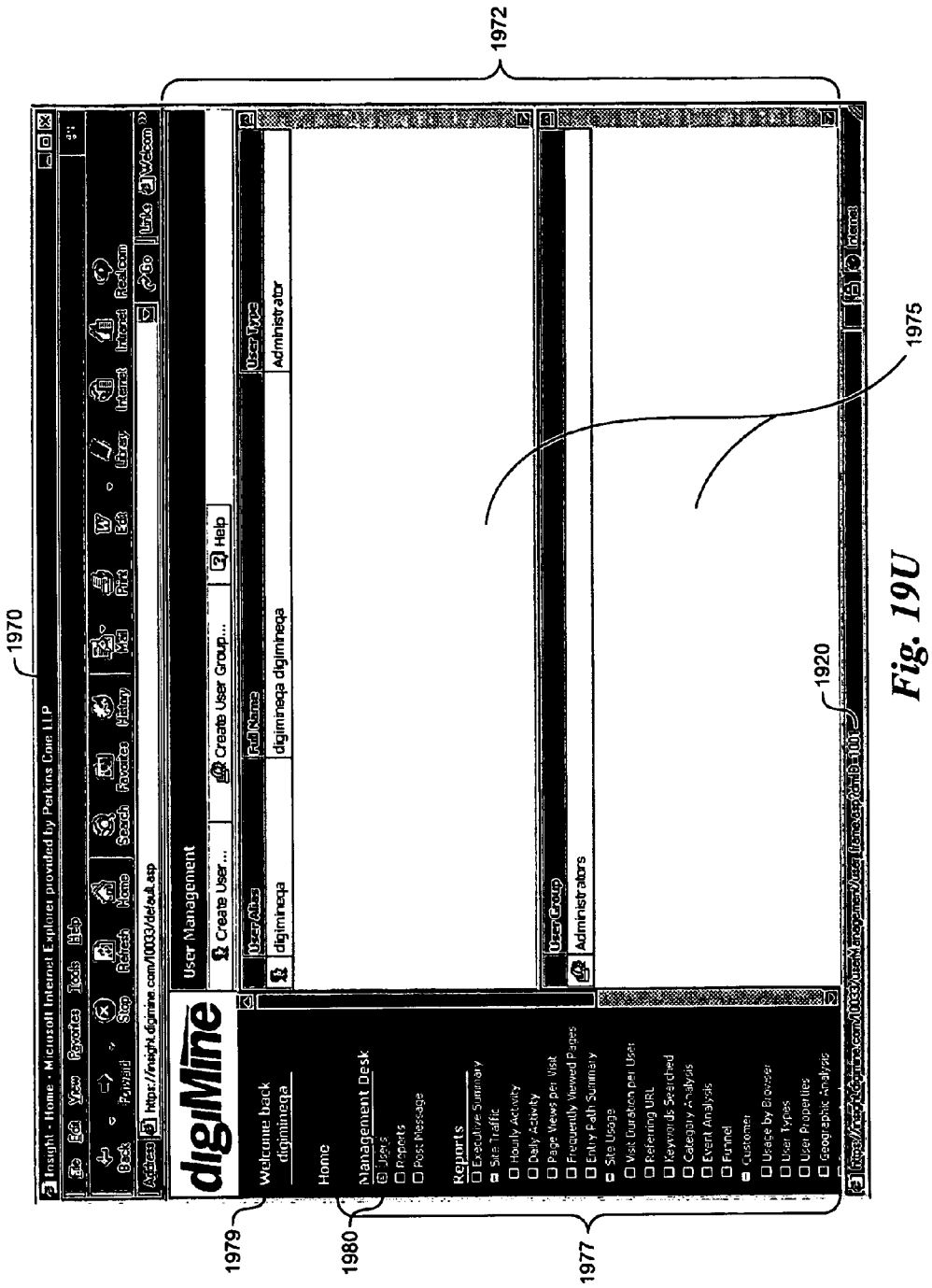

In the illustrated embodiment, a user digimineqa from the Quality Assurance department of digiMine provides the appropriate access information on the web page illustrated in FIG. 19T and, after interacting with the web site by selecting the "submit" button, receives the web page 1972 illustrated in FIG. 19U. This web page is shown displayed within a web browser display window 1970. The displayed web page includes multiple frames that are each able to display different content, including a control frame 1979 with various user-selectable controls 1977 and display frames 1975 in which customer-specific information is displayed. In the illustrated embodiment, the URL indication 1920 corresponds to the information displayed in the display frames. The path portion of the indicated URL specifies an executable Active Server Page ("ASP") program on the server that will supply the content displayed in the display frames, and the indicated URL also includes a query string portion that will be supplied as input to the executable program. In addition, note that in the illustrated embodiment, each customer receives a unique customer ID, and each customer's data is treated as a separate hierarchical section of the web site. For example, the ID for the current user is "10033," which is shown in the hierarchy structure of the path portion of the URL. Those skilled in the art will appreciate that in other embodiments different customer data could instead be accessed in a variety of other ways, such as by using the same URL path for each customer for a given type of data but using differing query strings to identify the current customer (e.g., "customerID=10033").

As is shown in FIG. 19U, a variety of types of information is available to each user, including administrative information related to the customer's account and information related to analysis of interaction or usage information from the customer. Those skilled in the art will appreciate that in some embodiments the analysis will have previously been performed and the analysis reports will use the information from the previous analysis (e.g., stored information), and in other embodiments the analysis can be dynamically performed when a report is requested by a customer.

Figure 19V:
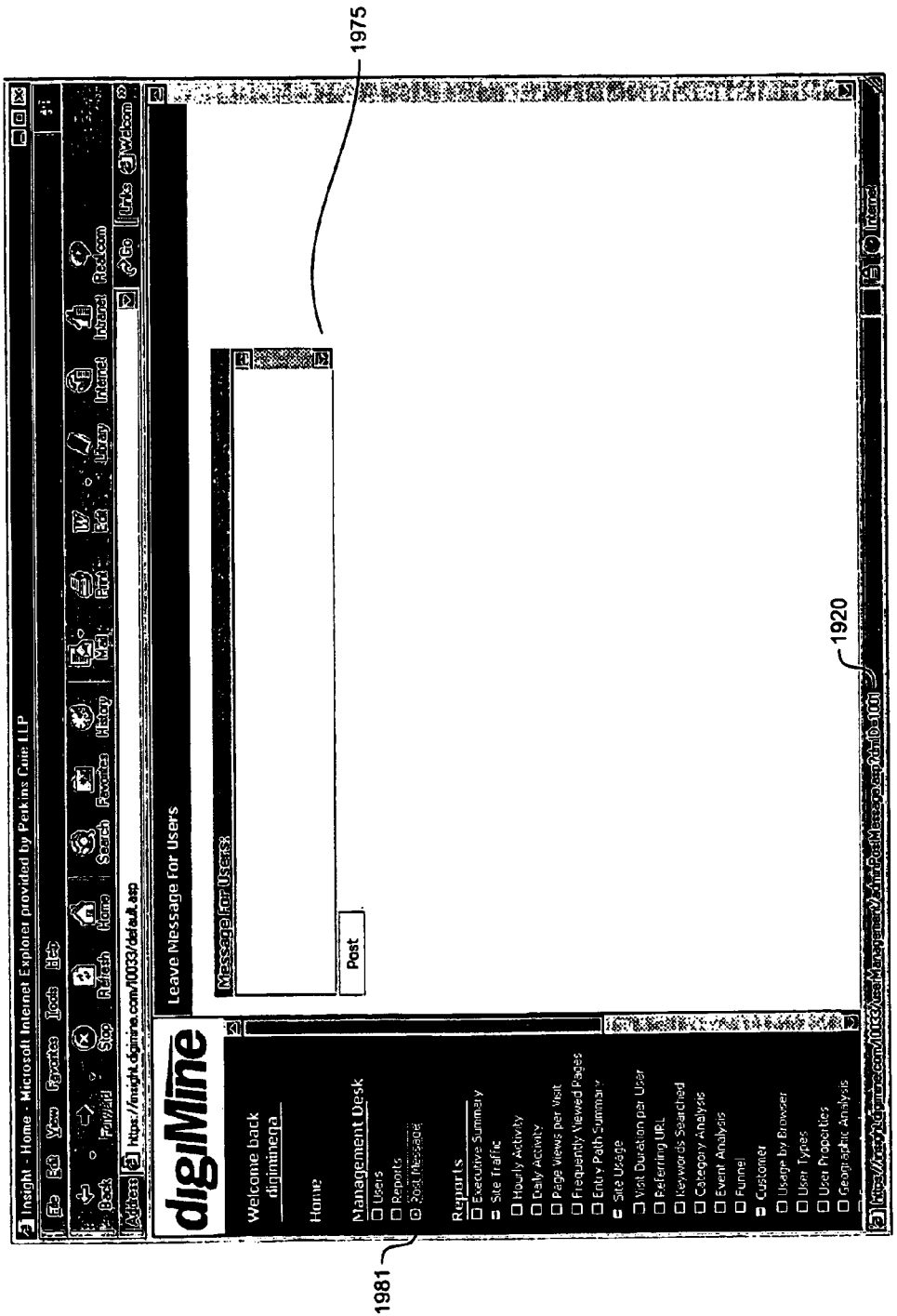

In the web page illustrated in FIG. 19U, the user has interacted with the web site to select the "Users" control 1980 in the "Management Desk" section of the customer-selectable controls, with the display frames correspondingly containing administrative information about the users defined for the current customer. In the illustrated embodiment, there is a single "Administrators" user group defined, and a single user "digimineqa" (whose information was used in the customer login screen illustrated in FIG. 19T) that is a member of that user group. Those skilled in the art will appreciate that other customers may have multiple user groups defined, as well as having multiple users in one or more of their user groups. Note also that the "X" in the box next to the Users control 1980 indicates that it is the currently selected customer control. FIG. 19V illustrates a web page corresponding to an alternate user selection from the Management Desk section of the customer controls, that being the "Post Message" control 1981. The display frame 1975 indicates that the current user can post a message that will be shown to other users. The URL indication 1920 for the display frame in this web page shows that a different ASP is specified to supply the displayed message form, and that the same query string as was used for the Users display is specified.

Figure 19W:
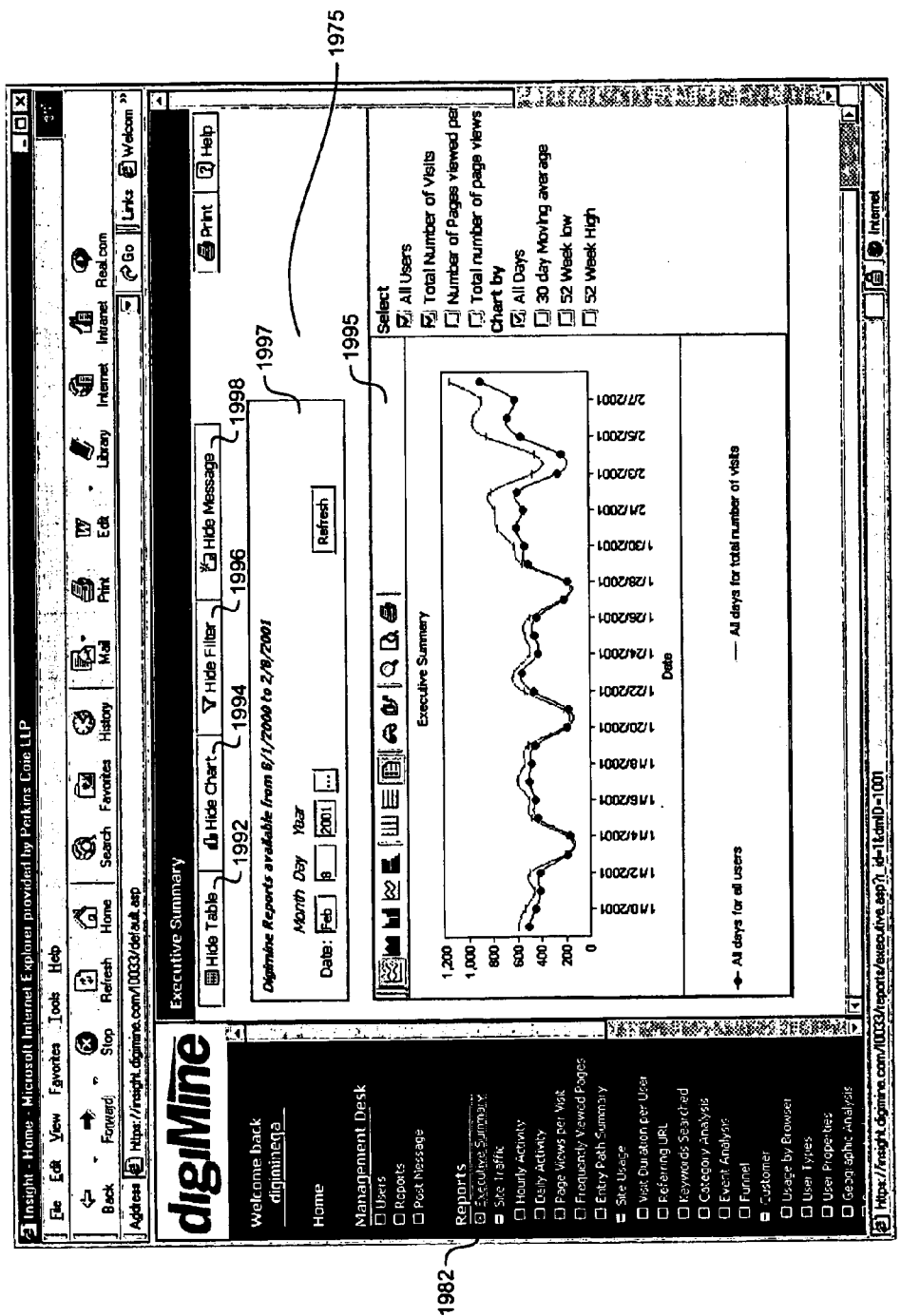

In addition to the administrative controls in the Management Desk section, there are a variety of data reports of differing types available to the user. The display frame illustrated in FIG. 19W contains an "Executive Summary" display for the user, as shown by selection of the "Executive Summary" control 1982. The content of the display frame includes various groups of information such as a date range filter 1997, a data chart 1995, a data table 1993 (not shown in the currently scrolled position of the display frame), and a message window 1999 (also not shown in the currently scrolled position of the display frame). In addition, the display frame includes display controls 1992, 1994, 1996, and 1998 with which the user can select whether to show or hide the various corresponding groups of information. The user can also modify the displayed information in various ways, such as by interacting with the web site to modify the specified date information in the date filter using the user-selectable controls and by interacting with the web site to alter the visual appearance of the chart or the data displayed in the chart via the various user-selectable display controls available within the display chart group of information.

Figure 19X:
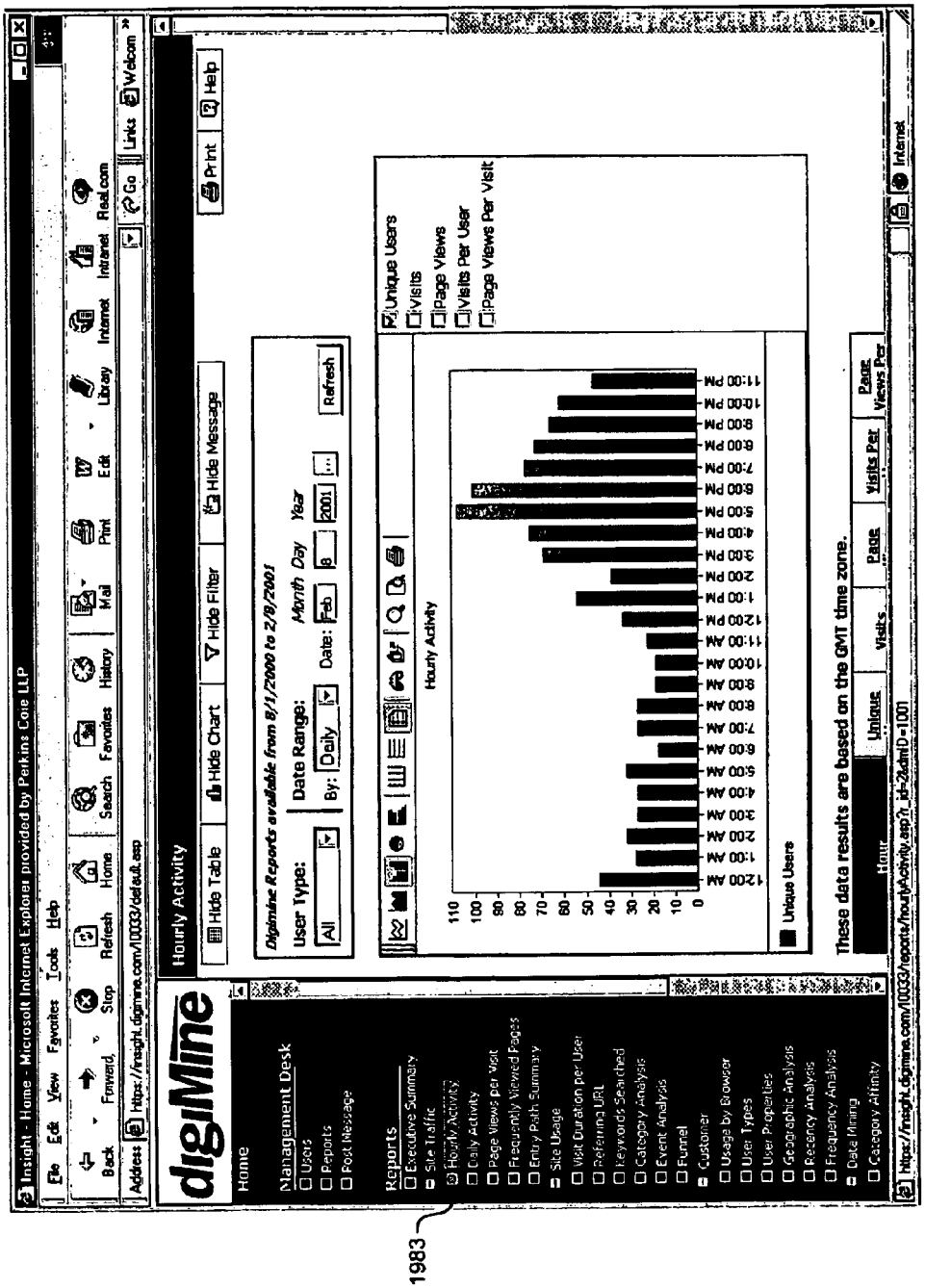

In addition to the Executive Summary report, the "Reports" section of the customer controls includes groups of "Site Traffic" sub-section controls, "Site Usage" sub-section controls, "Customer" sub-section controls, "Data Mining" sub-section controls, and "Products and Transactions" sub-section controls. FIG. 19X illustrates a web page whose display frame includes a report corresponding to the "Hourly Activity" Site Traffic control 1983. As with the Executive Summary report, the Hourly Activity report includes a date range filter, chart, table, and message window. As shown, other Site Traffic reports include a Daily Activity report, a Page Views per Visit report, a Frequently Viewed Pages report, and an Entry Path Summary report.

Figure 19Y:
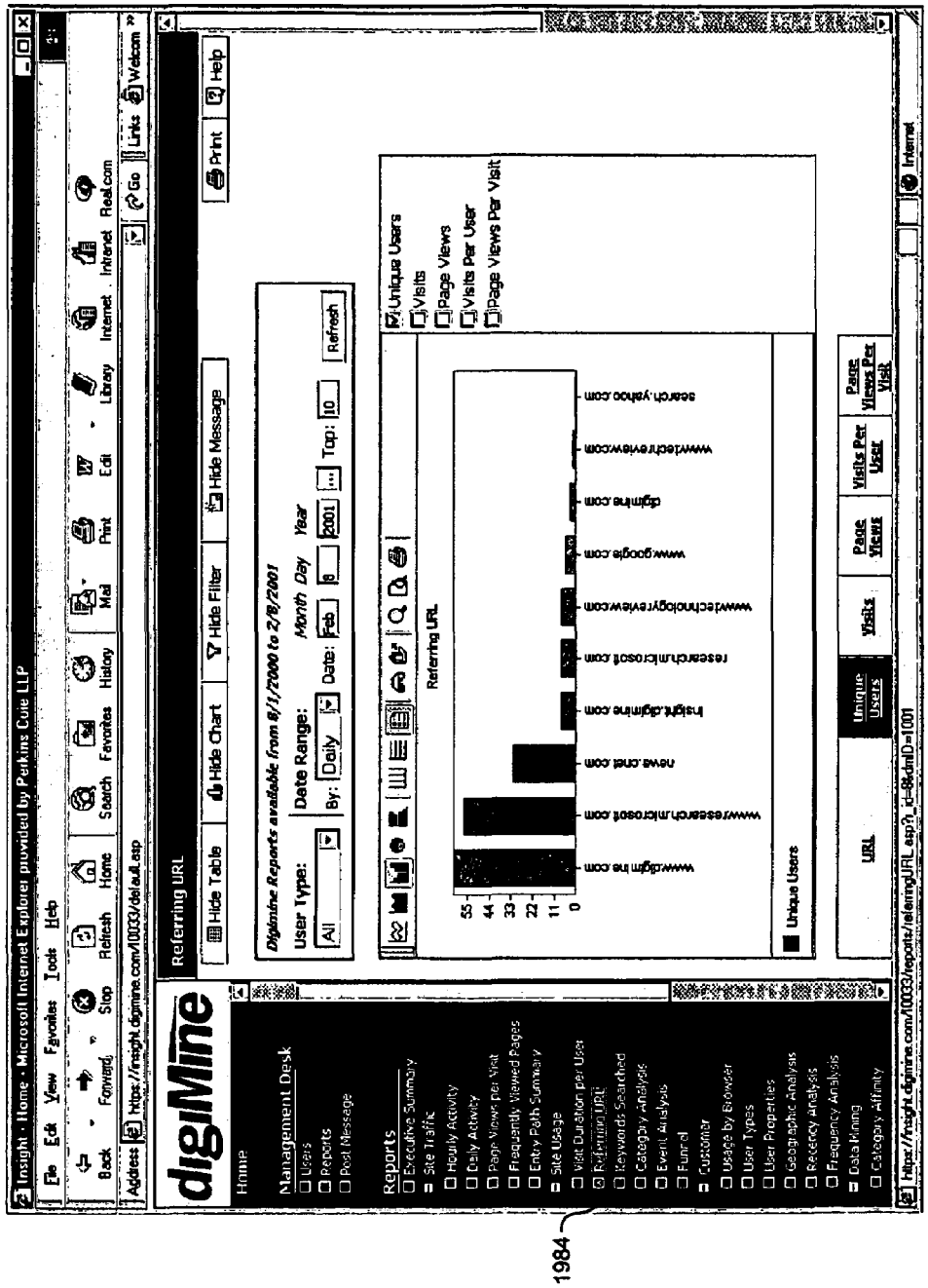
Figure 19Z:
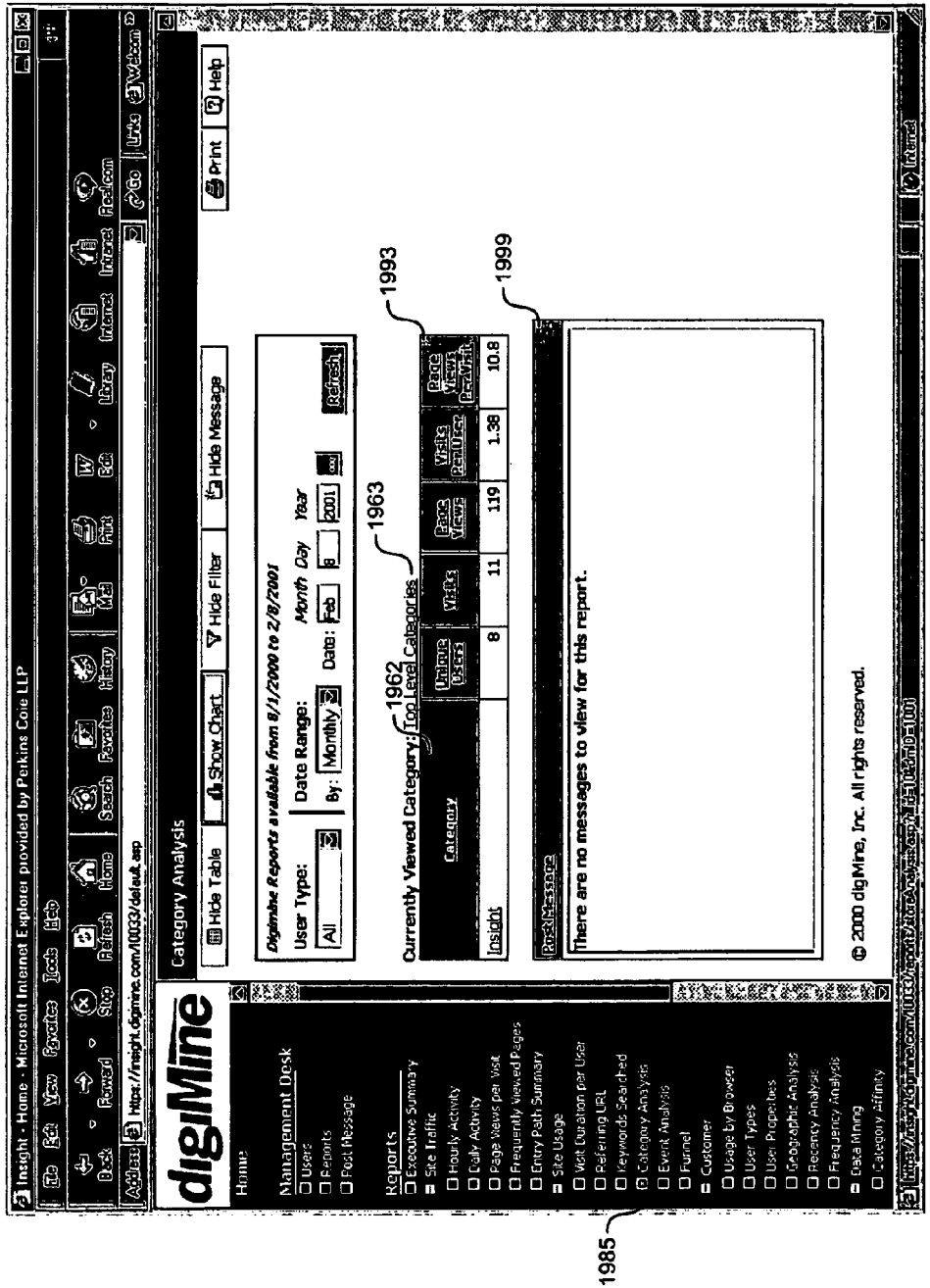
Figure 19A:
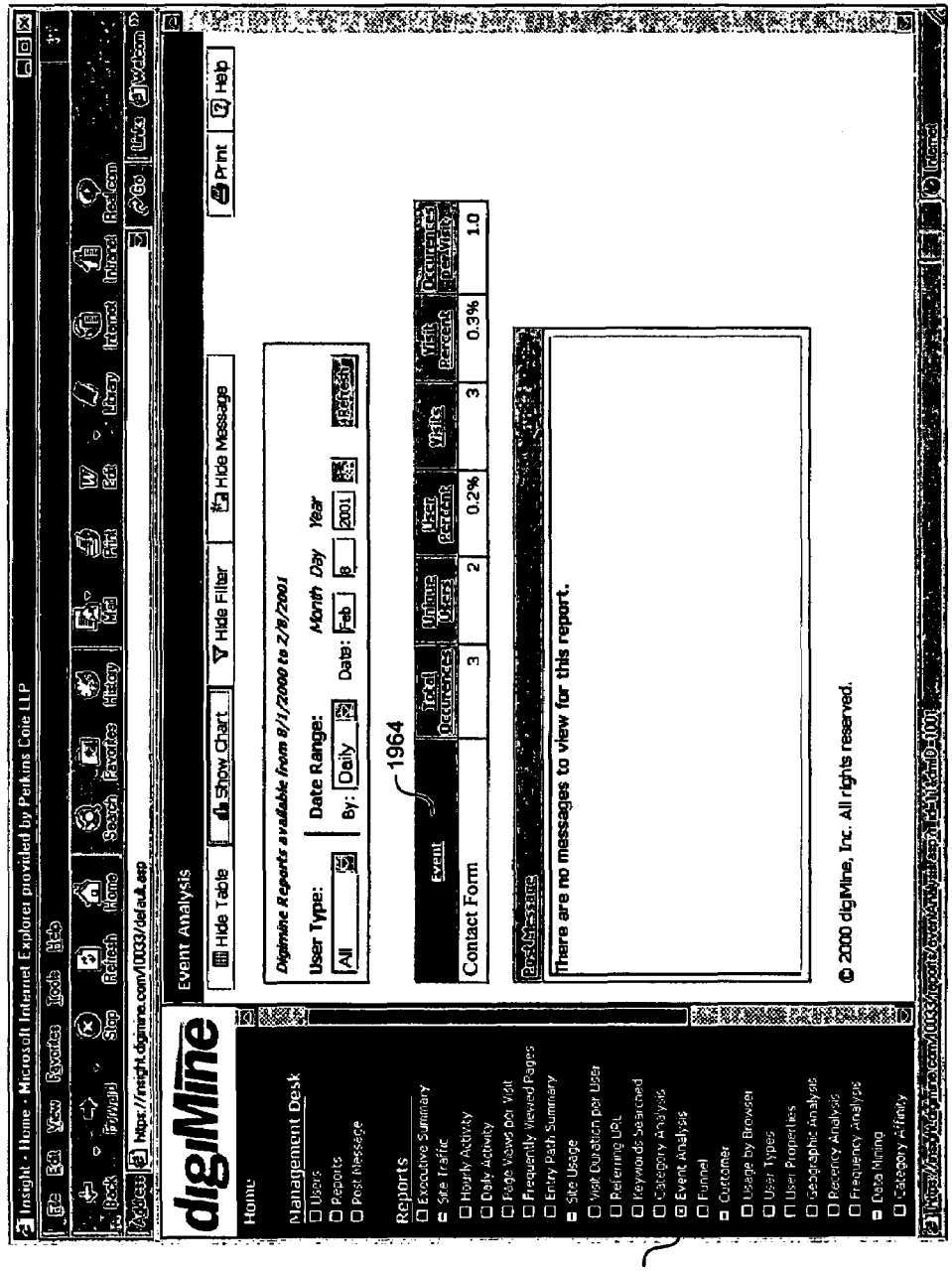
Figure 19A:
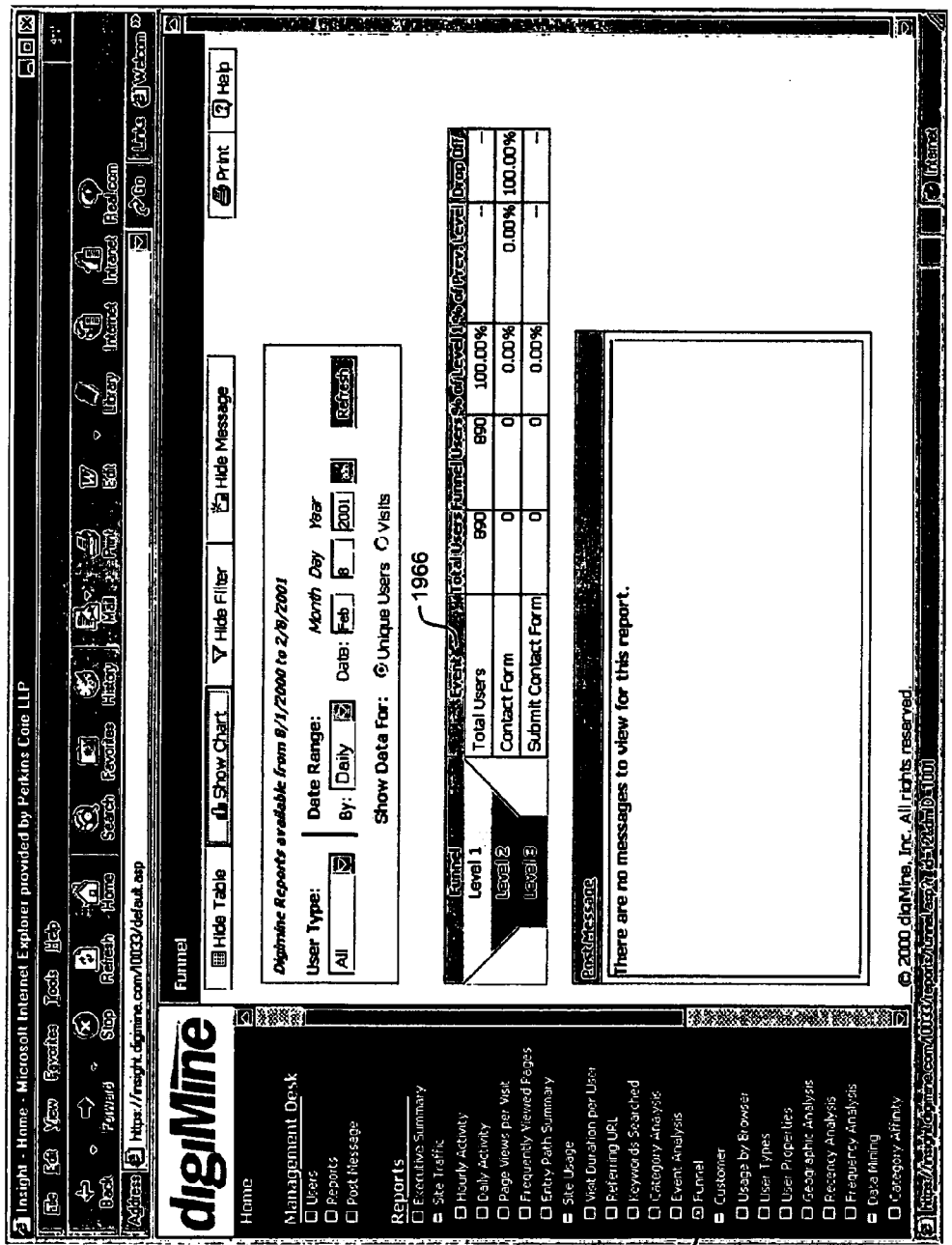
Figure 19A:
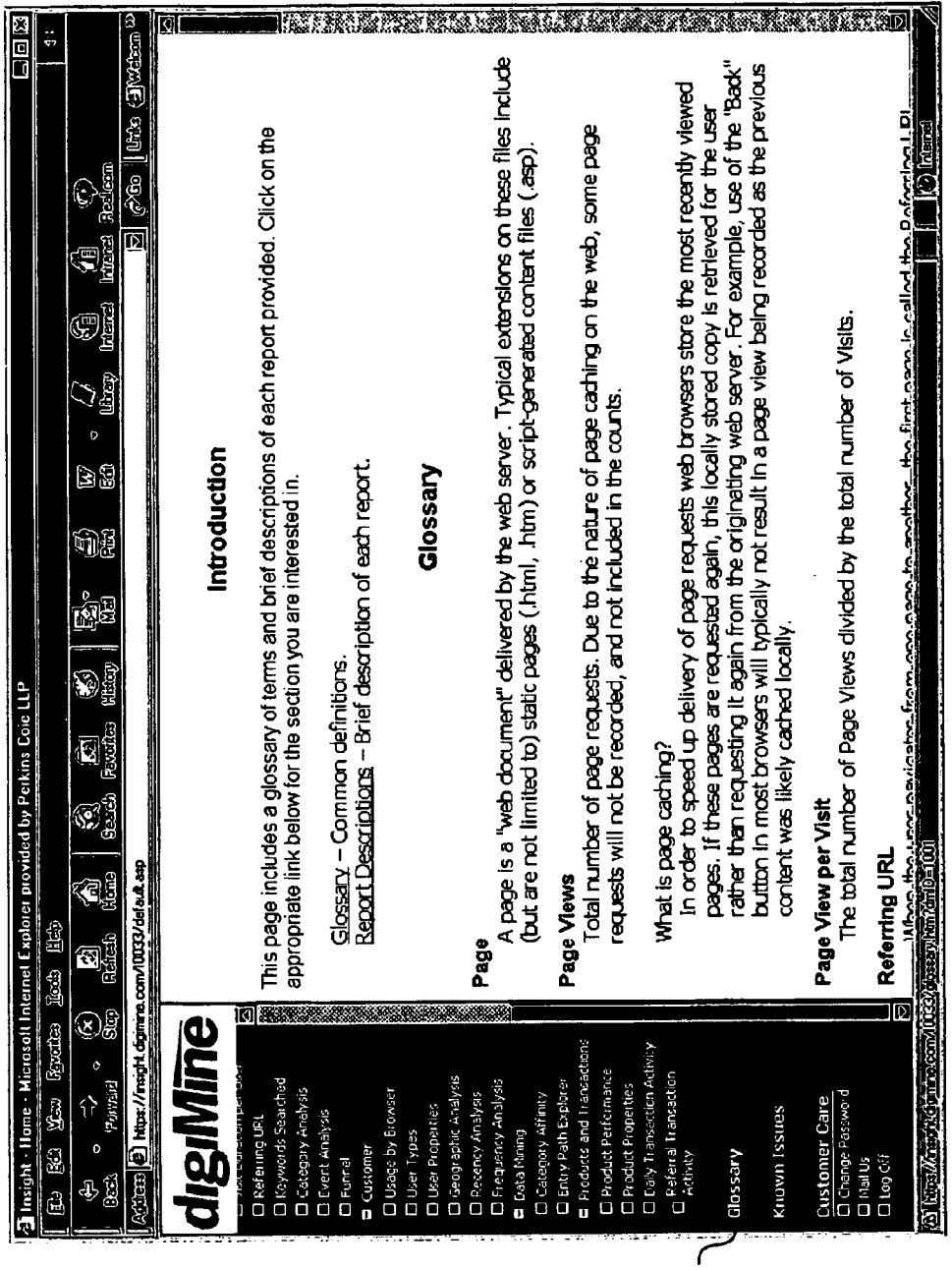

The Site Usage reports include a Visit Duration per User report, a Referring URL report, a Keywords Searched report, a Category Analysis report, an Event Analysis report, and a Funnel report. FIG. 19Y illustrates a web page whose display frame shows a Referring URL report, as indicated by the selection of the Referring URL control 1984. Conversely, FIG. 19Z illustrates a web page whose display frame includes a Category Analysis report. In the illustrated display frame, the data table 1993 and message window 1999 are visible, and the data chart is currently hidden. The Category Analysis report provides various information for each of one or more categories, such as the number of Page Views for web pages of the category and the number of Unique Users who have viewed web pages of that category. In the illustrated embodiment, only the top-level categories are currently shown (as illustrated by the user-selectable control 1963), with only a single top-level category currently defined for the digimineqa customer.

Those skilled in the art will appreciate that other users may have multiple top-level categories, and that the categories whose information is to be displayed can be selected in various ways. For example, all of the categories at all of the hierarchy levels could be displayed, and the user could then pick and choose any categories in which they have an interest. Alternately, a user could select a level of categories, such as top-level or second-level categories, and have information displayed for each category at that selected level. In other situations, it may be useful to display category information for a specified category and all sub-categories or super-categories in a hierarchical arrangement. Those skilled in the art will appreciate that categories to be displayed can be selected in other similar ways. FIG. 19AA illustrates one example embodiment of displaying multiple categories for selection. As is shown, in the illustrated embodiment the categories are arranged in a hierarchical manner, thus allowing various groupings of categories to be chosen such as individual categories, all categories in a hierarchical structure, all categories at a specified level of the hierarchy, etc.

FIG. 19AB illustrates a web page whose display frame includes an Event Analysis report, as indicated by the selection of the Event Analysis control 1986. In the illustrated embodiment, only a single event type has been selected to have information displayed, that being the "Contact Form" event type 1964 (e.g., corresponding to each person that has interacted with the web site to request the web page corresponding to digiMine's contact form or to submit a completed contact form). As is shown, a variety of types of information can be illustrated for each event type, such as "Total Occurrences," "Unique Users," and "Occurrences per Visit," and information can be simultaneously displayed for multiple related or unrelated event types. Those skilled in the art will appreciate that event types whose information is to be displayed can be selected in a variety of ways, such as in a manner analogous to those discussed above with respect to multiple categories. FIG. 19AC illustrates a Funnel report that provides one example of displaying information for multiple related event types, those being a sequence of related event types.

In addition to providing information about each of multiple categories individually, various types of information about the interactions of multiple categories can also be displayed. For example, the display frame of the web page illustrated in FIG. 19AD shows a Category Affinity report in which information is provided about users that access web pages in each of the displayed categories in a single user session. Those skilled in the art will appreciate that categories to be included in such a report can be chosen in a variety of ways, such as was discussed previously for the Category Analysis report. Those skilled in the art will also appreciate that a variety of other types of similar information can be shown rather than merely combinations of categories, such as sequences of categories in which the order of the viewing is relevant. Similarly, in other embodiments affinity reports could be presented for other types of information, such as specified event types or combinations of categories and event types. FIG. 19AE illustrates that, in addition to displaying various reports, information that is not customer-specific can also be provided, such as a glossary of terms. Those skilled in the art will appreciate that various other types of information can similarly be provided.

As previously noted, Tables 3–6 contain example data parsing information that can be used by the parser component to identify various high-level types of occurrences for the example digiMine web site illustrated in FIGS. 19A–19AE. In some embodiments, occurrence types can be specified by using a web site or web server identifier, an identifier for one or more URIs, and/or one or more query string identifiers. Correspondingly, Tables 3–6 contain example data parsing information corresponding to identifying those types of information.

In particular, Table 3 contains example data parsing information used to identify the digiMine web site and its web servers. As previously illustrated in Table 1, each log entry to be parsed will typically include an IP address and a port number that are used to communicate with (e.g., send requests to) a web server computer.

The identification of whether a particular log entry corresponds to a particular web site is complicated by several factors. For example, it is common for web sites to use a primary domain name (e.g., www.digimine.com) whose corresponding IP address is a load balancing device that can direct client requests to multiple physical web server machines that each have their own distinct IP addresses. Thus, there will typically be multiple IP addresses for multiple web servers that can provide the same web pages for a web site. In some situations, all of the web servers for a web site will maintain a single log file for the entire web site, while in other situations each of the web servers will maintain a separate log. However, even if each web server maintains a separate log, in some situations the various log files will be combined together before they are processed by the parser component. Thus, each entry in the log file can correspond to different physical machines that are acting as web servers for the web site.

In addition to having multiple alternate web servers that can each provide any of the web site content, in other situations a web site may have certain subsections or types of processing (e.g., server-executed code) that are provided by one or more web servers that are distinct from the other web servers providing the rest of the content for the web site. In these situations, communications shown in the log file that are directed to those web servers will typically be restricted to those portions of the web site or types of processing handled by the web servers.

In addition to having multiple web servers that each provide some or all of the content for a web site, in other situations a single machine will act as a web server for multiple web sites. In such situations, each web site can have a distinct domain name that may be mapped to a distinct IP address, but all of the IP addresses refer to that single physical machine. In such a situation, if the machine maintains a single log file for any requests that it receives, then the log file will contain entries for each of the web sites that it hosts. Thus, in such a situation it is useful to be able to determine the log entries that correspond to a particular web site of interest.

In the example site data parsing information illustrated in Table 3 below, it can be seen that the digiMine web site is separated into two groups of content having distinct domain names. While the data parsing information in this illustrated embodiment is illustrated using XML format, those skilled in the art will appreciate that such information can be specified in other manners. Lines 3–6 in Table 3 illustrate a first SiteURL with an ID of 1 that corresponds to a portion of the web site whose web pages are provided using the third-level domain name "insight.digimine.com." As is shown, two different VirtualServer logical site definitions each specify virtual web servers that can provide this group of content, with the virtual web servers using IP addresses 209.67.55.102 and 192.168.73.66 and both using port 0. As noted above, in some situations these IP addresses may correspond to two distinct physical machines. Alternately, a single machine can act as multiple virtual servers in various ways, such as having multiple IP addresses or by having different virtual servers that correspond to different port numbers for the machine (i.e., since each virtual server in the illustrated embodiment is based on a combination of an IP address and a TCP port number, a single machine can act as a first virtual server for secure HTTP communications on port number 0 and a second virtual server for normal HTTP communications can use port number 80). The portion of the web site having the content corresponding to this first SiteURL is reached by a user selecting control 1909 on a web site web page (such as that illustrated in FIG. 19S), and some of the web pages corresponding to this content are illustrated in FIGS. 19T–19AE.

states, with the URLs for the content related to each state preceded by an initial URL such as "/Washington/" or "/Kansas/."

Table 4 illustrates various example data parsing information that defines types of interaction events with the example digiMine web site that are of interest. Those skilled in the art will appreciate that each web site owner may be interested in tracking information about different types of events. Conversely, web sites of similar types may often have interest in similar types of events. For example, merchant web sites that sell items will typically be interested in events related to such sales, such as adding items to a shopping cart or completing a purchase. For an informational web site such as the digiMine web site, it may be of interest when users view certain web pages or take actions such as submitting a contact form.

In the example XML event type data parsing information illustrated in Table 4, each event type of interest is specified using an EventDefinition event type definition. As is shown, each EventDefinition can have one or more defined EventDefinitionPatterns event type patterns that each includes a

TABLE 3

```
<Sites>
    <Site Id="1" CookieIdentifiers="SITESERVER=,=" VisitTimeOut=" " TimeZoneName="GMT">
        <SiteUrl SiteUrlId="1" Name="https://insight.digimine.com" Url="/">
            <VirtualServer Id="1" IpAddress="209.67.55.102" TcpPort="0"/>
            <VirtualServer Id="2" IpAddress="192.168.73.66" TcpPort="0"/>
        </SiteUrl>
        <SiteUrl SiteUrlId="2" Name="http://www.digimine.com" Url="/"/>
    </Site>
</Sites>
```

The second SiteURL is defined in line 7 of Table 3 and corresponds to the rest of the web site content using the third-level domain name "www.digimine.com." In the illustrated embodiment, the last SiteUrl is a default that is used for any log entry that does not match an earlier SiteUrl definition, and thus this second SiteUrl does not require one or more associated combinations of IP address and port number in the illustrated embodiment. FIGS. 19A–19S illustrate some of the web pages in this group of content. Those skilled in the art will appreciate that in other situations there could be a single domain name that corresponds to all of the content for the web site, or that the web site could be divided into more than two groups or could be divided into multiple groups of content without using distinct domain names.

In the illustrated embodiment, in addition to having a specified domain name, each of the two SiteURLs have a path designation for that domain name that limits the group of content corresponding to the SiteURL to the URLs that match the path designation. The path designation in the illustrated embodiment matches a prefix of the URL path, and since both SiteURLs include a prefix path designation of "/", the SiteURLs will match all URLs using that domain name (since all URL paths begin with a "/"). In other situations, different SiteURLs may be defined using a single domain name and different URLs. For example, a web site devoted to providing state law information might separate the web sites into 50 content sets corresponding to the 50 combination of a URLPattern URL path pattern that can match one or more URL paths, a QueryStringPattern query string pattern that can match one or more query strings, and an indication of a previously defined SiteURL. The values that are specified for each of these types of information are used to determine whether a log entry matches the EventDefinitionPattern by including corresponding information.

As an example, the EventDefinitionPattern specified in lines 3 and 4 of Table 4 will match log entries for the group of content corresponding to the previously defined SiteURL with an ID of 2 (ie., the SiteURL defined in line 7 of Table 3) and any URL path that begins with the URL fragment "/company/contact_form.htm". This event type corresponds to a user requesting a Contact Form web page with which the user can supply their contact information to the web site. No value is supplied for the query string pattern portion of this event definition. In some embodiments, any of the three types of information specified for an EventDefinitionPattern can optionally not have a specified value, and if so will match any information of the corresponding type. Alternately, in other embodiments such a missing value could indicate that no information was allowed to be specified for that type of information (e.g., a log entry would not match this event type definition if it included any URL query string information), or different indications could be used to represent matching any information and matching no information.

TABLE 4

```
<Events>
    <EventDefinition Id="1" Name="Contact Form">
        <EventDefinitionPatterns SiteUrlId="2" UrlPattern="{prefix}=/company/contact_form.htm"
```

TABLE 4-continued

```
        QueryStringPattern=" "/> </EventDefinition>
    <EventDefinition Id="2" Name="Submit Contact Form">
        <EventDefinitionPatterns SiteUrlId="2" UrlPattern="{prefix}=/company/infoformsubmit.asp"
        QueryStringPattern=" "/> </EventDefinition>
    <EventDefinition Id="3" Name="Search">
        <EventDefinitionPatterns SiteUrlId"2" UrlPattern="{prefix}=/search.asp"
        QueryStringPattern="<keyword>*"/> </EventDefinition>
    <EventDefinition Id="4" Name="Use JSP">
        <EventDefinitionPatterns SiteUrlId="2" UrlPattern="{suffix}=.jsp"
        QueryStringPattern="<keyword>+&<debug>=!"/> </EventDefinition>
    <EventDefinition Id="5" Name="View General Counsel Bio">
        <EventDefinitionPatterns SiteUrlId="2" UrlPattern="{fn}=/company/BobBolan.htm"
        QueryStringPattern=" "/>
        <EventDefinitionPatterns SiteUrlId=" " UrlPattern="{prefix}=/search.asp"
        QueryStringPattern="<employeetype>=counsel"/>
    </EventDefinition>
        .
        .
        .
    <EventDefinition Id="400" Name="digiMine Login Attempt">
        <EventDefinitionPatterns SiteUrlId="1" UrlPattern="{prefix}=/I0033/login.asp"
        QueryStringPattern=" "/> </EventDefinition>
    <EventDefinition Id="401" Name="CompanyXYZ Login Attempt">
        <EventDefinitionPatterns SiteUrlId="1" UrlPattern="{prefix}=/E004/login.asp"
        QueryStringPattern=" "/> </EventDefinition>
        .
        .
        .
</Events>
```

Those skilled in the art will appreciate that the various portions of the event type definitions, such as the URL path patterns and query string patterns, can be defined in various ways and to match many different sets of data. For example, in the illustrated embodiment URL path patterns include a specifier of what portion of a URL path is to be matched and of a value for that portion of the URL. The URL path portion indicators include the indicators "prefix," "suffix," and "fn" which match respectively the beginning, ending, or all of the URL. For example, for the previously illustrated digiMine web site, an event type that is intended to match any request for information from the company section of the web site could include a URL path pattern with a "prefix" indicator and a value of "/company/." Thus, any URL paths that begin with the static portion of "/company/" and include any following variable portion will match the pattern. Alternately, the URL path portion illustrated in lines 12–13 will match any URL path that ends with the suffix ".jsp", which corresponds to any Java Server Page ("JSP") web pages (although the specified query string pattern for the event type definition will limit the URLs that will match the overall event type definition). Those skilled in the art will appreciate that URL path patterns could be specified in a variety of other ways, such as using wild cards (e.g., "*") or regular expressions.

In a similar manner to the URL path patterns, the query string patterns in the illustrated embodiment can also be defined to match various different sets of data. For example, the EventDefinitionPattern illustrated in lines 17 and 18 of Table 4 corresponds to a search functionality of the web site being invoked using a URL whose path begins with "/search.asp." While any number of query strings may be able to be supplied to the search.asp executable, this event pattern will match only query strings in which the query parameter name of "employeetype" is included and has a corresponding value of "counsel" (e.g., search.asp?employeetype=counsel).

Rather than specifying an explicitly required value such as "counsel," the presence or absence of a query string name can also be specified. For example, with respect to the EventDefinitionPattern illustrated in lines 9 and 10 of the Table, the included query string pattern specifies that a query parameter name of "keyword" can optionally be present in the query string (with the optional presence indicated in the illustrated embodiment by using the "*" character). In addition, as previously noted, log entry information corresponding to specified query parameter names can be extracted and analyzed. For example, if this event pattern matches a log entry to indicate an occurrence of this event type, and the "keyword" query parameter name and corresponding value is included in query string information in that log entry, that value will be extracted and stored.

In addition to query parameter names whose presence is specified as being optional, the illustrated embodiment also allows query parameter names to be required for a match to occur (i.e., by using the "+" character) or to instead be disallowed for a match to occur (i.e., by using the "!" character). For example, the event pattern illustrated in lines 12 and 13 of Table 4 includes a required query parameter name of "keyword" and a disallowed query parameter name of "debug." Those skilled in the art will appreciate that in other embodiments query string patterns can be specified in other manners, such as by using prefixes or suffixes, or by using regular expression specifications.

In some situations, a query string may include multiple query string names that are identical, such as an example URL "search.asp?keyword=ABC&keyword=DEF&specifier=GHI." In the illustrated embodiment, this group of query parameter names can be matched with a query string pattern such as "<keyword>=+&<keyword>=*&<other-name>=!", which requires or allows the first two (but not the third) query parameter names in the query string and disallows a query parameter name that is not present. In other embodiments, a query string pattern would only match a query string if the query string pattern explicitly allowed or required the presence of each query parameter name that is present in the query string. As it can be useful to separately track the values specified for each of the different query parameters even if they share a common name, such as when the order of the query parameter names is relevant in assigning different meanings to the corresponding values, the parser component can in some embodiments rename or map all (or all but one) of such query parameter names to have distinct names (e.g., to "keyword1" and "keyword2") for the purpose of storing the corresponding values. Thus, in this example, the parser component would store the corresponding value "ABC" from the example URL in a manner associated with the "keyword1" query parameter name so that it is distinct from the value "DEF" stored for the "keyword2" query parameter name.

In some situations, event type data parsing information can also specify sequences or series of related event types (also referred to as "funnels"). Such event type sequence definitions (not illustrated in Table 4) could be used in various ways, such as to store related event type information together, or to allow pre-calculation of various inter-event type information.

Another type of data parsing information that can be used to identify occurrences of interest relates to categories of related content that are available from a web site or other content set. Categories of related content can be identified and specified in many ways. One common type of category relates to information stored or presented in a hierarchical manner, as with the web pages of many web sites. In such situations, different hierarchy members can serve as one basis for identifying categories of related content, such as the hierarchy members lowest-level leaf node hierarchy members or the hierarchy members at all hierarchy levels of the hierarchy structure.

Table 5 provides an example of category type data parsing information that corresponds to the digiMine web pages illustrated in FIGS. 19A–19AE. As previously noted, the digiMine web site is structured in a hierarchical manner with multiple sections, and the category data parsing information for the web site reflects that hierarchy. In particular, as is illustrated in FIG. 19A, there are sections of the web site that can be accessed using controls 1903, 1905, 1907 and 1909, with the corresponding groups of content related to services provided by digiMine, company-specific information, media information, and digiMine customer-specific information. In a corresponding manner, the category data parsing information for the web site has four top-level HierarchyMember category type definitions that begin at lines 3, 22, 45, and 59 of Table 5. In the illustrated embodiment, each HierarchyMember has a MemberName that is used to visually represent the HierarchyMember (such as in reports), a unique ID, and a unique PageKey name that indicates the hierarchical position of the HierarchyMember.

TABLE 5

```
<Hierarchy Id="1" MemberNameSeparator=">">
    <HierarchyMember Id="1" MemberName="Services" PageKey="-1">
        <HierarchyMember Id="2" MemberName="Service Benefits" PageKey="-1-1">
            <PageKeyTemplate SiteUrlId="2" Priority="98"
                BaseUrl="{prefix}=/services/servicebenefits.htm" QueryStringPattern=" "/>
            </HierarchyMember>
        <HierarchyMember Id="3" MemberName="Take the Quiz" PageKey="-1-2">
            <PageKeyTemplate SiteUrlId="2" Priority="98" BaseUrl="{prefix}=/services/quiz.htm"
                QueryStringPattern" "/> </HierarchyMember>
        <HierarchyMember Id="4" MemberName="How digiMine works" PageKey="-1-3">
            <PageKeyTemplate SiteUrlId="2" Priority="98" BaseUrl="{prefix}=/services/howworks.htm"
                QueryStringPattern" "/> </HierarchyMember>
        <HierarchyMember Id="5" MemberName="digiMine Data Enhancement Services" PageKey="-1-
            4">
            <PageKeyTemplate SiteUrlId="2" Priority"98"
                BaseUrl="{prefix}=/services/enhancement.htm" QueryStringPattern=" "/>
            </HierarchyMember>
            .
            .
            .
        <PageKeyTemplate SiteUrlId="2" Priority="99" BaseUrl="{prefix}=/services/"
            QueryStringPattern=" "/>
    </HierarchyMember>
    <HierarchyMember Id="9" MemberName="Company" PageKey="-2">
        <HierarchyMember Id="10" MemberName="Management" PageKey="-2-1">
            <PageKeyTemplate SiteUrlId="2" Priority="98"
                BaseUrl="{prefix}=/company/management.htm" QueryStringPattern=" "/>
            </HierarchyMember>
        <HierarchyMember Id="11" MemberName="Careers" PageKey="-2-2">
            <HierarchyMember Id="12" MemberName="R & D" PageKey="-2-2-1">
                <PageKeyTemplate SiteUrlId="2" Priority="97"
                    BaseUrl="{prefix}=/company/careers/rd.htm" QueryStringPattern=" "/>
                </HierarchyMember>
                .
                .
                .
            <HierarchyMember Id="16" MemberName="Legal" PageKey"-2-2-5">
                <PageKeyTemplate SiteUrlId="2" Priority="97"
                    BaseUrl="{prefix}=/company/careers/legal.htm" QueryStringPattern" "/>
                </HierarchyMember>
            <PageKeyTemplate SiteUrlId="2" Priority="98" BaseUrl="{prefix}=/company/careers/"
                QueryStringPattern" "/>
            </HierarchyMember>
        <HierarchyMember Id="17" MemberName="Contact" PageKey="-2-3">
```

TABLE 5-continued

```
            <PageKeyTemplate SiteUrlId="2" Priority="98" BaseUrl="{prefix}=/company/contact.htm"
                QueryStringPattern=" "/> </HierarchyMember>
        <PageKeyTemplate SiteUrlId="2" Priority="99" BaseUrl="{prefix}=/company/"
                QueryStringPattern=" "/>
    </HierarchyMember>
    <HierarchyMember Id="18" MemberName="Media Center" PageKey="-3">
        <HierarchyMember Id="19" MemberName="News" PageKey="-3-1">
            <PageKeyTemplate SiteUrlId="2" Priority="98" BaseUrl="{prefix}=/mediacenter/news.htm"
                QueryStringPattern" "/> </HierarchyMember>
                .
                .
                .
        <HierarchyMember Id="24" MemberName="Press Releases" PageKey"-3-4">
            <PageKeyTemplate SiteUrlId="2" Priority="98"
                BaseUrl="{prefix}=/mediacenter/pressreleases.htm" QueryStringPattern" "/>
                </HierarchyMember>
        <PageKeyTemplate SiteUrlId="2" Priority="99" BaseUrl="{prefix}=/mediacenter/"
            QueryStringPattern=" "/>
    </HierarchyMember>
    <HierarchyMember Id="233" MemberName="Insight" PageKey="-4">
        <HierarchyMember Id="234" MemberName="digiMine" PageKey="-4-01">
            <HierarchyMember Id="235" MemberName="Reports" PageKey="-4-01-1">
                <HierarchyMember Id="236" MemberName="Executive Summary" PageKey="-4-01-1-
                    1">
                    <PageKeyTemplate SiteUrlId="1" BaseUrl="{prefix}=/I0033/reports/executive.asp"
                        QueryStringPattern=" " Priority=" "/> </HierarchyMember>
                <HierarchyMember Id="237" MemberName="Site Traffic" PageKey="-4-01-1-2">
                <HierarchyMember Id="238" MemberName="Hourly Activity" PageKey="-4-01-1-2-1">
                    <PageKeyTemplate
                        SiteUrlId="1"BaseUrl="{prefix}=/I0033/reports/hourlyActivity.asp"
                        QueryStringPattern=" " Priority="95"/> </HierarchyMember>
                        .
                        .
                        .
                </HierarchyMember>
                <HierarchyMember Id="243" MemberName="Site Usage" PageKey="-4-01-1-3">
                    .
                    .
                    .
                    <HierarchyMember Id="247" MemberName="Category Analysis" PageKey="-4-01-
                        1-3-4">
                        <PageKeyTemplate SiteUrlId="1"
                        BaseUrl="{prefix}=/I0033/reports/storeanalysis.asp" QueryStringPattern=" "/
                        Priority="95" > </HierarchyMember>
                    <HierarchyMember Id="248" MemberName="Event Analysis" PageKey="-4-01-1-3-
                        5">
                        <PageKeyTemplate SiteUrlId="1"
                            BaseUrl="{prefix}=/I0033/reports/eventAnalysis.asp" QueryStringPattern=" "
                            Priority="95" /> </HierarchyMember>
                    <HierarchyMember Id="249" MemberName="Funnel" PageKey="-4-01-1-3-6">
                        <PageKeyTemplate SiteUrlId="1" BaseUrl="{prefix}=/I0033/reports/funnel.asp"
                            QueryStringPattern=" " Priority="95" /> </HierarchyMember>
                </HierarchyMember>
                .
                .
                .
                <PageKeyTemplate SiteUrlId="0" Priority=" " BaseUrl="{prefix}=/I0033/reports/"
                    QueryStringPattern=" "/>
            </HierarchyMember>
            <PageKeyTemplate SiteUrlId="1" Priority="98" BaseUrl="{prefix}=/I0033/"
                QueryStringPattern=" "/>
        </HierarchyMember>
        <HierarchyMember Id="260" MemberName="CompanyXYZ" PageKey="-4-02">
            <HierarchyMember Id="261" MemberName="Reports" PageKey="-4-02-1">
                <HierarchyMember Id="262" MemberName="Executive Summary" PageKey="-4-02-1-
                    1">
                    <PageKeyTemplate SiteUrlId="1" BaseUrl="{prefix}=/E004/reports/executive.asp"
                        QueryStringPattern=" " Priority="96"/> </HierarchyMember>
                    .
                    .
                    .
            </HierarchyMember>
        </HierarchyMember>
        .
        .
        .
    </HierarchyMember>
</Hierarchy>
```

Each category type definition can optionally include one or more PageKeyTemplate page type definitions that specify which log entries will match the category type definition and be considered to be part of the corresponding category. In the illustrated embodiment, the page type definitions include information similar to that previously discussed with respect to event patterns of event type definitions. For example, as shown in line 19 of the Table, the page type definition for the "Services" section category of web pages includes an indication of a previously defined SiteURL logical site definition, a BaseURL path pattern that can match one or more URL paths, and a QueryStringPattern query string pattern that can match one or more query strings. Values for each of these types of page type definition information can optionally have values specified as with event type definitions, and if so will be used to determine whether a log entry matches the page type definition. As is shown in line 19, the "Services" category page type definition includes a URL path pattern with a "prefix" indicator and a value of "/services/", with no value supplied for the QueryStringPattern. Thus, each of the web pages illustrated in FIGS. 19B–19K would match this page type definition, and are therefore part of the corresponding "Services" category of the web site.

In some embodiments, such as the illustrated embodiment, category types can be structured in a hierarchical manner (e.g., to reflect content set items that are structured in a hierarchical manner). Each illustrated HierarchyMember category type definition can optionally be associated with one or more "children" HierarchyMembers that specify items at a next lower-level of the hierarchy. In the illustrated embodiment, the hierarchical relationship of the HierarchyMembers is illustrated both with indentation and with the PageKey values (e.g., a HierarchyMember with a PageKey of "–1-3-1" or "–1-3-5" is one hierarchy level below the HierarchyMember with a PageKey of "–1-3"). As mentioned above, the hierarchy members directly below another hierarchy member in a hierarchical structure can be referred to as "children", and the hierarchy member directly above can be referred to as a "parent" (e.g., the HierarchyMember with a PageKey of "–1-3-1" is a child of the HierarchyMember with a PageKey of "–1-3").

For example, in addition to the page type definition in line 19, the Services category type definition also includes definitions in lines 4–18 for multiple next lower-level category type definitions. Each of these next lower-level category type definitions define children categories (or "sub-categories") of the Services category, and have a format similar to that of the Services category type definition. For example, the "Service Benefits" category type definition defined in lines 4–6 of Table 5 corresponds to the web page illustrated in FIG. 19G, and includes a page key value that illustrates the hierarchical relationship of itself to the Services category. In the illustrated embodiment, the URL path patterns and query string patterns for the category type definitions use the same pattern matching formats as those discussed previously with respect to the event type definitions, but those skilled in the art will appreciate that in other embodiments event type definitions can be specified in a different manner than category type definitions.

In the illustrated embodiment, the page type definition in line 19 of Table 5 includes a Priority value whose use reflects that, in the illustrated embodiment, a log entry is identified as belonging to only one category type definition. In such an embodiment, however, the log entry may match the page type definitions specified for multiple category type definitions (e.g., the web page illustrated in FIG. 19F that has a URL path of "/services/enhancement.htm" will match not only the specific category type definition specified in lines 13–15 of Table 5 but also the more general parent category type definition whose page type definition is shown in line 19 of Table 5). Thus, if only one category type definition match is allowed, it is preferable that the "best" match be the one that is recorded for a log entry. In some embodiments the best match will be the most-specific category type definition (e.g., the matching category type definition at the lowest level of the hierarchical structure), while in other embodiments the best match may be the most-general matching category type definition. In the illustrated embodiment, the associated priority values are used to differentiate category type definitions at different levels of the hierarchy (e.g., the top-level category type definitions have a priority of 99 while the second-level category type definitions have a priority of 98). Using such information, the category type definitions can be organized before attempts at matching begin (putting either the highest priority values or the lowest priority values first), and the first category type definition whose page type definition matches the log entry can then be used as the single match.

While a log entry is allowed to match only a single category type definition in the illustrated embodiment, a log entry can be identified as being a member of each event type whose definition matches the log entry. Since a log entry will be checked against each available event type for a match in such an embodiment, it may not be necessary to provide Priority information with which to order the event types for checking. Conversely, in embodiments in which only one event type is allowed to match a log entry, or if the order in which the event types were to be matched was relevant for another reason, the EventDefinitionPatterns event patterns could similarly include priority information or other mechanisms for ordering the event type definitions in an appropriate manner. Similarly, if a log entry is allowed to match multiple category type definitions in other embodiments, and there is no other reason to order the category type definitions in a specific manner, such category type definitions may not include Priority value information.

When the parser component matches a log entry to a category type definition, it can increment various types of stored information about that category type, such as the number of page views, requests, visits, unique users, orders, revenue, etc. Similarly, the parser component can store similar types of information for event type occurrences that are noted. In addition, as previously illustrated in FIG. 19AD, in some situations it is useful to provide information about the relationships between multiple defined categories. In some embodiments, such combinations or sequences of categories can be pre-defined, and the category data parsing information can include definitions for those category combinations or sequences to allow various information about those categories to be preprocessed. Alternately, in other situations a user can select any two or more defined categories, and the system calculates the specified category relationships dynamically. Similarly, while sequences or combinations of event types of interest can be predefined in the event data parsing information, in other situations a user can dynamically specify two or more sequences or combinations of events, and the information related to that combination or sequence of events can be dynamically generated. FIG. 19AC provides an example of one report related to a sequence of event types.

In addition to the site, event, and category data parsing information, in some embodiments exclusion data parsing information can be specified to indicate types of log entries that are not to be further processed. Table 6 includes various examples of types of exclusion data parsing information. For example, in lines 2 and 3, it is shown that IP addresses (or ranges of such addresses) can be specified such that requests from clients at those IP addresses are not included in the processing (e.g., the IP addresses for the machines used by internal users). Lines 3–11 indicate that log entries requesting files of specified types can also be excluded, such as those with file extensions of ".dll" (i.e., dynamic libraries) or ".gif" (i.e., image files using the GIF format). Lines 12–30 indicate that other types of URI patterns can be specified with which to exclude log entries that match the patterns, such as for specific files or for files with specified suffixes or prefixes. While not illustrated, similar exclusion patterns could be specified for query strings. In addition to the exclusion information, other parser component configuration information can also be specified (e.g., on a customer-specific basis) that modifies or sets internal parameters that affect the behavior of the parser component, as is illustrated in lines 31–40. Those skilled in the art will appreciate that a wide variety of parser component behaviors can be dynamically specified through the use of such configuration information. The Appendix section of this document provides additional details on types of information that can be specified for the parser component in one embodiment.

TABLE 6

```
<Config>
    <ConfigConstants Name="ExcludedClientIPRange" Value="209.67.55.54,209.67.55.62"/>
    <ConfigConstants Name="ExcludedClientIPRange" Value="209.67.55.98,209.67.55.126"/>
    <ConfigConstants Name="ExcludedURIPattern" Value="{FileExt}=.cdf"/>
    <ConfigConstants Name="ExcludedURIPattern" Value="{FileExt}=.css"/>
    <ConfigConstants Name="ExcludedURIPattern" Value="{FileExt}=.dll"/>
    <ConfigConstants Name="ExcludedURIPattern" Value="{FileExt}=.gif"/>
    <ConfigConstants Name="ExcludedURIPattern" Value="{FileExt}=.ico"/>
    <ConfigConstants Name="ExcludedURIPattern" Value="{FileExt}=.jpeg"/>
    <ConfigConstants Name="ExcludedURIPattern" Value="{FileExt}=.jpg"/>
    <ConfigConstants Name="ExcludedURIPattern" Value="{FileExt}=.js"/>
    <ConfigConstants Name="ExcludedURIPattern" Value="{fn}=getvroot.asp"/>
    <ConfigConstants Name="ExcludedURIPattern" Value="{fn}=logo.asp"/>
    <ConfigConstants Name="ExcludedURIPattern" Value="{fn}=nav.asp"/>
    <ConfigConstants Name="ExcludedURIPattern" Value="{fn}=nav_frames.asp"/>
    <ConfigConstants Name="ExcludedURIPattern" Value="{prefix}=/license/"/>
    <ConfigConstants Name="ExcludedURIPattern" Value="{prefix}=/pitcher"/>
    <ConfigConstants Name="ExcludedURIPattern" Value="{suffix}=/include/Chart.asp"/>
    <ConfigConstants Name="ExcludedURIPattern" Value="{suffix}=/include/ChartObject.asp"/>
    <ConfigConstants Name="ExcludedURIPattern" Value="{suffix}=/include/messageboard.asp"/>
    <ConfigConstants Name="ExcludedURIPattern" Value="{suffix}=/include/report_check.asp"/>
    <ConfigConstants Name="ExcludedURIPattern" Value="{suffix}=/include/ReportFilter.asp"/>
    <ConfigConstants Name="ExcludedURIPattern" Value="{suffix}=/include/reportFunctions.asp"/>
    <ConfigConstants Name="ExcludedURIPattern" Value="{suffix}=/include/ReportQueries.asp"/>
    <ConfigConstants Name="ExcludedURIPattern" Value="{suffix}=/include/reportQueries.inc"/>
    <ConfigConstants Name="ExcludedURIPattern" Value="{suffix}=/include/Sql.asp"/>
    <ConfigConstants Name="ExcludedURIPattern" Value="{suffix}=/include/vbClientFunctions.asp"/>
    <ConfigConstants Name="ExcludedURIPattern" Value="{suffix}=/include/vbFunctions.asp"/>
    <ConfigConstants Name="ExcludedURIPattern" Value="{suffix}=/reports/Execchart.asp"/>
    <ConfigConstants Name="ExcludedURIPattern" Value="{suffix}=/reports/Execchartobject.asp"/>
    <ConfigConstants Name="HitsPtrsBufferSize" Value="20"/>
    <ConfigConstants Name="MaxLengthOutputField" Value="240"/>
    <ConfigConstants Name="QueryStringsKeyHashBuckets" Value="600"/>
    <ConfigConstants Name="QueryStringsKeyHashBuckets" Value="99"/>
    <ConfigConstants Name="RawHitsBufferSize" Value="100"/>
    <ConfigConstants Name="SuccessCodes" Value="200,304"/>
    <ConfigConstants Name="URIPairHashBuckets" Value="200"/>
    <ConfigConstants Name="UserAgentKeyHashBuckets" Value="99"/>
    <ConfigConstants Name="UserKeyBufferSize" Value="90"/>
    <ConfigConstants Name="UserKeyHashBuckets" Value="499"/>
</Config>
```

Figure 27A:
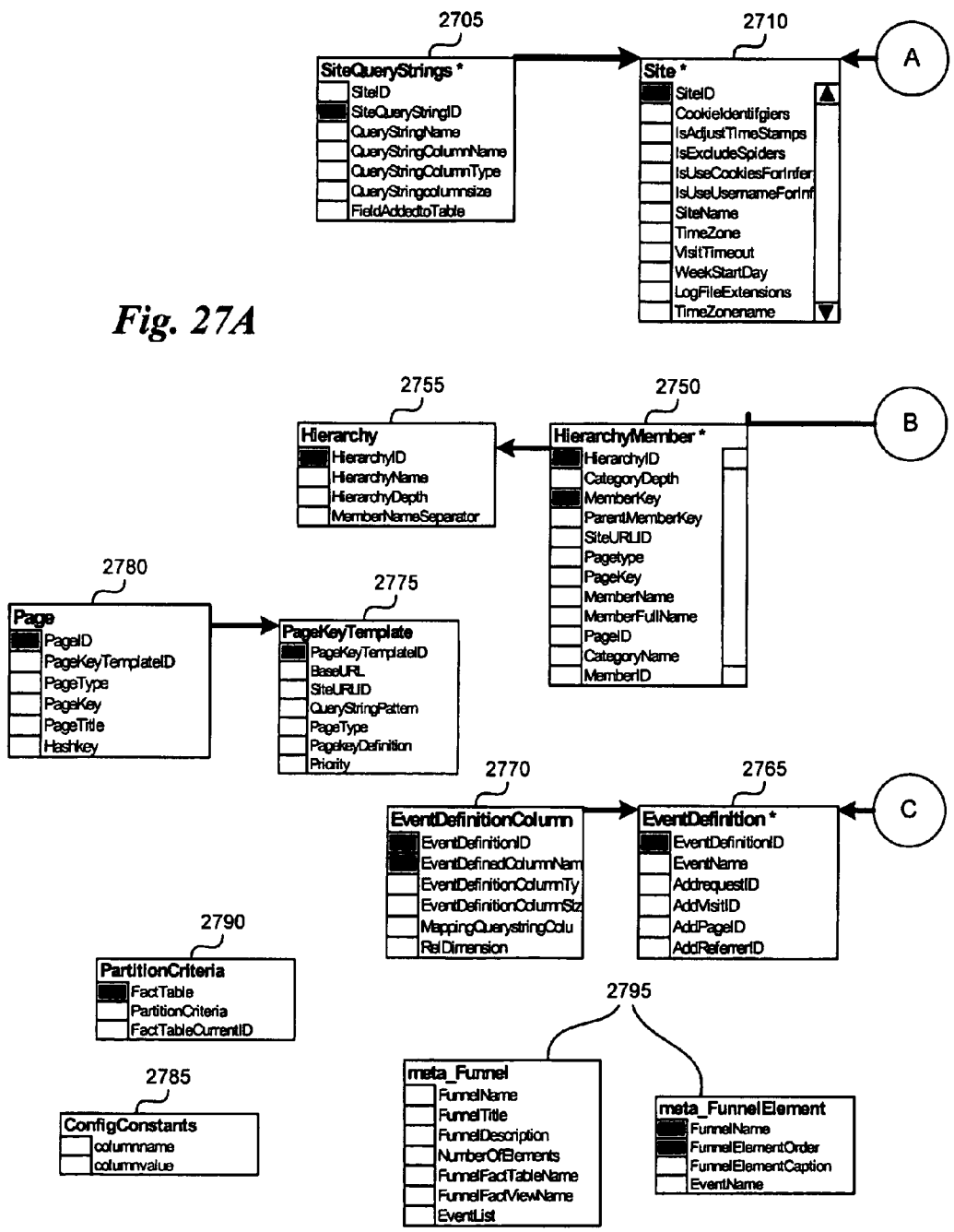
FIGS. 27A and 27B illustrate an example of data structures used to store parser configuration data.
Figure 27B:
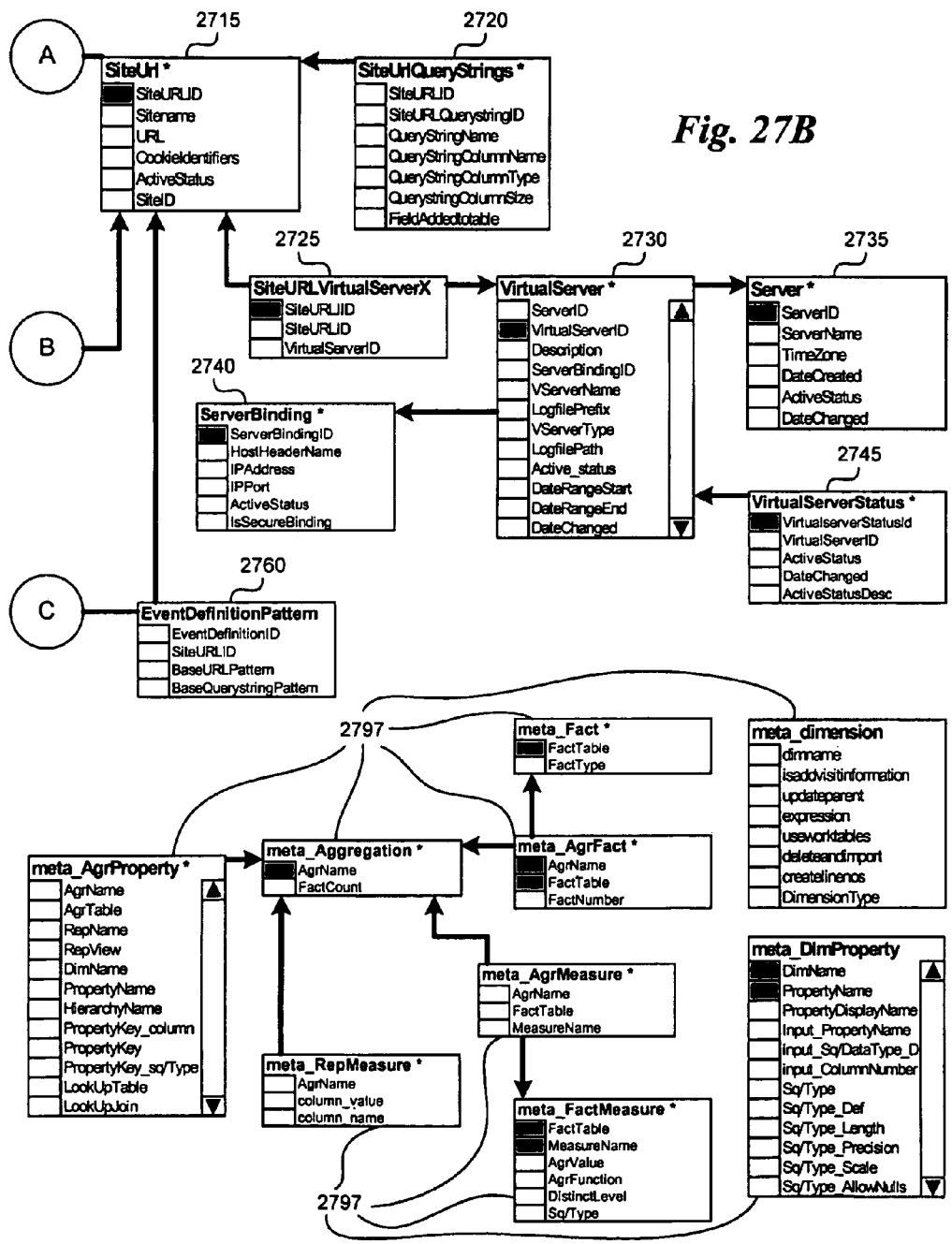

While the data parsing information in Tables 3–6 has been illustrated using XML format, those skilled in the art will appreciate that such data can be specified in a variety of other formats. Table 7 provides an example of specifying data parsing information for an example digiMine customer CompanyXYZ.com using SQL statements to add similar types of data parsing information to various database tables. FIGS. 27A–27B illustrate an example database scheme that could be used to hold such data parsing information. Those skilled in the art will appreciate that data specified in other formats, such as the XML data illustrated in Tables 3–6, could similarly be processed and stored in such database tables. As is shown by the event data parsing information in lines 51–137 of Table 7, CompanyXYZ is a merchant web site that allows purchase of items from the web site. As such, CompanyXYZ has interest in event types related to purchasing items, and lines 121–137 of the Table provide one example of defining a sequence of event types related to item purchase. While specific examples of database tables and their inter-relationships are illustrated in this example embodiment, those skilled in the art will appreciate that data parsing information could be stored in different database table data structure formats in other embodiments.

TABLE 7

```
--
-- parser configuration data for CompanyXYZ.com
--
delete from PageHierarchy
delete from Page
delete from partitioncriteria
delete from HierarchyMember
delete from EventDefinitionPatterns
delete from EventDefinitionColumns
delete from EventDefinition
delete from MemberTemplate
delete from Hierarchy
delete from PageKeyTemplate
delete from SiteQueryStrings
delete from ReferralQueryStrings
delete from SiteURL
delete from Server
delete from ServerBinding
delete from Site
delete from SiteURLVirtualServerXref
delete from VirtualServer
insert into Site(SiteID, CookieIdentifiers, SiteName) values (1, 'SITESERVER=,=;WEBTRENDS_ID=,',
    'CompanyXYZ')
insert into Server(ServerId, ServerName) values (1, 'Test1')
INSERT VirtualServer (ServerId, VirtualServerID, ServerBindingID, LogfilePrefix) VALUES (1, 1, 1, 'E002AA')
INSERT VirtualServer (ServerId, VirtualServerID, ServerBindingID, LogfilePrefix) VALUES (2, 2, 2, 'E002AB')
INSERT VirtualServer (ServerId, VirtualServerID, ServerBindingID, LogfilePrefix) VALUES (3, 3, 3, 'E002AC')
INSERT VirtualServer (ServerId, VirtualServerID, ServerBindingID, LogfilePrefix) VALUES (4, 4, 4, 'E002AD')
INSERT VirtualServer (ServerId, VirtualServerID, ServerBindingID, LogfilePrefix) VALUES (5, 5, 5, 'E002AE')
INSERT VirtualServer (ServerId, VirtualServerID, ServerBindingID, LogfilePrefix) VALUES (6, 6, 6, 'E002AF')
insert into ServerBinding(ServerBindingID, HostHeaderName, IPAddress, IPPort) values (1, 'Unknown', '0.0.0.0', '0')
insert into Hierarchy(HierarchyID, HierarchyName, HierarchyDepth, MemberNameSeparator)
    values(1, 'CompanyXYZ tabs', 3, '>')
insert into SiteURL(SiteURLId, Sitename, URL) values (1, 'CompanyXYZ.com', '/')
insert into SiteURLVirtualServerXref(SiteURLIID, SiteURLID, VirtualServerID) values (1, 1, 1)
insert into PartitionCriteria(FactTable,PartitionCriteria,FactTableCurrentID)
    Values('Visit','Daily',1)
insert into PartitionCriteria(FactTable,PartitionCriteria,FactTableCurrentID)
    Values('Request','Daily',1)
declare @siteurlid int
set @siteurlid = (select SiteURLID from SiteURL where Sitename='CompanyXYZ.com' and URL='/')
insert into EventDefinition(EventDefinitionID, EventName, AddrequestID, AddVisitID, AddPageID, AddReferrerID)
    values(1, 'Keyword Search', 1, 1, 1, 1)
insert into EventDefinitionPatterns(EventDefinitionID, SiteURLID, BaseURLPattern, BaseQuerystringPattern)
    values(1, @siteurlid, '{prefix}=/KeywordSearch.asp', '<keyword>*')
insert into PartitionCriteria(FactTable,PartitionCriteria,FactTableCurrentID)
    Values('Keyword Search','Monthly',1)
insert into EventDefinition(EventDefinitionID, EventName, AddrequestID, AddVisitID, AddPageID, AddReferrerID)
    values(2, 'Power Search', 1, 1, 1, 1)
insert into EventDefinitionPatterns(EventDefinitionID, SiteURLID, BaseURLPattern, BaseQuerystringPattern)
    values(2, @siteurlid, '{prefix}=/PowerSearchResults.asp', NULL)
insert into PartitionCriteria(FactTable,PartitionCriteria,FactTableCurrentID)
    Values('Power Search','Monthly',1)
insert into EventDefinition(EventDefinitionID, EventName, AddrequestID, AddVisitID, AddPageID, AddReferrerID)
    values(3, 'View Product', 1, 1, 1, 1)
insert into EventDefinitionPatterns(EventDefinitionID, SiteURLID, BaseURLPattern, BaseQuerystringPattern)
values(3, @siteurlid, '{prefix}=/product.asp', '<p>=+')
insert into PartitionCriteria(FactTable,PartitionCriteria,FactTableCurrentID)
    Values('View Product','Monthly',1)
insert into EventDefinition(EventDefinitionID, EventName, AddrequestID, AddVisitID, AddPageID, AddReferrerID)
    values(4, 'Add to Basket', 1, 1, 1, 1)
insert into EventDefinitionPatterns(EventDefinitionID, SiteURLID, BaseURLPattern, BaseQuerystringPattern)
    values(4, @siteurlid, '{prefix}=/checkout/basket.asp', NULL)
insert into PartitionCriteria(FactTable,PartitionCriteria,FactTableCurrentID)
    Values('Add to Basket','Monthly',1)
insert into EventDefinition(EventDefinitionID, EventName, AddrequestID, Add VisitID, AddPageID, AddReferrerID)
    values(5, 'Order Shipping and Billing', 1, 1, 1, 1)
insert into EventDefinitionPatterns(EventDefinitionID, SiteURLID, BaseURLPattern, BaseQuerystringPattern)
    values(5, @siteurlid, '{prefix}=/checkout/Purchase2ShippingBilling.asp', NULL)
insert into PartitionCriteria(FactTable,PartitionCriteria,FactTableCurrentID)
    Values('Order Shipping and Billing','Monthly',1)
insert into EventDefinition(EventDefinitionID, EventName, AddrequestID, AddVisitID, AddPageID, AddReferrerID)
    values(6, 'Order Review', 1, 1, 1, 1)
insert into EventDefinitionPatterns(EventDefinitionID, SiteURLID, BaseURLPattern, BaseQuerystringPattern)
    values(6, @siteurlid, '{prefix}=/checkout/Purchase3Review.asp', NULL)
```

TABLE 7-continued

```
insert into PartitionCriteria(FactTable,PartitionCriteria,FactTableCurrentID)
    Values('Order Review','Monthly',1)
insert into EventDefinition(EventDefinitionID, EventName, AddrequestID, AddVisitID, AddPageID, AddReferrerID)
    values(7, 'Order Confirmation', 1, 1, 1, 1)
insert into EventDefinitionPatterns(EventDefinitionID, SiteURLID, BaseURLPattern, BaseQuerystringPattern)
    values(7, @siteurlid, '{prefix}=/checkout/Purchase4Confirmation.asp', NULL)
insert into PartitionCriteria(FactTable,PartitionCriteria,FactTableCurrentID)
    Values( 'Order Confirmation',Monthly',1)
insert into EventDefinition(EventDefinitionID, EventName, AddrequestID, AddVisitID, AddPageID, AddReferrerID)
    values(8, 'Order Status Check', 1, 1, 1, 1)
insert into EventDefinitionPatterns(EventDefinitionID, SiteURLID, BaseURLPattern, BaseQuerystringPattern)
    values(8, @siteurlid, '{prefix}=/checkout/YourOrders.asp', NULL)
insert into PartitionCriteria(FactTable,PartitionCriteria,FactTableCurrentID)
    Values('Order Status Check','Monthly',1)
insert into EventDefinition(EventDefinitionID, EventName, AddrequestID, Add VisitID, AddPageID, AddReferrerID)
    values(9, 'Login or Registration', 1, 1, 1, 1)
insert into EventDefinitionPatterns(EventDefinitionID, SiteURLID, BaseURLPattern, BaseQuerystringPattern)
    values(9, @siteurlid, '{prefix}=/checkout/frmLogin.asp', NULL)
insert into PartitionCriteria(FactTable,PartitionCriteria,FactTableCurrentID)
    Values('Login or Registration','Monthly',1)
insert into EventDefinitionColumns(EventDefinitionID, EventDefinedColumnName, EventDefinitionColumnType,
    EventDefinitionColumnSize, MappingQueryStringColumns)
    values(1, 'keyword', 'varchar', 400, '<keyword>')
insert into EventDefinitionColumns(EventDefinitionID, EventDefinedColumnName, EventDefinitionColumnType,
    EventDefinitionColumnSize, MappingQueryStringColumns)
    values(3, 'productid', 'int', 4, '<p>')
exec meta_CreateFunnel
        @FunnelName = "funnel"
exec meta_FunnelElement_addEvent
        @FunnelName="funnel",
        @EventName = 'View Product'
exec meta_FunnelElement_addEvent
        @FunnelName="funnel",
        @EventName = 'Add to Basket'
exec meta_FunnelElement_addEvent
        @FunnelName="funnel",
        @EventName = 'Order Shipping and Billing'
exec meta_FunnelElement_addEvent
        @FunnelName="funnel",
        @EventName = 'Order Review'
exec meta_FunnelElement_addEvent
        @FunnelName="funnel",
        @EventName = 'Order Confirmation'
insert into PageKeyTemplate(PageKeyTemplateID, BaseURL, SiteURLID, QueryStringPattern, PageType,
    PagekeyDefinition,Priority)
    values(1, NULL, @siteurlid, '<s>=+&<a>=+&<d>=+', 'department', '-<s>-<a>-<d>#',1)
insert into PageKeyTemplate(PageKeyTemplateID, BaseURL, SiteURLID, QueryStringPattern, PageType,
    PagekeyDefinition,Priority)
    values(2, NULL, @siteurlid, '<s>=+&<a>=+', 'department', '-<s>-<a>#',2)
insert into PageKeyTemplate(PageKeyTemplateID, BaseURL, SiteURLID, QueryStringPattern, PageType,
    PagekeyDefinition,Priority)
    values(3, NULL, @siteurlid, '<s>=+', 'department', '-<s>#',3)
insert into PageKeyTemplate(PageKeyTemplateID, BaseURL, SiteURLID, QueryStringPattern, PageType,
    PagekeyDefinition,Priority)
    values(4, NULL, @siteurlid, NULL, 'department', '-0#',4)
insert into HierarchyMember(HierarchyID, categoryDepth, Memberkey, SiteURLID, MemberName, MemberFullName,
    CategoryName) values (1, 1, '-50', @siteurlid, 'Outdoor Shop', 'Outdoor Shop', 'store')
insert into MemberTemplate(MemberKey, PageKeyPattern) values ('-50', '{prefix}=-50#')
insert into HierarchyMember(HierarchyID, categoryDepth, Memberkey, SiteURLID, MemberName, MemberFullName,
    CategoryName) values (1, 1, '-79', @siteurlid, 'Team Sports', 'Team Sports', 'store')
insert into MemberTemplate(MemberKey, PageKeyPattern) values ('-79', '{prefix}'-79#')
            .
            .
            .
insert into HierarchyMember(HierarchyIID, categoryDepth, Memberkey, SiteURLID, MemberName, MemberFullName,
    CategoryName) values (1, 2, '-50-51', @siteurlid, Backpacking & Hiking', 'Outdoor Shop>Backpacking & Hiking',
    'activity')
insert into MemberTemplate(MemberKey, PageKeyPattern) values ('-50-51', '{prefix}=-50-51#')
            .
            .
            .
exec HierarchyMember_initilize
update HierarchyMember set CategoryName='department'
update HierarchyMember set PageKey=MemberKey+'#'
update HierarchyMember set PageType='department'
insert into SiteQueryStrings(SiteID, QueryStringName, QueryStringColumnName) values (1, 's', 's')
insert into SiteQueryStrings(SiteID, QueryStringName, QueryStringColumnName) values (1, 'p', 'p')
insert into SiteQueryStrings(SiteID, QueryStringName, QueryStringColumnName) values (1, 'd', 'd')
insert into SiteQueryStrings(SiteID, QueryStringName, QueryStringColumnName) values (1, 'c', 'c')
```

TABLE 7-continued

```
insert into SiteQueryStrings(SiteID, QueryStringName, QueryStringColumnName) values (1, 'a', 'a')
insert into SiteQueryStrings(SiteID, QueryStringName, QueryStringColumnName) values (1, 'Brand', 'Brand')
insert into SiteQueryStrings(SiteID, QueryStringName, QueryStringColumnName) values (1, 'doc', 'doc')
insert into SiteQueryStrings(SiteID, QueryStringName, QueryStringColumnName) values (1, 'catid', 'catid')
insert into SiteQueryStrings(SiteID, QueryStringName, QueryStringColumnName) values (1, 'productid', 'productid')
insert into SiteQueryStrings(SiteID, QueryStringName, QueryStringColumnName) values (1, 'daysold', 'daysold')
insert into ReferralQueryStrings(Querystringname, QuerystringColumnName)
    select QueryStringName, QueryStringColumnName from SiteQueryStrings
insert into configconstants values ('ExcludedClientIP', '192.168.1.9')
insert into configconstants values ('ExcludedClientIP', '192.168.1.8')
insert into configconstants values ('ExcludedClientIP', '127.0.0.1')
insert into ConfigConstants values('MaxLengthOutputField', '240')
insert into ConfigConstants values('UserKeyHashBuckets', '899')
insert into ConfigConstants values('UserAgentKeyHashBuckets', '99')
insert into ConfigConstants values('QueryStringsKeyHashBuckets', '99')
insert into ConfigConstants values('URIPairHashBuckets', '200')
insert into ConfigConstants values('QueryStringsKeyHashBuckets', '600')
Exec meta_ComboTableAddEntry 'CategoryCombos', 'SPDataOutputCategory, 'Level 2 Category Combos', 'A',
    'SPFriendlyCategory'
Exec meta_EntityTableAddCategoryDepth 'CategoryCombos', 1, 2
insert into meta_DimProperty (dimname,PropertyName ,PropertyDisplayName, input_PropetyName,
    input_SqlDataType_Def ,
input_ColumnNumber, SqlType, SqlType_Def, SqlType_Length, SqlType_Precision, SqlType_Scale,
    SqlType_AllowNulls ,SqlType_DefaultValue, TransformationString, IsAddedToSchema, IsLookup, IsDerived,
    IsStatic, IsDaily, IsWeekly, IsMonthly, IsMultiValued, IsAggregated ,IsHash, IsIdentifiable)
    Values('RegUser','UserKey','UserKey','UserKEy','Varchar(255) Null', 1,'Varchar' ,'Varchar(255) NULL',
    255,0,null,1,'0',null, 0,0,0,1,0,0,0,0,0,0,1)
go
Update Site
set TimeZonename ='GMT'
go
exec Tablecreationfrommetadata
go
exec meta_CreateAgrTables_reguser_Activity_by_Property
exec meta_CreateRepViews_reguser_Activity_by_Property
```

It is often the case that web sites and other content sets change in structure and content from time to time. For such changing web sites, data parsing information may have been defined for the original version of the web site and log entry information may have already been gathered for that web site. In fact, a single log file may contain entries that correspond to two or more different versions of the same web site. Unfortunately, it is often the case that the data parsing information that corresponds to one version of a web site must change in order to accurately reflect a new version of the web site. For example, the definitions for a previously existing event type or category type may change in the new version of a web site. Alternately, a previously existing event type or category type may no longer exist in the new version of the web site, and new event types of interest and category types may be present in the new web site version. Thus, it is important to be able to accurately identify the appropriate data parsing information to be used when parsing a log file and/or each log file entry.

Figure 20:
FIG. 20 illustrates an example updated version of a customer web page.

FIG. 20 provides an example of a revised web page for the digiMine web page previously illustrated in FIG. 19B. In particular, with respect to that web page, control 1918 has been removed in the revised web page and control 2005 has been added. This may reflect, for example, a change in the types of services offered by digiMine such that Data Enhancement services are no longer available but Data Generation (e.g., for testing purposes) services are now available.

In order to associate the appropriate data parsing information with log files or log file entries being processed, in some embodiments the data parsing information includes version information. Table 8 includes some of the data parsing information previously illustrated in Tables 3–6, but with the data parsing information modified to include version information. In particular, in the illustrated embodiment, many of the data parsing information entries include values for beginning and ending dates that define an effective date range for which the data parsing information is valid. For example, in lines 35–37 the category definition type corresponding to the digiMine data enhancement services web page illustrated in FIG. 19F has been modified so that its effective end date ends at the day before the web site is modified. In addition, lines 38–41 illustrate a new category type definition that corresponds to the new data generation services web page that has been added to the modified web site (and is accessible via control 2005 illustrated in FIG. 20). The beginning date of effectiveness for the new category type definition is the day on which the updated web page is put into use.

```
<Sites>
    <Site Id="1" CookieIdentifiers="SITESERVER=,="VisitTimeOut=" " TimeZoneName="GMT">
        <SiteUrl SiteUrlId="1" Name="https://insight.digimine.com" Url="/" BeginDate="02/15/00"
        EndDate=" ">
            <VirtualServer Id="1" IpAddress="209.67.55.102" TcpPort="0" BeginDate="05/01/00"
```

-continued

```
            EndDate="12/31/00"/>
        <VirtualServer Id="2" IpAddress="192.168.73.66" TcpPort="0" BeginDate="11/01/00"
            EndDate=" "/>
            .
            .
            .
</Sites>
<Events>
    <EventDefinition Id="20" Name="View Data Enhancement Service Info" BeginDate=" "
        EndDate="01/31/01">
        <EventDefinitionPatterns SiteUrlId="2" UrlPattern="{fn}=/services/enhancement.htm"
            QueryStringPattern=" " BeginDate=" " EndDate="01/31/01"/> </EventDefinition>
    <EventDefinition Id="1001" Name="View Data Generation Service Info" BeginDate="02/01/01"
        EndDate=" ">
        <EventDefinitionPatterns SiteUrlId="2" UrlPattern="{fn}=/services/generation.htm"
            QueryStringPattern=" " BeginDate="02/01/01" EndDate=" "/>
    </EventDefinition>
        .
        .
        .
</Events>
<Hierarchy Id="1" MemberNameSeparator=">">
    <HierarchyMember Id="1" MemberName="Services" PageKey="-1" BeginDate=" " EndDate=" ">
        .
        .
        .
        <HierarchyMember Id="5" MemberName="digiMine Enhancement Services" PageKey="-1-4">
            <PageKeyTemplate SiteUrlId="2" Priority="98"
                BaseUrl="{prefix}=/services/enhancement.htm" QueryStringPattern=" " BeginDate=" "
                EndDate="01/31/01"/> </HierarchyMember>
        <HierarchyMember Id="501" MemberName="digiMine Generation Services" PageKey="-1-9">
            <PageKeyTemplate SiteUrlId="2" Priority="98" BaseUrl="{prefix}=/services/generation.htm"
                QueryStringPattern=" " BeginDate="02/01/01" EndDate=" "/> </HierarchyMember>
            .
            .
            .
</Hierarchy>
<Config>
    <ConfigConstants Name="ExcludedClientIPRange" Value="209.67.55.54,209.67.55.62"
        BeginDate=" " EndDate=" "/>
        .
        .
        .
    <ConfigConstants Name='ExcludedURIPattern" Value="{FileExt}=.dll" BeginDate=" " EndDate=" "/>
        .
        .
        .
    <ConfigConstants Name="UserKeyHashBuckets" Value="499" BeginDate=" " EndDate="01/31/01"/>
    <ConfigConstants Name="UserKeyHashBuckets" Value="500" BeginDate="02/01/01" EndDate=" "/>
</Config>
```

Using the version information illustrated in Table 8, if a log file whose entries all have effective dates before "01/31/01" is being processed by the parser component, then the parser component can use the category type definition in lines 35–37 but will not attempt to use the category type definition found in lines 38–40 (or if used, the category type definition would not match the entry due to the date discrepancy). Alternately, if all of the entries of the log file contain effective dates that are on or after "02/01/01," then the use of these two category type definitions will be reversed. In other situations, a determination will be made for each log entry as to what data parsing information entries will be used to process that log entry.

Those skilled in the art will appreciate that version information can be specified in other manners, such as with more time detail (e.g., using minutes or seconds) or less time detail. Alternately, version information could be specified in other embodiments in manners other than with time information, such as by assigning unique version IDs to different groups of data parsing information. As long as information associated with a log file or log file entries can be used to identify the appropriate data parsing information version (e.g., if the appropriate version ID was added to the log file or to each log file entry, or was determinable in some other manner), then the parser component can identify the appropriate data parsing information entries to use. In other situations, data parsing information of different versions may be stored separately, such as by creating an entire new set of data parsing information for each new version of the web site that is created. If so, then the parser component need merely select the appropriate group of data parsing information to be used for a log entry file or a log entry. Even if data parsing information of different versions is stored together, as in illustrative Table 8, in some embodiments the parser component may separate the data parsing information entries into separate version groups before processing of the log entries (e.g., for efficiency purposes). In addition, new versions of data parsing information can be used for reasons other than changes to a web site or other content set, such as a change in event types or category types of interest to a customer.

Those skilled in the art will also appreciate that results of parsing can be stored in various manners. In some embodiments the results from the parsing by the parser component may be stored in a manner independent of the data parsing information version, while in other embodiments version information will be made available for later analysis of the results of the parser component processing. For example, if a customer requests a report showing information that includes a category type definition such as that defined in lines 35–37 of Table 8, and the customer specifies a date range for the report that begins before 01/31/01 and ends after that date, it would be useful to indicate that the reason the data for the event after the date 01/31/01 drops to zero (presumably) is due to the new version of the web site rather than to a lack of customer interest in the digiMine data enhancement services. Alternately, reports that include such a category type definition could be limited by the user interface of the report requesting functionality to the effective dates of the category HierarchyMember.

Figure 21:
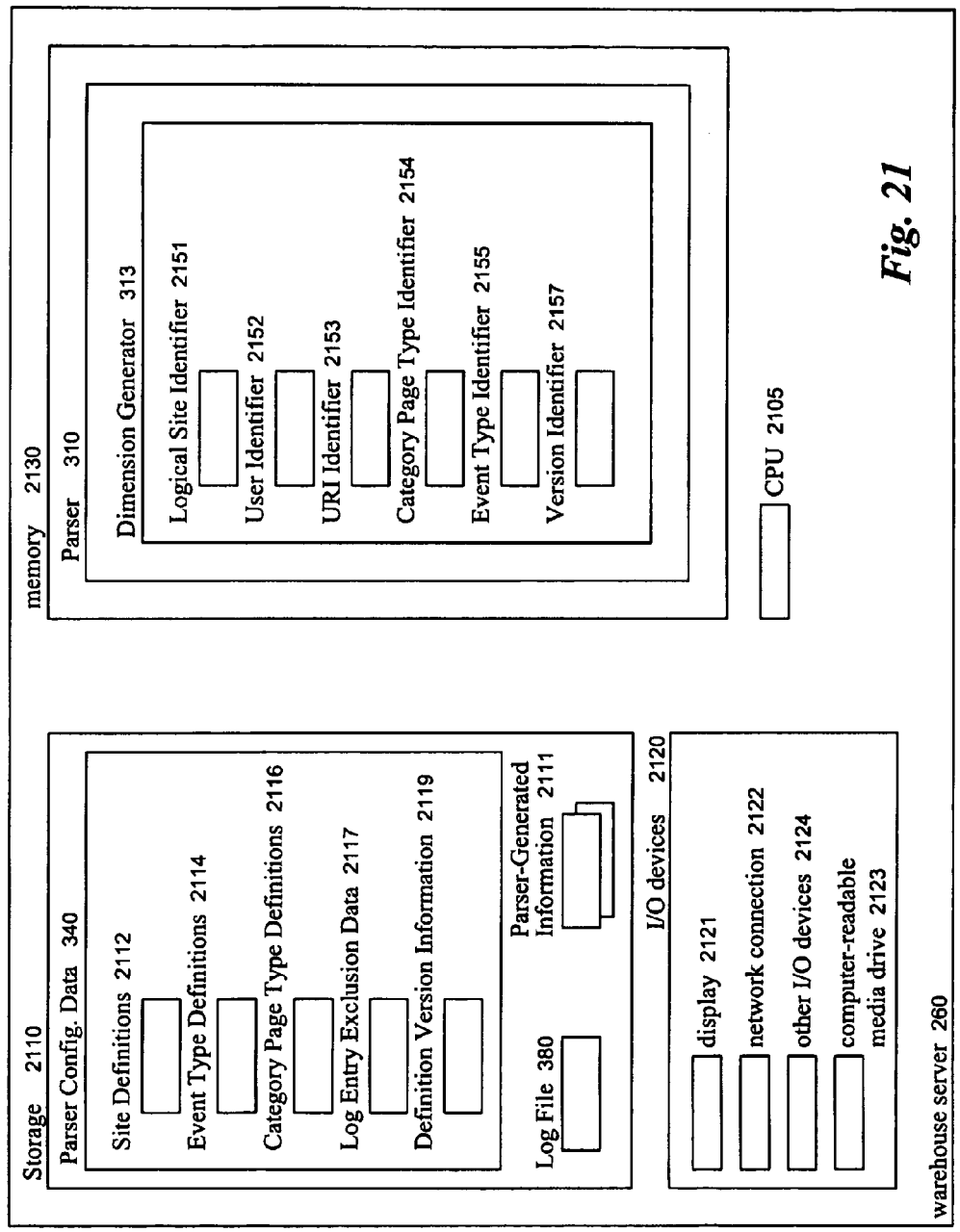
FIG. 21 is a block diagram illustrating details of the components of the data warehouse server in one embodiment.

FIG. 21 is a block diagram illustrating details of a warehouse server 260 suitable for executing an embodiment of the parser component 310. The server includes a CPU 2105, various I/O devices 2120, storage 2110, and memory 2130. The I/O devices include a display 2121, a network connection 2122, a computer-readable media drive 2123, and other I/O devices 2124.

An embodiment of the parser component 310 is executing in memory, and it includes a Dimension Generator component 313 as well as various other components that are not illustrated. The storage includes various information to be used by the Dimension Generator component of the parser, including various data parsing information 340 and a log file 350 to be processed. The data parsing information includes various site definitions 2112, event type definitions 2114, category page type definitions 2116, various log entry exclusion data 2117, and optional definition version information 2119. In the illustrated embodiment, the definition version information 2119 contains version information for the site definitions, event type definitions, and/or category page type definitions. As previously illustrated, in other embodiments, the version information may be specified and stored with the definition information to which it pertains rather than separately.

When the Dimension Generator component of the parser component executes, it obtains the various data parsing information from the storage, and uses it when processing the log file. Those skilled in the art will appreciate that in other embodiments some or all of the data parsing information and/or the log file may be stored on another computer system and accessed remotely. In particular, the Dimension Generator component includes a logical site identifier component 2151 that uses the stored site definition information to identify the defined site that corresponds to a log entry, a user identifier component 2152 that identifies a user corresponding to a log entry, and a URI identifier component 2153 that identifies the URI specified for each log entry. The Dimension Generator component also includes a category page type identifier component 2154 that uses the category page type definition information, as well as site and URI information, to determine one or more categories to which a log entry corresponds. Similarly, the Dimension Generator component includes an event type identifier component 2155 that uses the event type definitions, as well as site and URI information, to determine one or more events that correspond to a log entry. In the illustrated embodiment, the Dimension Generator component includes an optional version identifier component 2157 that can identify the version corresponding to a log file or a log entry, and can supply that information to other Dimension Generator components for use in identifying the appropriate definition information to be used. Those skilled in the art will appreciate that in other embodiments one or more of the other Dimension Generator components could instead include their own version identifier processing to be used to determine version information specific to that component. When the various Dimension Generator components identify information of relevance in a log entry, they can store the identified information in various parser-generated information files 2111 on the storage. Those skilled in the art will appreciate that these parser-generated information files could be stored remotely, or could be stored in another manner such as in a data base.

Those skilled in the art will also appreciate that the warehouse server 260 is merely illustrative and not intended to limit the scope of the present invention. Computer system 260 may be connected to other devices that are not illustrated, including through one or more networks such as the Internet or via the World Wide Web (WWW). In addition, the functionality provided by the illustrated Dimension Generator components may in some embodiments be combined in fewer components or distributed in additional components. Similarly, in some embodiments the functionality of some of the illustrated components may not be provided and/or other additional functionality may be available. For example, some embodiments may not include identification of users, or may not use version information. Alternately, in other embodiments some or all of the components may execute on another device and communicate with the warehouse server via inter-computer communication.

Those skilled in the art will also appreciate that, while various data parsing information and other information is illustrated as being stored before being used, these items or portions of them can be transferred between memory and other storage devices for purposes of memory management and data integrity. Some or all of the illustrated components, data and data structures may also be stored (e.g., as instructions or structured data) on a computer-readable medium, such as a hard disk, a memory, a network, or a portable article to be read by an appropriate drive. The components, data and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

In the illustrated embodiment, systems interact over the Internet by sending HTTP messages and exchanging Web pages. Those skilled in the art will appreciate that the described techniques can also be used in various environments other than the Internet. As such, a "client" or "server" may comprise any combination of hardware or software that can interact, including computers, network devices, internet appliances, PDAs, wireless phones, pagers, electronic organizers, television-based systems and various other consumer products that include inter-communication capabilities. Communication protocols other than HTTP can also be used, such as WAP, TCP/IP, or FTP.

Figure 22A:
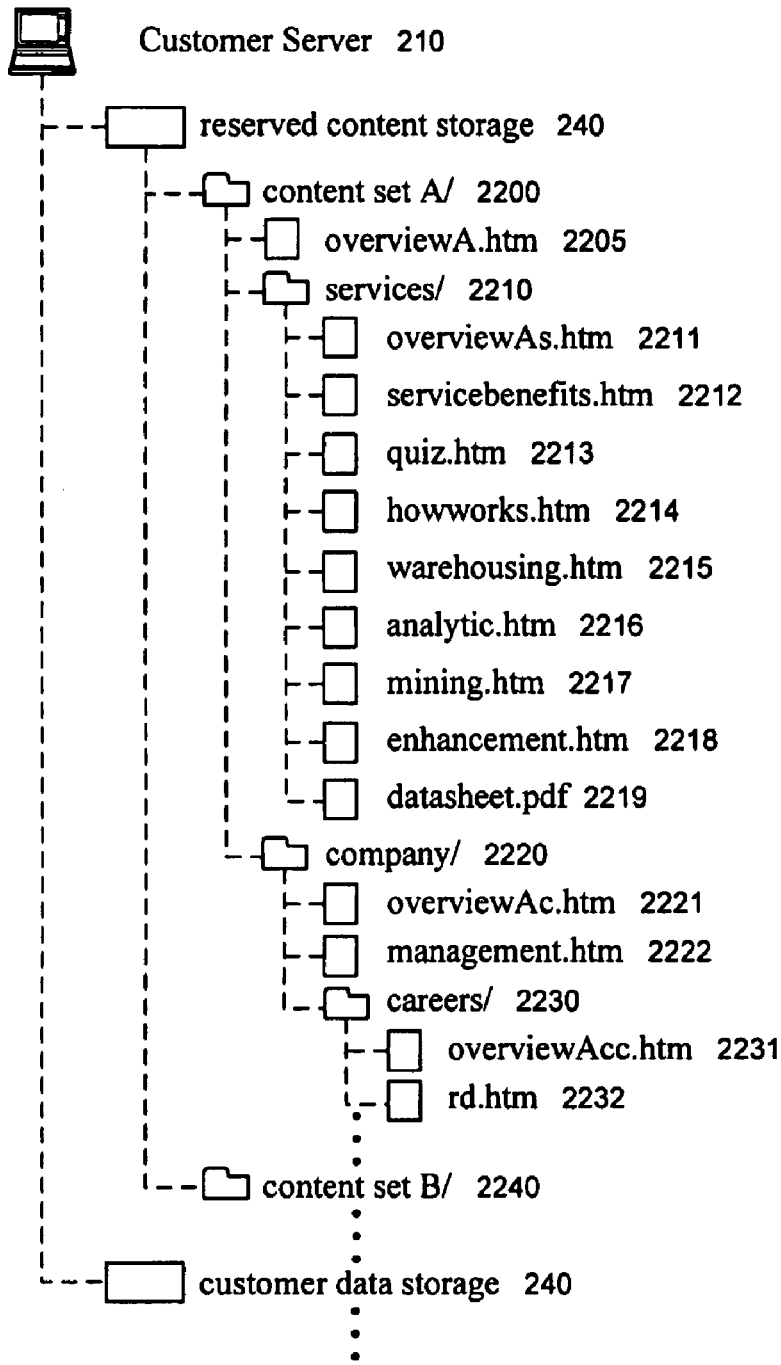

As previously discussed, the content of a web site or other content set can often be separated into various categories, and one manner of identifying such categories involves various manners in which the content is stored. FIGS. 22A and 22B illustrate various example embodiments in which category and hierarchy information can be associated with web site content. In particular, with respect to FIG. 22A, one example is provided of a way in which the digiMine web site content could be stored in a hierarchical manner that reflects the previously discussed categories. FIG. 22A provides a hierarchical illustration of how some of the web site information is stored, and illustrates a customer server 210 which includes a first storage 240 that includes the web site content to be served to users and a second storage 240 on which various other customer data is stored. The served content storage 240 includes various top-level directories that each correspond to different content sets, with a first content set A 2200 corresponding to the digiMine web site and a second content set B 2240 corresponding to a different web site hosted by the customer server computer.

The content set A digiMine web site includes an overviewA.htm file 2205 and various directories including a services directory 2210 and a company directory 2220. In the illustrated embodiment, the overviewA.htm file corresponds to the home web page illustrated in FIG. 19A. Similarly, the services directory will include the various information that is part of the Services section of the web site, and the company directory will similarly contain the information that is part of the Company section of the web site. In particular, the services directory includes various files 2211–2219 that correspond to the web pages illustrated in FIGS. 19B–19K. Similarly, the contents of the company directory includes various files and subdirectories whose files correspond to the web pages illustrated in FIGS. 19L–19Q. As previously noted, such a hierarchical data storage structure provides one means of selecting category and hierarchy information for the web site content.

FIG. 22B provides an alternate embodiment for storing web site content and determining category and hierarchy information for the content. In particular, in the embodiment illustrated in FIG. 22B, the various content is stored in a database table 2260 that holds all of the contents of the digiMine web site. Each entry in the database table data structure represents a separate web page, as shown in column 2261. In addition, each web page can be associated with a category ID in column 2262. These category IDs correspond to various categories defined in a category hierarchy table 2250 defined for the digiMine web site. Those skilled in the art will appreciate that in other embodiments multiple categories could be assigned to each piece of content in table 2260.

Each entry of the category hierarchy table represents a type of category of information for the digiMine web site, with a print-friendly identifier for the category shown in column 2251. Each category includes a unique ID listed in column 2252 that corresponds to the IDs listed in column 2262 of table 2260. In addition, in the illustrated embodiment, hierarchy information for the categories is provided via column 2253 of table 2250, in which each category can optionally have the ID of another category listed as its parent category. Thus, for example, the top-level Services category does not have a parent category listed, but the Careers sub-category indicates that the Company category is its parent. Those skilled in the art will appreciate that any number of hierarchical levels can be specified in this manner. Similarly, in other embodiments the category parent column 2253 with hierarchy information could be removed from the table 2250, thus providing category information without hierarchy information.

Those skilled in the art will appreciate that the web site content could be stored in other manners, and that category and/or hierarchy information could similarly be determined in other ways. For example, all of the web pages could be stored as individual files in a single directory, thus having no storage-based hierarchy information. Nonetheless, hierarchy information could be assigned to the web pages based on the contents of the web pages themselves, such as the inter-linking of the web pages. For example, since the overviewA.htm file contains links to overview files related to services and company information, the overviewA.htm file could be selected to be higher in the hierarchy than the overview files for the service and company sections of the web site.

Figure 23:
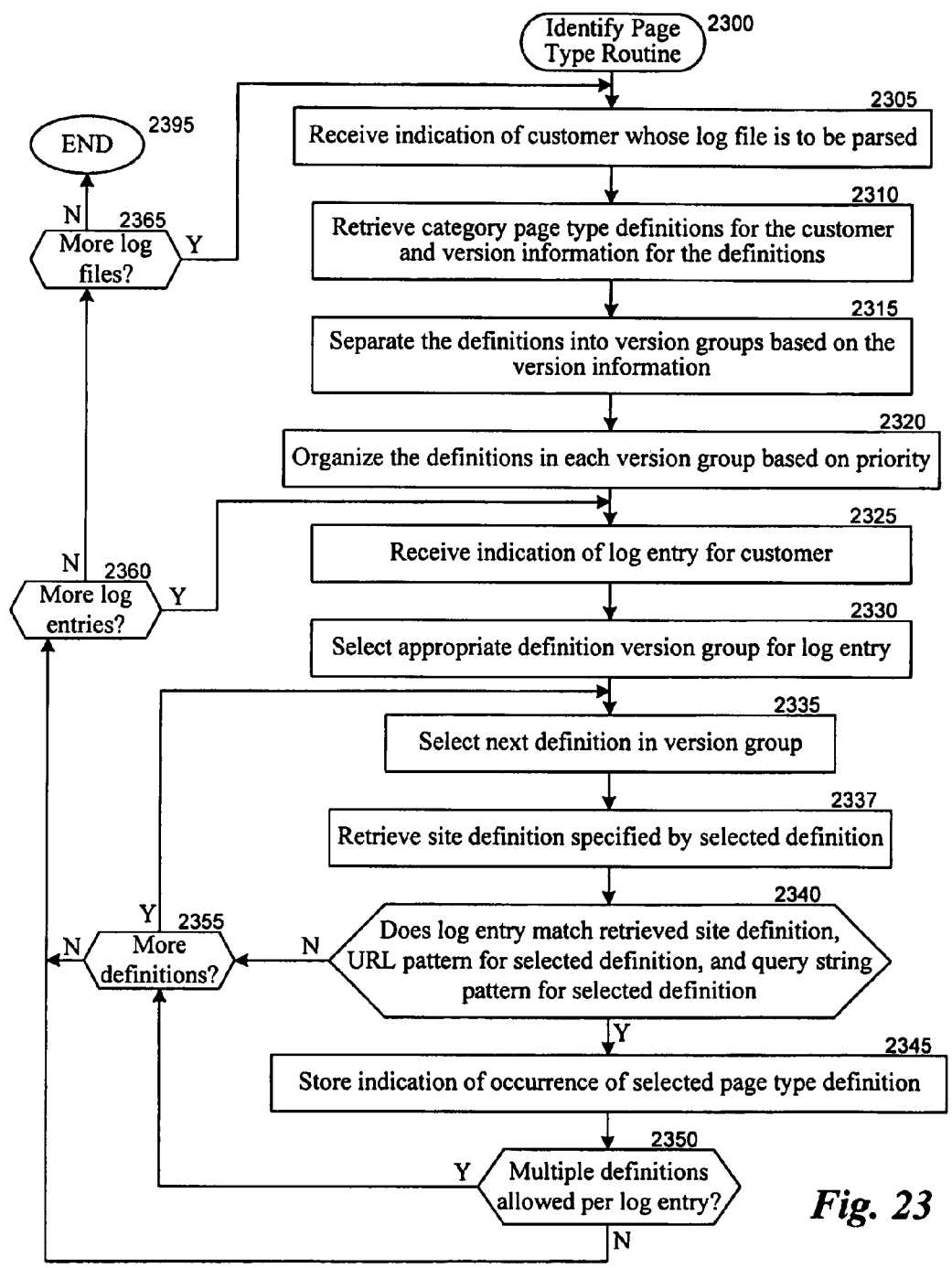
FIG. 23 is a flow diagram illustrating an embodiment of the Identify Page Type routine.

FIG. 23 is a flow diagram illustrating an embodiment of the Identify Page Type routine 2300. In the illustrated embodiment, the routine identifies a log file to be parsed, retrieves various category data parsing information related to the log file including version information if available, and then processes each log entry in the log file using the appropriate data parsing information. FIG. 11 previously illustrated an alternate technique for identifying page type information for a single log entry at a time.

The routine begins at step 2305 where an indication is received of a customer whose log file is to be parsed. The routine continues to step 2310 to retrieve category type definition information for the customer including version information if available. In the illustrated embodiment each category type definition has at most one page type definition, but those skilled in the art will appreciate that in other embodiments multiple page type definitions can be associated with each category type definition. The routine then continues to step 2315 to optionally separate the retrieved definitions into version groups based on the version information if it is available. In the illustrated embodiment, this separation is performed once (e.g., as an efficiency measure) such that for any date and time of a log entry in the log file, the routine can easily identify the appropriate category type definitions that are applicable to that date and time. Those skilled in the art will appreciate that in alternate embodiments the appropriate definitions could be identified dynamically for each log entry. Alternately, in some embodiments the retrieved category type definition information may already be separated into separate version groups. If it is possible to determine from the information received in step 2305 that a subset of the version groups will apply to all of the log entries in the log file, the routine could discard (or not initially retrieve) the definitions that are not in those version groups.

After step 2315, the routine continues to step 2320 to optionally organize the definitions in each version group if appropriate, such as based on priority if priority information is available for the different category type definitions (or their page type definitions). Alternately, other criteria could be used to order the definitions. This ordering can be important for various reasons, such as if processing for a log entry stops after the first matching category type definition is identified. The routine then continues to step 2325 to receive an indication of the next log entry from the customer's log file, beginning with the first. In some embodiments, the indication that is received in step 2305 is actually the first log entry from the log, and if so, step 2325 will be skipped during this first pass so that the first entry will be processed. The routine then continues to step 2330 to select the appropriate definition version group to process the log entry.

In step 2335, the next definition in the version group is selected, beginning with the first. The routine continues to step 2337 to retrieve the site definition specified by the selected version group definition. In step 2340 it is determined if the log entry matches the retrieved site definition (if any is specified), URL path pattern for the selected definition (if any is specified), and query string pattern for the selected definition (if any is specified). If so, the routine continues to step 2345 to store one or more indications of the occurrence of the selected category type in the appropriate manner, including storing any relevant information from the log entry. After step 2345, the routine continues to step 2350 to determine if multiple category page type definitions can be matched to each log entry. In some embodiments, this could be specifiable as part of the data parsing information.

If multiple definitions are allowed in step 2350, or if the selected definition does not match the log entry in step 2340, the routine continues to step 2355 to determine if there are more category type definitions in the selected version group. If so, the routine returns to step 2335 to select the next definition in the version group for processing. If multiple definitions are not allowed per log entry in step 2350, or if there are not more definitions in the selected version group in step 2355, the routine instead continues to step 2360 to determine if there are more log entries to be processed. If so, the routine returns to step 2325 to select the next log entry for processing, and if not the routine continues to step 2365 to determine if there are more log files to process. If there are more log files, the routine continues to step 2305, and if not then the routine continues to step 2395 and ends.

Figure 24:
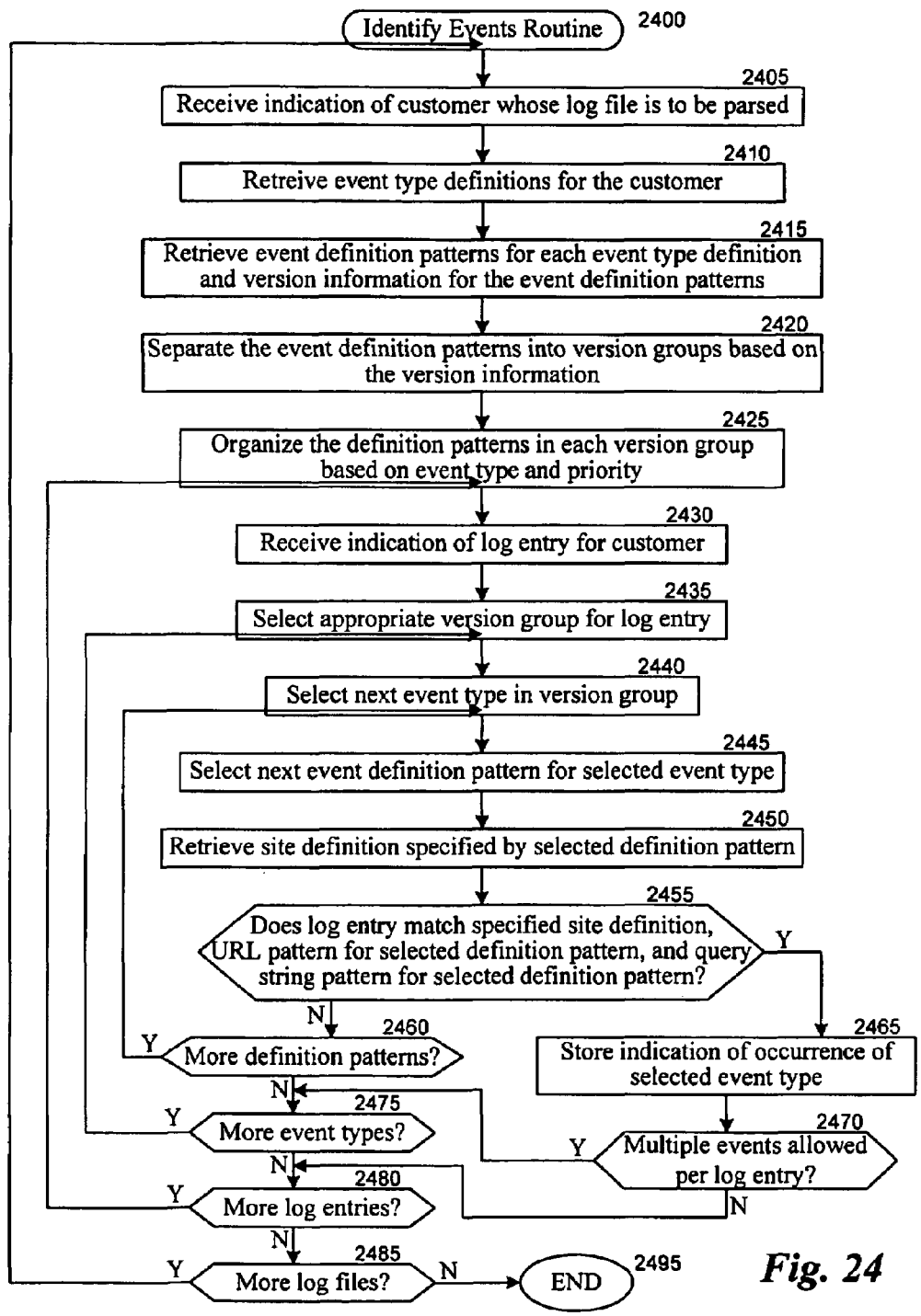
FIG. 24 is a flow diagram illustrating an embodiment of the Identify Events routine.

FIG. 24 is a flow diagram illustrating an embodiment of the Identify Events routine 2400. In the illustrated embodiment, the routine receives an indication of a customer whose log file is to be parsed, retrieves event type definitions related to the log file including version information if available, and uses the retrieved information to process the log file. FIG. 12 previously illustrated an alternate technique for identifying event type information for a single log entry at a time.

The routine begins at step 2405 where an indication is received of a customer whose log file is to be parsed. The routine continues to step 2410 to retrieve event type definition information for the customer, and in step 2415 retrieves information for each event pattern defined for the event type definitions including any version information if available. Those skilled in the art will appreciate that in other embodiments the event type definition information and event pattern information would be stored together. The routine next continues to step 2420 to optionally separate the retrieved definitions into version groups based on the version information if it is available. In the illustrated embodiment, this separation is performed once (e.g., as an efficiency measure) such that for any date and time of a log entry in the log file, the routine can easily identify the appropriate event type definitions that are applicable to that date and time. Those skilled in the art will appreciate that in alternate embodiments the appropriate definitions could be identified dynamically for each log entry. Alternately, in some embodiments the retrieved event type definition information may already be separated into separate version groups. If it is possible to determine from the information received in step 2405 that a subset of the version groups will apply to all of the log entries in the log file, the routine could discard (or not initially retrieve) the definitions that are not in those version groups.

After step 2420, the routine continues to step 2425 to optionally organize the definitions in each version group if appropriate, such as based on priority if priority information is available for the different event type definitions (or their event patterns). Alternately, other criteria could be used to order the definitions. This ordering can be important for various reasons, such as if processing for a log entry stops after the first matching event type definition is identified. The routine then continues to step 2430 to receive an indication of the next log entry from the customer's log file, beginning with the first. In some embodiments, the indication that is received in step 2405 is actually the first log entry from the log, and if so, step 2430 will be skipped during this first pass so that the first entry will be processed. The routine then continues to step 2435 to select the appropriate definition version group to process the log entry.

In step 2440, the next event type definition in the version group is selected, beginning with the first. The routine then selects in step 2445 the next event pattern for the selected event type definition, beginning with the first. The routine continues to step 2450 to retrieve the site definition specified by the selected event pattern. In step 2455 it is determined if the log entry matches the retrieved site definition (if any is specified), URL path pattern for the selected definition (if any is specified), and query string pattern for the selected definition (if any is specified). If the log entry does not match, the routine continues to step 2460 to determine if there are more event patterns for the selected event type, and if so returns to step 2445 to select the next event pattern.

If the log entry does match, however, the routine continues to step 2465 to store one or more indications of the occurrence of the selected event type in the appropriate manner, including storing any relevant information from the log entry. After step 2465, the routine continues to step 2470 to determine if multiple event page type definitions can be matched to each log entry. In some embodiments, this could be specifiable as part of the data parsing information. In the illustrated embodiment, however, while a log entry may match multiple event types, each log entry is only allowed to match one event pattern per event type. Those skilled in the art will appreciate that in other embodiments multiple event patterns could be matched per event type.

If multiple definitions are allowed in step 2470, or if the selected event pattern does not match the log entry in step 2460, the routine continues to step 2475 to determine if there are more event type definitions in the selected version group. If so, the routine returns to step 2440 to select the next event type definition in the version group for processing. If multiple definitions are not allowed to match each log entry in step 2470, or if there are not more definitions in the selected version group in step 2475, the routine instead continues to step 2480 to determine if there are more log entries to be processed. If so, the routine returns to step 2430 to select the next log entry for processing, and if not the routine continues to step 2485 to determine if there are more log files to process. If there are more log files, the routine continues to step 2405, and if not then the routine continues to step 2495 and ends.

Figure 25:
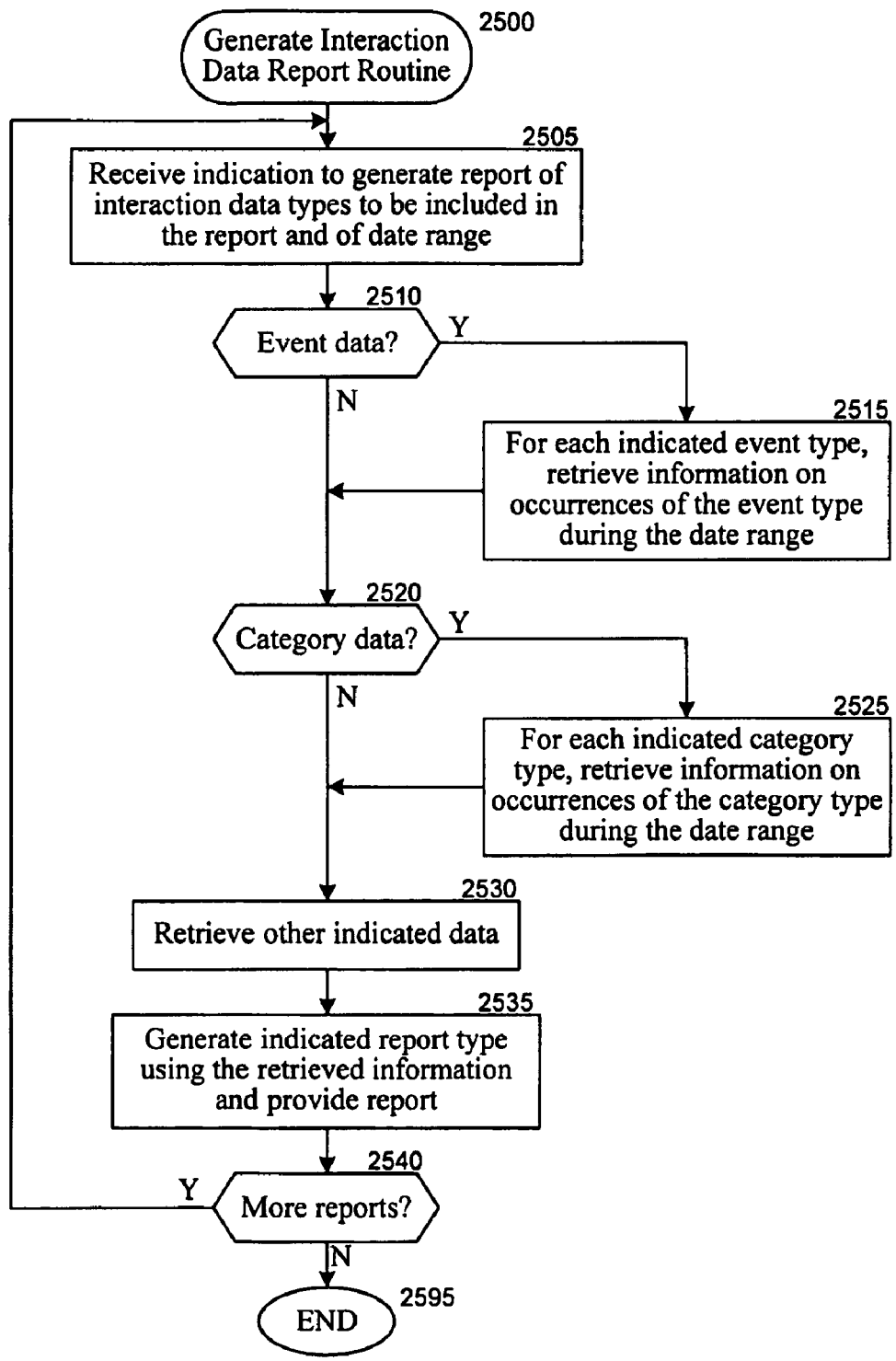
FIG. 25 is a flow diagram illustrating an embodiment of the Generate Interaction Data Report routine.

FIG. 25 is a flow diagram illustrating an embodiment of the Generate Interaction Data Report routine 2500. The routine receives an indication to generate a report or otherwise provide information about previously processed interaction data and provides the appropriate report or information. Those skilled in the art will appreciate that in alternate embodiments, rather than retrieving stored information from prior processing, the interaction data could be dynamically processed after the information request is received.

The routine begins at step 2505 where an indication is received to generate a report that includes information about specified types of interaction data over a specified date range. The routine continues to step 2510 to determine if event type data is requested to be included in the report, and if so continues to step 2515 to retrieve stored information on occurrences of those event types that occurred during the specified date range. After step 2515 or if no event type data was specified, the routine continues to step 2520 to determine if category type data was specified to be included in the report. If so, the routine continues to step 2525 to retrieve stored information on occurrences of the category types that occurred during the date range. After step 2525, or if no category type data was requested, the routine continues to step 2530 to retrieve any other types of indicated data for the requested report (e.g., administrative information or information stored about the use of exclusion definitions). The routine then continues to step 2535 to generate the requested report using the retrieved information, and provides the report to the requester (e.g., by sending a web page containing the report to the requester). The routine then continues to step 2540 to determine if more reports are to be generated. If so, the routine returns to step 2505, and if not, the routine continues to step 2595 and ends.

In some embodiments, the routine is provided by a web server for a company acting as an Application Service Provider for one or more customers, in which the services provided include processing of interaction data for the customer and/or providing reports using process interaction data. In particular, remote customers (e.g., over the Internet) can access the web server in some embodiments and obtain reports related to their own interaction data that have previously been provided to the ASP company for processing. While not illustrated in this embodiment, in other embodiments security measures can be employed to ensure that a requester is authorized to receive the requested data and that the requested data is not inadvertently made available to others.

Figure 26:
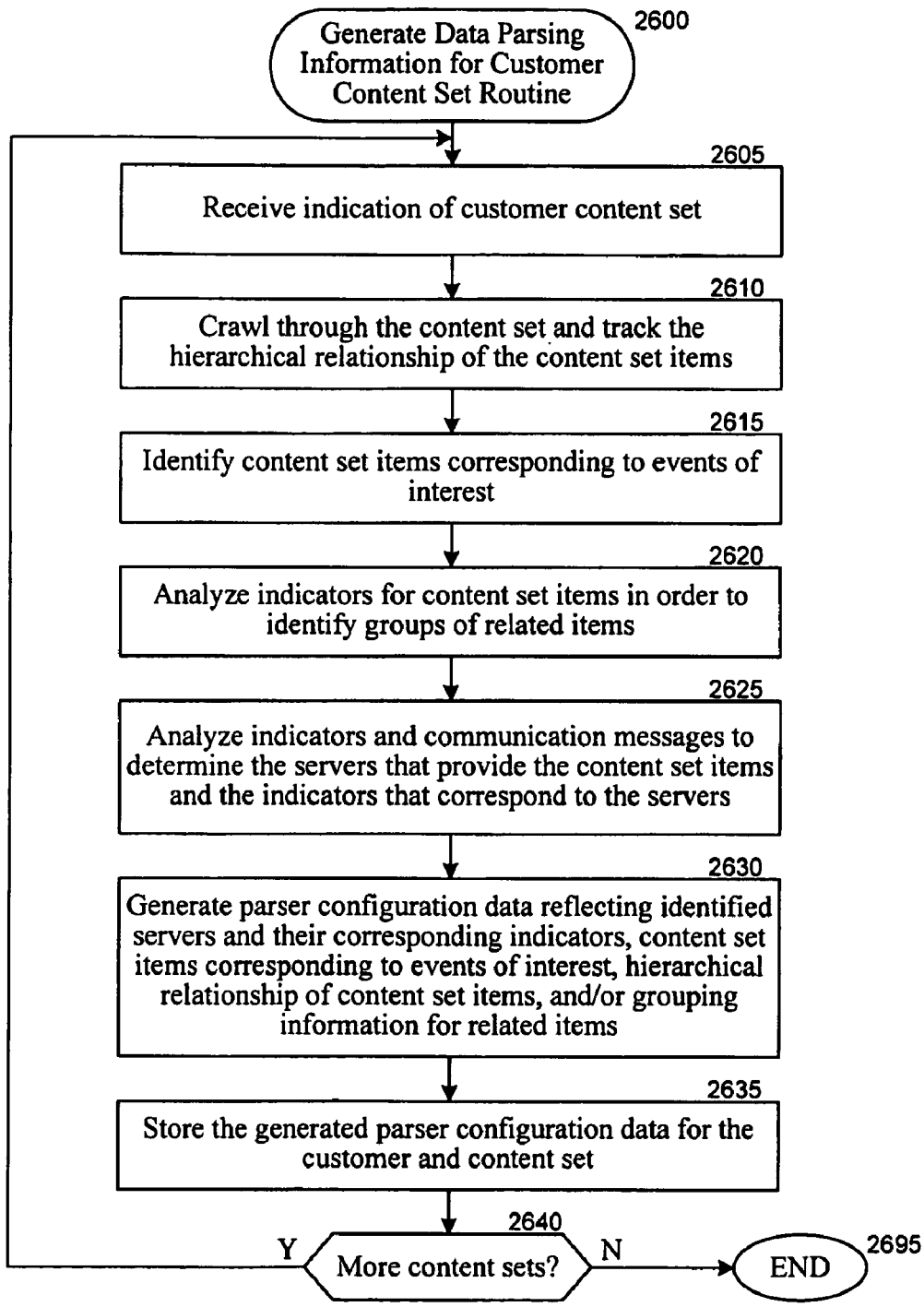
FIG. 26 is a flow diagram illustrating an embodiment of the Generate Data Parsing Information For Customer Content Set routine.

FIG. 26 is a flow diagram illustrating an embodiment of the Generate Data Parsing Information For Customer Content Set routine 2600. The routine receives a content set for which interaction data will be processed (e.g., a web site whose navigation data is to be processed) or other information related to the content set, and analyzes the content set in order to generate data parsing information related to the content set. The routine begins at step 2605 where an indication of the customer content set is received. The routine continues to step 2610 where the content set is processed in such a manner as to track the relationships between different members of the content set. For example, if the content set is a web site, processing begins at the home web page for the web site, and the various links on the web pages of the web site are variously followed (or "crawled") to identify all of the available web pages and the relationships indicating what web pages have links to what other web pages.

The routine then continues to step 2615 to identify content set items that correspond to event types of interest if possible. It may be possible to classify the content set as being a member of one or more types of known content sets that have event types known to be of interest. For example, if the content set is a merchant web site that includes shopping cart web pages or other mechanisms for ordering and purchasing items, events can be defined for any such ordering-related web pages of the content set. Alternately, event types can be defined in other ways, such as defining an event type for every content set item (and optionally allowing a user to interactively remove event types that are not of interest), having meta-event type definitions that can be matched against the content set items in an attempt to determine if a content set item corresponds to a particular event type, defining events for sequences of content set items that are related in a specified manner (e.g., in a funnel-type relationship such that a first item must be accessed before a second item can be accessed), etc.

In step 2620, the unique indicators for the content set item (e.g., URLs for web pages) are analyzed in order to identify groups of items that appear to be related (e.g., by sharing a common hierarchical data structure or by sharing similar query string names and values). The routine then continues to step 2625 to determine the server information for the one or more servers that provide the content set items, such as the domain names and IP addresses for web servers providing web site web pages. In step 2630, the routine then generates data parsing information reflecting identified servers and their corresponding indicators, content set items corresponding to events of interest, hierarchical relationships of content set items, and/or grouping information for related items. The routine next continues to step 2635 to store the generated data parsing information in a manner that is associated with the customer and the content set. In step 2640, it is determined whether there are more content sets for which to generate data parsing information, and if so the routine returns to step 2605. If not, the routine continues to 2695 and ends.

While in the illustrated embodiment the routine generates data parsing information in a fully automated manner, those skilled in the art will appreciate that in other embodiments the routine could be executed in a semi-automated manner as part of a user interface by which a user is generating data parsing information for a content set. For example, the routine could perform automated processing to generate suggestions or possibilities for different types of data parsing information, and then allow the user to select or edit the generated data parsing information. Alternately, the user could perform initial preprocessing to assist the routine in generating the data parsing information, such as identifying one or more types of information about the content set (e.g., a merchant web site to assist in identifying merchant-related events of interest, or that the content set items are stored in a hierarchical manner that should be used to generate category information). In addition, the routine could generate the data parsing information in various formats, such as XML, SQL statements, etc. Moreover, the routine could generate the data parsing information to be stored and used by the parser component in a machine-readable form, but could present the same information to the user in a more human-friendly format. In some situations, such a UI could be used by a customer to themselves define and/or maintain the data parsing information for their own web site, while in other embodiments the UI is used by a trained operator of a company acting as an ASP for customers.

In addition, in some embodiments the routine can automatically generate version data for the generated data parsing information, such as by initially specifying that all of the generated data parsing information has an effective date range beginning as of the date of generation (or some other user-specified date) and having no specified end date. If the routine is later used to modify already existing data parsing information (whether user-generated or previously generated by the routine), such as in response to changes in the content set, the user could use the modification date as the beginning date for any newly generated data parsing information and use the date as the ending effective date for any data parsing information that no longer applies to the revised content set.

Those skilled in the art will also appreciate that in some embodiments the functionality provided by the routines discussed above may be provided in alternate ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the above description it will be appreciated that although specific embodiments of the technology have been described for purposes of illustration, various modifications may be made without deviating from the spirit and scope of the invention. For example, the processing of the parser may be performed by the data collection component before sending the data to the data warehouse server. Accordingly, the invention is not limited except by the appended claims. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied. Accordingly, the inventors reserve the right to add additional claims after filing the application to pursue such additional claim forms for other aspects of the invention.

What is claimed is:

1. A computer-implemented method for using predefined parsing information to analyze web site navigation data in order to identify occurrences of defined types of events, the method comprising:
   for each of multiple distinct web sites each having multiple web pages,
      receiving web site navigation data associated with the web site that has multiple entries each containing information related to an occurrence of a request for a web page of the web site and of a response from a web site server for the web site;
      retrieving predefined parsing information associated with the web site that includes multiple distinct definitions of logical sites and multiple distinct definitions of event types, each of the logical site definitions specifying an IP address and port number used by a web site server to provide at least some of the web pages of the web site, each of the event type definitions specifying a type of request for a web page of the web site and specifying one of the logical sites;
      for each entry of the received web site navigation data,
         analyzing the information contained in the entry to determine if the web site server that performed the related response matches any of the defined logical sites by having used the IP address and the port number specified by that logical site; and
         if a logical site is determined to match the web site server, further analyzing the information contained in the entry by, for each of the event types whose definition specifies the matching logical site, when the information contained in the entry indicates that the related request is of the type specified by the event type, storing an indication of an occurrence for the web site of a request of the type specified by that event type such that the stored indication includes information from the entry;
      receiving a request from an operator of the web site to provide information for the web site about occurrences of specified event types;
      retrieving in response the stored indications of occurrences related to the specified event types for the web site; and
      providing the retrieved information to the operator, so that the operators of the multiple web sites can receive information about occurrences of interest for their web sites.

2. The method of claim 1 wherein the information contained in each of the web site navigation data entries includes a URL path from the related request and at least some of the entries include a query string from that request, wherein the specification of a type of request for each of the event type definitions includes a URL pattern capable of matching URL paths of multiple web pages that are related to that type of request and includes a query string pattern capable of matching at least one query string related to that type of request, and wherein a related request for an entry is determined to be of the type specified by an event type when the URL path for that request and any query string for that request match the URL pattern and the query string pattern included in the definition of the event type.

3. The method of claim 2 wherein the query string patterns each include at least one query string parameter name, and wherein the information from an entry that is included with the stored indication of an occurrence of an event type includes a value from the related request query string for each query string parameter name in the query string pattern for the event type.

4. The method of claim 2 wherein at least some of the event type definitions include multiple event definition patterns that each include a URL pattern and a query string pattern, and wherein a related request is determined to be of the type specified by an event type when the URL path for that request and any query string for that request match the URL pattern and the query string pattern of any of the event definition patterns of the event type.

5. The method of claim 1 wherein the receiving of the web site navigation data associated with a web site includes retrieving at least one log file from at least one web site server for the web site, the retrieved log files containing the web site navigation data.

6. The method of claim 1 wherein the predefined parsing information associated with one of the web sites further includes at least one exclusion definition specifying a type of request or response, and wherein the analyzing of the information contained in an entry of the web site navigation data associated with that web site is not performed if the related request or response for the entry is of a type that matches one of the exclusion definitions.

7. The method of claim 1 including, before the receiving of the web site navigation data for a web site, generating the parsing information associated with the web site based at least in part on the web site servers that can provide web pages of the web site and on types of requests for web pages that those web site servers can receive.

8. The method of claim 1 wherein the received request from an operator of one of the web sites further specifies effective dates such that the information to be provided is for occurrences of the specified event types that took place during the effective dates, and wherein the stored indications that are retrieved in response are for those occurrences.

9. The method of claim 1 wherein the operator of one of the web sites from whom a request is received is at a remote location, and wherein the providing of the retrieved information to the operator includes generating a report that includes the retrieved information and sending the generated report to the remote location for presentation to the operator.

10. The method of claim 1 wherein the operators of the multiple web sites are customers, and wherein the analyzing of the web site navigation data entries for the web sites is performed as a service for the customers.

11. A computer-implemented method for analyzing interaction data to identify occurrences of defined types of events, the method comprising:
receiving an indication of interaction data that is associated with a content set and that has at least one entry, each entry related to an interaction with the content set;
receiving an indication of at least one communication definition that specifies a manner of communicating content set interactions;
receiving an indication of multiple event type definitions each specifying a type of interaction with the content set and each associated with one of the communication definitions; and
for each entry of the interaction data,
determining whether the entry matches one of the event type definitions in such a manner that the related interaction for the entry is of the type specified by that event type definition and was communicated in the manner specified by the communication definition associated with that event type definition; and
when it is determined that the entry matches one of the event type definitions, storing an indication of an occurrence of that event type, wherein each of the interactions related to the interaction data entries includes specifying a URL having a path portion and a query string portion, each of the query string portions including one or more combinations each having a query parameter name and corresponding query value, and wherein the type of interaction specified by each of the event type definitions includes a URL path pattern capable of matching one or more URL paths and includes a query string pattern capable of matching at least one query string.

12. The method of claim 11 wherein the content set is a web site with multiple web pages.

13. The method of claim 11 wherein the content set is a group of multiple related web pages that are a subset of web pages of a web site.

14. The method of claim 11 wherein the content set is multiple related web sites each having multiple web pages.

15. The method of claim 11 wherein the content set is a group of related items.

16. The method of claim 11 wherein the content set is a service providing multiple features.

17. The method of claim 11 wherein the content set is an executing program providing various functionalities.

18. The method of claim 11 wherein each of the interactions related to the interaction data entries includes specifying a Uniform Resource Indicator.

19. The method of claim 11 wherein each of the interactions related to the interaction data entries includes requesting that functionality be provided.

20. The method of claim 11 wherein each of the interactions related to the interaction data entries includes supplying information.

21. The method of claim 11 wherein the manner of communicating content set interactions specified by each of the communication definitions includes using a specified IP address and port number to communicate information related to an interaction.

22. The method of claim 11 wherein the manner of communicating content set interactions specified by each of the communication definitions includes using a specified domain name to communicate information related to an interaction.

23. The method of claim 11 wherein the manner of communicating content set interactions specified by each of the communication definitions includes using a specified group of communication parameters to communicate information related to an interaction.

24. The method of claim 11 wherein the manner of communicating content set interactions specified by each of the communication definitions includes identifying a specified portion of the content set to which an interaction is to be communicated.

25. The method of claim 11 wherein the manner of communicating content set interactions specified by each of the communication definitions includes identifying a specified computing device or computer program provider to which an interaction is to be communicated.

26. The method of claim 11 wherein each of the interactions related to the interaction data entries includes specifying a Uniform Resource Indicator, and wherein the type of interaction specified by each of the event type definitions includes a pattern capable of matching at least one Uniform Resource Indicator.

27. The method of claim 11 wherein the query string patterns each indicate one or more query parameter names whose presence in a query string is required, allowed, or disallowed if that query string is to match the query string pattern, and wherein the determination of whether a query string portion matches a query string pattern includes determining if the query string portion includes each of the query parameter names whose presence is indicated in the query string pattern to be required and does not include any of the query parameter names whose presence is indicated in the query string pattern to be disallowed.

28. The method of claim 11 wherein the query string patterns each include at least one query string parameter name, and wherein the stored indication of an occurrence of an event type when an entry matches the definition for that event type includes, for each query string parameter name in the query string pattern for that event type definition, a value from the query string portion of the specified URL for that entry that corresponds to that query string parameter name.

29. The method of claim 28 wherein at least one of the query string patterns includes multiple instances of a query string parameter name, and including, when an entry matches the definition for the event type that includes that one query string pattern in such a manner that the query string portion of the specified URL for that entry includes multiple combinations that each have a query string value corresponding to one of the instances of the query string parameter name, before the storing of those query string values, determining a unique name for each of the multiple instances of the query string parameter name so that those corresponding query string values for each of the multiple instances of the query string parameter name can be stored distinctly from the corresponding query string values for the other instances of the query string parameter name.

30. The method of claim 11 wherein at least some of the event type definitions include multiple event definition patterns that each include a URL path pattern and a query string pattern, and wherein the related interaction for an entry is determined to be of the type specified by an event type definition when the path portion and the query string portion of the URL for that entry match the URL path pattern and the query string pattern of any of the event definition patterns of that event type.

31. The method of claim 11 wherein at least some of the URL path patterns include a static portion capable of matching a single corresponding portion of a URL path and include a variable portion capable of matching multiple corresponding portions of URL paths.

32. The method of claim 11 wherein each of the URL path patterns can be specified to match any URL path and wherein each of the query string patterns can be specified to match any query string.

33. The method of claim 11 wherein each of the communication definitions can be specified to match any manner of communicating content set interactions.

34. The method of claim 11 wherein each of the event type definitions can be specified to match any type of interaction with the content set.

35. The method of claim 11 wherein at least some of the entries are determined to match multiple of the event type definitions.

36. The method of claim 11 wherein each of the entries contain information related to the interaction for the entry, and wherein the determining that an entry matches an event type definition includes analyzing the information contained in the entry.

37. The method of claim 11 including receiving an indication of at least one exclusion definition that specifies a type of interaction, and wherein the determining of whether an entry matches one of the event type definitions is not performed if the related interaction for the entry is of a type that matches one of the exclusion definitions.

38. The method of claim 11 including receiving a request to provide information about occurrences of specified event types, and providing in response the stored indications of occurrences related to the specified event types.

39. The method of claim 11 wherein the determining of whether the interaction data entries match event type definitions is performed as a service for a customer.

40. A computer-implemented method for analyzing interaction data for a web site to identify occurrences of defined types of events, the method comprising:
  receiving an indication of multiple interaction data entries each containing information about an interaction with a web site that includes a specified URL, each of the specified URLs optionally including a URL path portion and optionally including a query string portion, the contained information for each entry including any URL path portion that is included in the specified URL for the entry and including any query string portion that is included in the specified URL for the entry;
  receiving an indication of multiple event type definitions that each specify a type of interaction, each event type definition having a URL path pattern capable of matching at least one URL path related to the interaction type and having a query string pattern capable of matching at least one query string related to the interaction type; and
  for each entry,
    analyzing the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition; and
  when it is determined that the entry matches one of the event type definitions, storing an indication of an occurrence of that event type for the web site,
  wherein the contained information about each interaction further includes information related to a manner of identifying a web site server with which the interaction occurred, wherein each of the event type definitions is associated with a logical site definition that specifies a manner of identifying a web site server related to the web site, and wherein the determining that an entry matches an event type definition further includes determining that the information included in the entry that is related to the manner of identifying the web site server matches the manner of identifying a web site server specified by the logical site definition associated with that event type definition.

41. The method of claim 40 wherein the manner of identifying a web site server related to the web site that is specified by each logical site definition includes using a specified IP address and port number to communicate with the web site server.

42. The method of claim 40 wherein the manner of identifying a web site server related to the web site that is specified by each logical site definition includes using a specified group of communication parameters to communicate with the web site server.

43. A computer-implemented method for analyzing interaction data for a web site to identify occurrences of defined types of events, the method comprising:
  receiving an indication of multiple interaction data entries each containing information about an interaction with a web site that includes a specified URL, each of the specified URLs optionally including a URL path portion and optionally including a query string portion, the contained information for each entry including any URL path portion that is included in the specified URL for the entry and including any query string portion that is included in the specified URL for the entry;
  receiving an indication of multiple event type definitions that each specify a type of interaction, each event type definition having a URL path pattern capable of matching at least one URL path related to the interaction type and having a query string pattern capable of matching at least one query string related to the interaction type; and
  for each entry,
    analyzing the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition; and
  when it is determined that the entry matches one of the event type definitions, storing an indication of an occurrence of that event type for the web site,
  wherein each of the interactions with a web site that includes a specified URL includes a request for a web page from that web site that corresponds to the specified URL.

44. A computer-implemented method for analyzing interaction data for a web site to identify occurrences of defined types of events, the method comprising:
- receiving an indication of multiple interaction data entries each containing information about an interaction with a web site that includes a specified URL, each of the specified URLs optionally including a URL path portion and optionally including a query string portion, the contained information for each entry including any URL path portion that is included in the specified URL for the entry and including any query string portion that is included in the specified URL for the entry;
- receiving an indication of multiple event type definitions that each specify a type of interaction, each event type definition having a URL path pattern capable of matching at least one URL path related to the interaction type and having a query string pattern capable of matching at least one query string related to the interaction type; and
- for each entry,
  - analyzing the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition; and
  - when it is determined that the entry matches one of the event type definitions, storing an indication of an occurrence of that event type for the web site,
- wherein each of the interactions with a web site that includes a specified URL includes a sending to a client of a web page from that web site that corresponds to the specified URL.

45. A computer-implemented method for analyzing interaction data for a web site to identify occurrences of defined types of events, the method comprising:
- receiving an indication of multiple interaction data entries each containing information about an interaction with a web site that includes a specified URL, each of the specified URLs optionally including a URL path portion and optionally including a query string portion, the contained information for each entry including any URL path portion that is included in the specified URL for the entry and including any query string portion that is included in the specified URL for the entry;
- receiving an indication of multiple event type definitions that each specify a type of interaction, each event type definition having a URL Path pattern capable of matching at least one URL path related to the interaction type and having a query string pattern capable of matching at least one query string related to the interaction type; and
- for each entry,
  - analyzing the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition; and
  - when it is determined that the entry matches one of the event type definitions, storing an indication of an occurrence of that event type for the web site,
- wherein at least some of the event type definitions include multiple event patterns that each specify a distinct combination of a URL path pattern capable of matching at least one URL path and a query string pattern capable of matching at least one query string, and wherein an entry is determined to match an event type definition having multiple event patterns if, for any of the event patterns, the information contained in the entry includes a URL path portion that matches the URL path pattern specified in that event pattern and includes a query string portion that matches the query string pattern specified in that event pattern.

46. A computer-implemented method for analyzing interaction data for a web site to identify occurrences of defined types of events, the method comprising:
- receiving an indication of multiple interaction data entries each containing information about an interaction with a web site that includes a specified URL, each of the specified URLs optionally including a URL path portion and optionally including a query string portion, the contained information for each entry including any URL path portion that is included in the specified URL for the entry and including any query string portion that is included in the specified URL for the entry;
- receiving an indication of multiple event type definitions that each specify a type of interaction, each event type definition having a URL path pattern capable of matching at least one URL path related to the interaction type and having a query string pattern capable of matching at least one query string related to the interaction type; and
- for each entry,
  - analyzing the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition; and
  - when it is determined that the entry matches one of the event type definitions, storing an indication of an occurrence of that event type for the web site,
- wherein the query string patterns each indicate one or more query parameter names whose presence in a query string is required, allowed, or disallowed if that query string is to match the query string pattern, and wherein the determination of whether a query string portion matches a query string pattern further includes determining if the query string portion includes each of the query parameter names whose presence is indicated in the query string pattern to be required and does not include any of the query parameter names whose presence is indicated in the query string pattern to be disallowed.

47. A computer-implemented method for analyzing interaction data for a web site to identify occurrences of defined types of events, the method comprising:
- receiving an indication of multiple interaction data entries each containing information about an interaction with a web site that includes a specified URL, each of the specified URLs optionally including a URL path portion and optionally including a query string portion, the contained information for each entry including any URL path portion that is included in the specified URL for the entry and including any query string portion that is included in the specified URL for the entry;

receiving an indication of multiple event type definitions that each specify a type of interaction, each event type definition having a URL path pattern capable of matching at least one URL path related to the interaction type and having a query string pattern capable of matching at least one query string related to the interaction type; and for each entry,
analyzing the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition; and when it is determined that the entry matches one of the event type definitions, storing an indication of an occurrence of that event type for the web site, wherein the query string patterns each include at least one query string parameter name, and wherein the stored indication of an occurrence of an event type for an entry matching the definition for that event type includes, for each query string parameter name in the query string pattern for that event type definition, a value from the query string portion of the specified URL for that entry that corresponds to that query string parameter name.

48. The method of claim 47 wherein at least one of the query string patterns includes multiple instances of a query string parameter name, and including, when an entry matches the definition for the event type that includes that one query string pattern in such a manner that the query string portion of the specified URL for that entry includes multiple combinations that each have a query string value corresponding to one of the instances of the query string parameter name, before the storing of those query string values, determining a unique name for each of the multiple instances of the query string parameter name so that those corresponding query string values for each of the multiple instances of the query string parameter name can be stored distinctly from the corresponding query string values for the other instances of the query string parameter name.

49. A computer-implemented method for analyzing interaction data for a web site to identify occurrences of defined types of events, the method comprising:
receiving an indication of multiple interaction data entries each containing information about an interaction with a web site that includes a specified URL, each of the specified URLs optionally including a URL path portion and optionally including a query string portion, the contained information for each entry including any URL path portion that is included in the specified URL for the entry and including any query string portion that is included in the specified URL for the entry;

receiving an indication of multiple event type definitions that each specify a type of interaction, each event type definition having a URL path pattern capable of matching at least one URL path related to the interaction type and having a query string pattern capable of matching at least one query string related to the interaction type; and for each entry,
analyzing the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition; and when it is determined that the entry matches one of the event type definitions, storing an indication of an occurrence of that event type for the web site, wherein at least some of the URL path patterns include a static portion capable of matching a single corresponding portion of a URL path and include a variable portion capable of matching multiple corresponding portions of URL paths.

50. A computer-implemented method for analyzing interaction data for a web site to identify occurrences of defined types of events, the method comprising:
receiving an indication of multiple interaction data entries each containing information about an interaction with a web site that includes a specified URL, each of the specified URLs optionally including a URL path portion and optionally including a query string portion, the contained information for each entry including any URL path portion that is included in the specified URL for the entry and including any query string portion that is included in the specified URL for the entry;

receiving an indication of multiple event type definitions that each specify a type of interaction, each event type definition having a URL path pattern capable of matching at least one URL path related to the interaction type and having a query string pattern capable of matching at least one query string related to the interaction type; and for each entry,
analyzing the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition; and when it is determined that the entry matches one of the event type definitions, storing an indication of an occurrence of that event type for the web site, wherein each of the URL path patterns can be specified to match any URL path and wherein each of the query string patterns can be specified to match any query string.

51. A computer-implemented method for analyzing interaction data for a web site to identify occurrences of defined types of events, the method comprising:
receiving an indication of multiple interaction data entries each containing information about an interaction with a web site that includes a specified URL, each of the specified URLs optionally including a URL path portion and optionally including a query string portion, the contained information for each entry including any URL path portion that is included in the specified URL for the entry and including any query string portion that is included in the specified URL for the entry;

receiving an indication of multiple event type definitions that each specify a type of interaction, each event type definition having a URL path pattern capable of matching at least one URL path related to the interaction type and having a query string pattern capable of matching at least one query string related to the interaction type; and for each entry,
analyzing the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition; and when it is determined that the entry matches one of the event type definitions, storing an indication of an occurrence of that event type for the web site, wherein at least some of the entries are determined to match multiple of the event type definitions.

52. A computer-implemented method for analyzing interaction data for a web site to identify occurrences of defined types of events, the method comprising:

receiving an indication of multiple interaction data entries each containing information about an interaction with a web site that includes a specified URL, each of the specified URLs optionally including a URL path portion and optionally including a query string portion, the contained information for each entry including any URL path portion that is included in the specified URL for the entry and including any query string portion that is included in the specified URL for the entry;

receiving an indication of multiple event type definitions that each specify a type of interaction, each event type definition having a URL path pattern capable of matching at least one URL path related to the interaction type and having a query string pattern capable of matching at least one query string related to the interaction type; and for each entry,
analyzing the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition;

when it is determined that the entry matches one of the event type definitions, storing an indication of an occurrence of that event type for the web site; and receiving an indication of at least one exclusion definition that specifies a type of interaction, wherein the determining of whether an entry matches one of the event type definitions is not performed if the interaction for the entry is of a type that matches one of the exclusion definitions.

53. The method of claim 52 wherein the type of interaction specified by each of the exclusion definitions is a request for a file of a specified type.

54. The method of claim 52 wherein the type of interaction specified by each of the exclusion definitions is a request from a specified client computer.

55. The method of claim 52 wherein the type of interaction specified by each of the exclusion definitions is a request sent to a specified executable program at the web site.

56. A computer-implemented method for analyzing interaction data for a web site to identify occurrences of defined types of events, the method comprising:

receiving an indication of multiple interaction data entries each containing information about an interaction with a web site that includes a specified URL, each of the specified URLs optionally including a URL path portion and optionally including a query string portion, the contained information for each entry including any URL path portion that is included in the specified URL for the entry and including any query string portion that is included in the specified URL for the entry;

receiving an indication of multiple event type definitions that each specify a type of interaction, each event type definition having a URL path pattern capable of matching at least one URL path related to the interaction type and having a query string pattern capable of matching at least one query string related to the interaction type; and for each entry,
analyzing the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition;

when it is determined that the entry matches one of the event type definitions, storing an indication of an occurrence of that event type for the web site; and receiving a request to provide information about occurrences of specified event types, and providing in response the stored indications of occurrences related to the specified event types.

57. A computing device for analyzing interaction data to identify occurrences of defined types of events, comprising:

one or more input devices;
one or more microprocessors;
an interaction data receiver component capable of using at least one of the input devices to receive an indication of multiple interaction data entries each containing information about an interaction with a web site that includes a specified URL, each of the specified URLs optionally including a URL path portion and optionally including a query string portion, the contained information for each entry including any URL path portion that is included in the specified URL for the entry and including any query string portion that is included in the specified URL for the entry;

a definition receiver component capable of using at least one of the input devices to receive an indication of multiple event type definitions that each specify a type of interaction, each event type definition having a URL path pattern capable of matching at least one URL path related to the interaction type and having a query string pattern capable of matching at least one query string related to the interaction type; and an interaction data parsing component capable of, for each entry, using at least one of the microprocessors to analyze the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition, and of storing an indication of an occurrence of an event type for the web site when it is determined that an entry matches the definition for that event type.

58. A computer-implemented method for analyzing interaction data for a web site to identify occurrences of defined types of events, the method comprising:

receiving an indication of multiple interaction data entries each containing information about a request that specifies a URL corresponding to a web site, each of the specified URLs optionally including a URL path portion and optionally including a query string portion, each of the query string portions including one or more combinations each having a query parameter name and corresponding query value, the contained information about each request including any URL path portion that is included in the specified URL for the request and including any query string portion that is included in the specified URL for the request;

receiving an indication of multiple event type definitions that each specify a type of interaction, each event type definition having a URL path pattern capable of matching at least one URL path related to the interaction type and a query string pattern capable of matching at least one query string related to the interaction type, each query string pattern indicating one or more query parameter names; and for each entry,
analyzing the entry to determine whether the entry matches one of the event type definitions by containing information about an interaction of the type specified by that one event type definition, the matching such that the information contained in the entry includes a URL path portion that matches the URL path pattern specified in that one event type definition and includes a query string portion that matches the query string pattern specified in that one event type definition; and when it is determined that the entry matches one of the event type definitions, for each of the query parameter names that is included in the query string portion of the contained information for the entry and that is indicated in the query string pattern specified by that one event type definition, storing the query value from the contained information that corresponds to the query parameter name.

59. The method of claim 58 wherein each of the query string patterns additionally indicates a type of value corresponding to at least some of the indicated query parameter names, and wherein the determining that an entry matches an event type definition further includes determining that, for each of the query parameter names that is included in the query string portion of the contained information for the entry and that is indicated to have a type of value in the query string pattern specified by that one event type definition, the corresponding query value in the query string portion matches the indicated value type.

60. The method of claim 58 wherein the contained information about each request further includes information related to a manner of identifying a web site server to which the request was sent, wherein each of the event type definitions is associated with a logical site definition that specifies a manner of identifying a web site server related to the web site, and wherein the determining that an entry matches an event type definition further includes determining that the information included in the entry that is related to the manner of identifying the web site server matches the manner of identifying a web site server specified by the logical site definition associated with that event type definition.

61. The method of claim 58 wherein at least one of the query string patterns includes multiple instances of a query string parameter name, and including, when an entry matches the definition for the event type that includes that one query string pattern in such a manner that the query string portion of the specified URL for that entry includes multiple combinations that each have a query string value corresponding to one of the instances of the query string parameter name, before the storing of those query string values, determining a unique name for each of the multiple instances of the query string parameter name so that those corresponding query string values for each of the multiple instances of the query string parameter name can be stored distinctly from the corresponding query string values for the other instances of the query string parameter name.

62. A computer-implemented method for analyzing interaction data for a web site to identify occurrences of defined types of events, the method comprising:

receiving an indication of multiple interaction data entries each containing information about a request that specifies a URL corresponding to a web site, each of the specified URLs optionally including a URL path portion and optionally including a query string portion, each of the query string portions including one or more combinations each having a query parameter name and corresponding query value, the contained information about each request including any URL path portion that is included in the specified URL for the request and including any query string portion that is included in the specified URL for the request;

receiving an indication of multiple event type definitions that each specify a type of interaction, each event type definition having a URL path pattern capable of matching at least one URL path and a query string pattern capable of matching at least one query string, each query string pattern indicating one or more query parameter names whose presence in a query string is required, allowed, or disallowed if that query string is to match the query string pattern; and for each entry,
analyzing the entry to determine whether the entry matches one of the event type definitions by containing information about an interaction of the type specified by that one event type definition, the matching such that the information contained in the entry
(a) includes a URL path portion that matches the URL path pattern specified in that one event type definition; and
(b) includes a query string portion that includes each of the query parameter names whose presence is indicated in the query string pattern specified in that one event type definition to be required, and that does not include any of the query parameter names whose presence is indicated in the query string pattern specified in that one event type definition to be disallowed; and when it is determined that the entry matches one of the event type definitions, storing an indication of an occurrence of that one event type for the web site.

63. The method of claim 62 wherein the contained information about each request further includes information related to a manner of identifying a web site server to which the request was sent, wherein each of the event type definitions is associated with a logical site definition that specifies a manner of identifying a web site server related to the web site, and wherein the determining that an entry matches an event type definition further includes determining that the information included in the entry that is related to the manner of identifying the web site server matches the manner of identifying a web site server specified by the logical site definition associated with that event type definition.

64. A computer-implemented method for analyzing interaction data related to a requested URL to identify occurrences of defined types of events, the method comprising:

receiving an indication of stored information about a request for a specified URL having a URL path portion and a query string portion, the query string portion including one or more combinations each having a query parameter name and corresponding query value, the stored information including the URL path portion and the query string portion;

receiving an indication of an event type definition that specifies a type of interaction and that includes multiple event patterns each specifying a distinct combination of a URL path pattern capable of matching at least one URL path and a query string pattern capable of matching at least one query string, the query string pattern indicating one or more query parameter names whose presence in a query string is required, allowed, or disallowed if that query string is to match the query string pattern;

analyzing the stored information to determine whether the information is about an interaction of the type specified by any of the event patterns such that the URL path portion matches the URL path pattern specified in that event pattern, such that the query string portion includes each of the query parameter names whose presence is indicated in the query string pattern specified in that event pattern to be required, and such that the query string portion does not include any of the query parameter names whose presence is indicated in the query string pattern specified in that event pattern to be disallowed; and when it is determined that the stored information is about an interaction of the type specified by one of the event patterns, for each of the query parameter names that is included in the query string portion and that is indicated in the query string pattern specified by that one event pattern, storing the query value that corresponds to the query parameter name.

65. The method of claim 64 wherein the contained information about each request further includes information related to a manner of identifying a web site server to which the request was sent, wherein each of the event type definitions is associated with a logical site definition that specifies a manner of identifying a web site server related to the web site, and wherein the determining that an entry matches an event type definition further includes determining that the information included in the entry that is related to the manner of identifying the web site server matches the manner of identifying a web site server specified by the logical site definition associated with that event type definition.

66. A method for analyzing customer data to identify occurrences of defined types of events, the method comprising:

receiving a request from a customer to analyze interaction or usage data for that customer;

receiving an indication of analysis definitions for the customer that include at least one communication definition specifying a manner of communicating information and include multiple event type definitions each specifying a type of interaction or use and each associated with one of the communication definitions;

receiving a first set of data for the customer that includes information about at least one interaction or use;

analyzing the received set of data to determine whether the received data includes information about any interactions or uses that match one of the event type definitions in such a manner that the interaction or use is of the type specified by that event type definition and had related information communicated in the manner specified by the communication definition associated with that event type definition; and when it is determined that the received data matches one of the event type definitions, providing information to the customer about an occurrence of that event type, wherein sets of data are automatically retrieved from the customer and analyzed on a periodic basis.

67. A method for analyzing customer data to identify occurrences of defined types of events, the method comprising:

receiving a request from a customer to analyze interaction or usage data for that customer;

receiving an indication of analysis definitions for the customer that include at least one communication definition specifying a manner of communicating information and include multiple event type definitions each specifying a type of interaction or use and each associated with one of the communication definitions;

receiving a first set of data for the customer that includes information about at least one interaction or use;

analyzing the received set of data to determine whether the received data includes information about any interactions or uses that match one of the event type definitions in such a manner that the interaction or use is of the type specified by that event type definition and had related information communicated in the manner specified by the communication definition associated with that event type definition; and when it is determined that the received data matches one of the event type definitions, providing information to the customer about an occurrence of that event type, wherein the providing of the information to the customer includes generating reports on a periodic basis and sending the generated reports to the customer.

68. A method for analyzing customer data to identify occurrences of defined types of events, the method comprising:

receiving a request from a customer to analyze interaction or usage data for that customer;

receiving an indication of analysis definitions for the customer that include at least one communication definition specifying a manner of communicating information and include multiple event type definitions each specifying a type of interaction or use and each associated with one of the communication definitions;

receiving a first set of data for the customer that includes information about at least one interaction or use;

analyzing the received set of data to determine whether the received data includes information about any interactions or uses that match one of the event type definitions in such a manner that the interaction or use is of the type specified by that event type definition and had related information communicated in the manner specified by the communication definition associated with that event type definition;

when it is determined that the received data matches one of the event type definitions, providing information to the customer about an occurrence of that event type; and storing an indication of the occurrence of that event type, and wherein the providing of the information to the customer includes receiving a request from the customer at a remote location to provide information about occurrences of event types and sending the requested information to the remote location.

69. A method for analyzing customer data to identify occurrences of defined types of events, the method comprising:

receiving a request from a customer to analyze interaction or usage data for that customer;

receiving an indication of analysis definitions for the customer that include at least one communication definition specifying a manner of communicating information and include multiple event type definitions each specifying a type of interaction or use and each associated with one of the communication definitions;

receiving a first set of data for the customer that includes information about at least one interaction or use;

analyzing the received set of data to determine whether the received data includes information about any interactions or uses that match one of the event type definitions in such a manner that the interaction or use is of the type specified by that event type definition and had related information communicated in the manner specified by the communication definition associated with that event type definition; and when it is determined that the received data matches one of the event type definitions, providing information to the customer about an occurrence of that event type, wherein the method is performed for multiple customers each having distinct interaction or usage data and having distinct analysis definitions.

70. A method for creating definitions of event types for analyzing interaction data for a web site to identify occurrences of those defined event types, the method comprising:

receiving an indication of a log file for the web site or of other information related to the web site that indicates multiple interactions with a web site server for the web site, each indicated interaction having associated information including network address information for the web site server and a URL specified as part of the interaction;

analyzing the log file or the other information to identify distinct network addresses for the web site servers for the web site, and generating a site definition for each of the identified network addresses that includes that network address; and analyzing the log file or the other information to identify distinct types of interactions with the web site of interest, and generating an event type definition for each of the identified interaction types;

analyzing information about a distinguished interaction with the web site to (1) identify one of the event type definitions that the information matches in such a manner that the distinguished interaction is of the type specified by the identified event type definition and (2) identify one of the site definitions whose network address matches that of a web site server for the web site of the distinguished interaction; and outputting an indication that the distinguished interaction matches the identified event-type definition and the identified site definition.

71. The method of claim 70 wherein the specified URLs each optionally include a URL path portion and optionally include a query string portion, and wherein the event type definitions are each generated to include a URL path pattern capable of matching at least one URL path related to the interaction type and a query string pattern capable of matching at least one query string related to the interaction type.

72. The method of claim 70 wherein each of the event type definitions are further generated to include an indication to one of the generated site definitions, such that information about an interaction with the web site is not determined to match one of the event type definitions unless the interaction was with the web site server having the network address included in the site definition indicated by that one event type definition.

73. The method of claim 70 including analyzing information about an interaction with the web site using the generated event type definitions and site definitions.

* * * * *

UNITED STATES PATENT AND TRADEMARK OFFICE
CERTIFICATE OF CORRECTION

PATENT NO. : 7,117,193 B1
APPLICATION NO. : 10/005224
DATED : October 3, 2006
INVENTOR(S) : Basko et al.

It is certified that error appears in the above-identified patent and that said Letters Patent is hereby corrected as shown below:

On the Title Pg, Item (74) under "Attorney, Agent, or Firm", delete "Cole" and insert -- Coie --, therefor.

On Sheet 9 of 60, in Fig. 8 (Above "Update statistics"), line 1, delete "807" and insert -- 808 --, therefor.

On Sheet 55 of 60, in Fig. 23 (Reference Numeral 2340), line 3, after "definition" insert -- ? --.

On Sheet 56 of 60, in Fig. 24 (Reference Numeral 2410), line 1, delete "Retreive" and insert -- Retrieve --, therefor.

In column 21, line 52, delete "10033" and insert -- I0033 --, therefor.

In column 21, line 59, delete "10033" and insert -- I0033 --, therefor.

In column 22, line 15, delete ""X"" and insert -- "x" --, therefor.

In column 26, line 44, delete "(ie.," and insert -- (i.e., --, therefor.

In column 27, line 36, delete ""fn"" and insert -- "fn," --, therefor.

In columns 31-32 (TABLE 5-continued), line 43, delete "storeanalysis.asp" and insert -- storeAnalysis.asp --, therefor.

In columns 39-40 (TABLE 7-continued), line 15, delete "Add VsitID" and insert -- AddVsitID --, therefor.

In columns 39-40 (TABLE 7-continued), line 65, delete "HierarchyIID" and insert -- HierarchyID --, therefor.

In columns 41-42 (TABLE 7-continued), line 7, delete "Querystringname" and insert -- QueryStringName --, therefor.

In columns 41-42 (TABLE 7-continued), line 21, delete "PropetyName" and insert -- PropertyName --, therefor.

CERTIFICATE OF CORRECTION (continued)
U.S. Pat. No. 7,117,193 B1

In column 59, line 52, in Claim 45, delete "Path" and insert -- path --, therefor.

Signed and Sealed this

Thirteenth Day of April, 2010

David J. Kappos
*Director of the United States Patent and Trademark Office*